United States Patent Office 3,516,455
Patented June 23, 1970

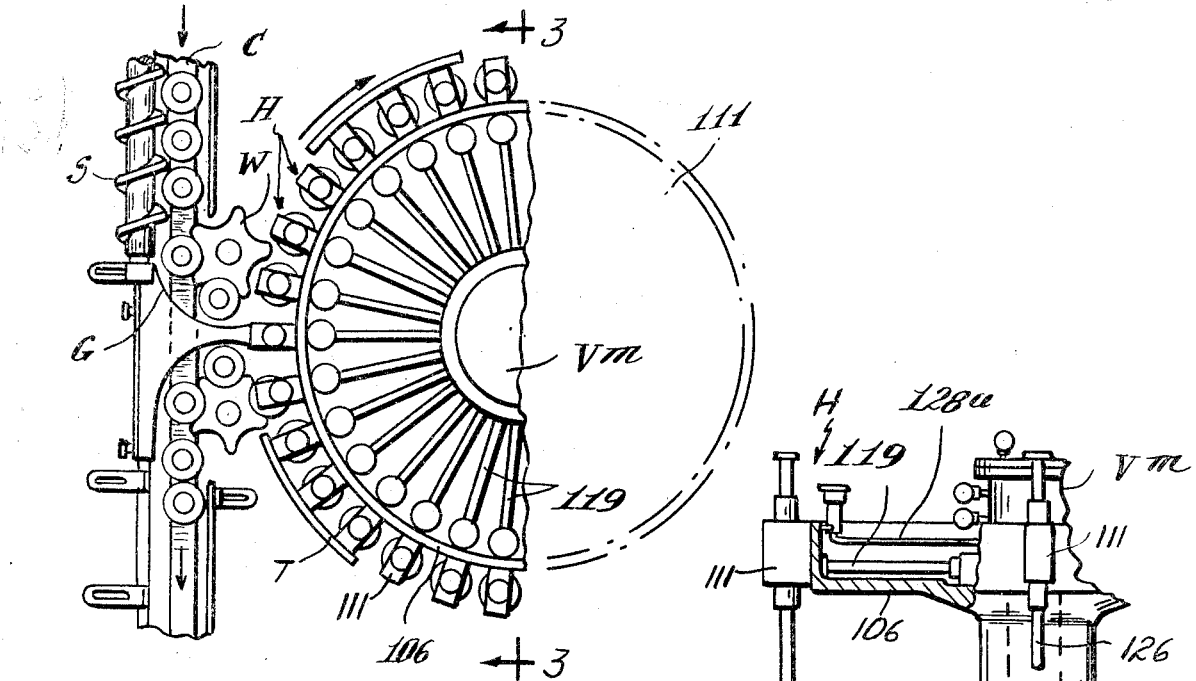
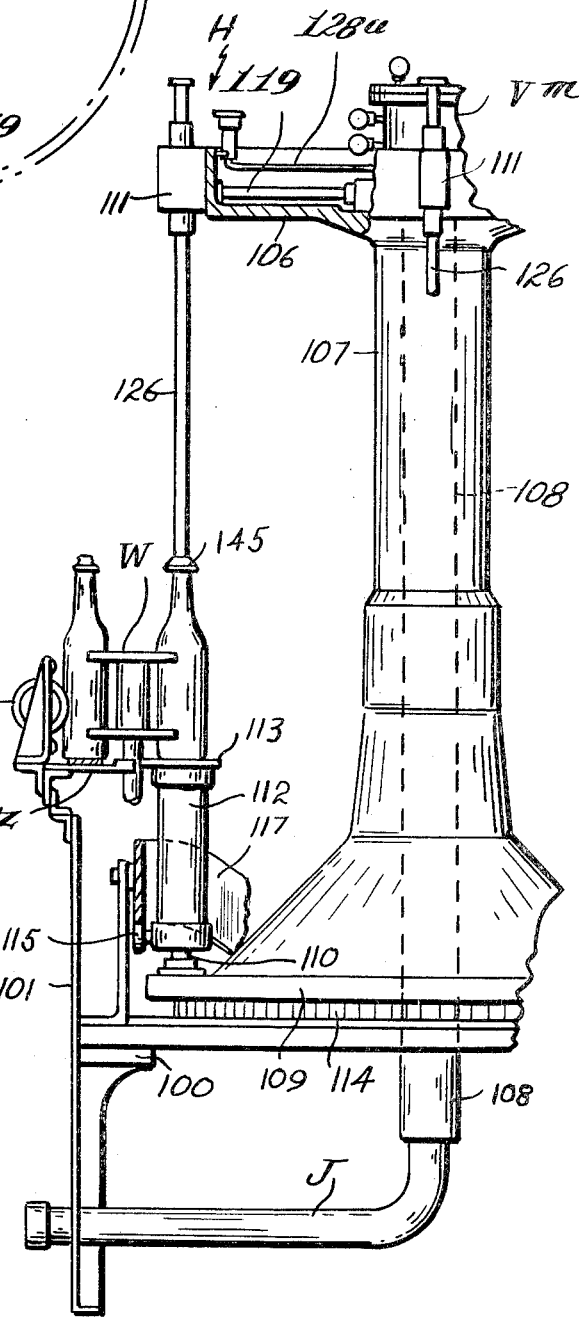
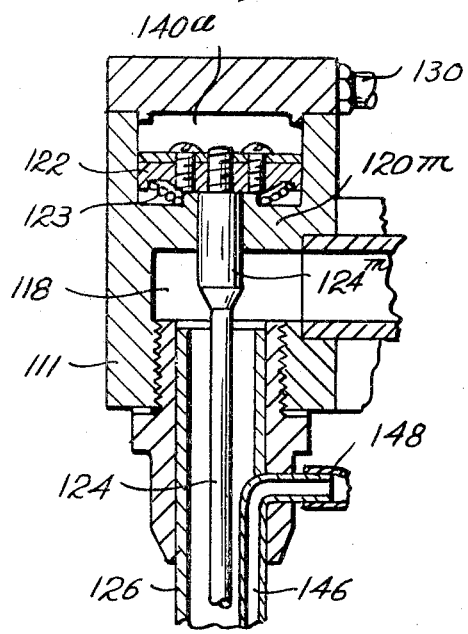
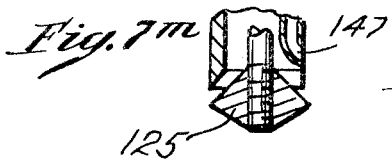

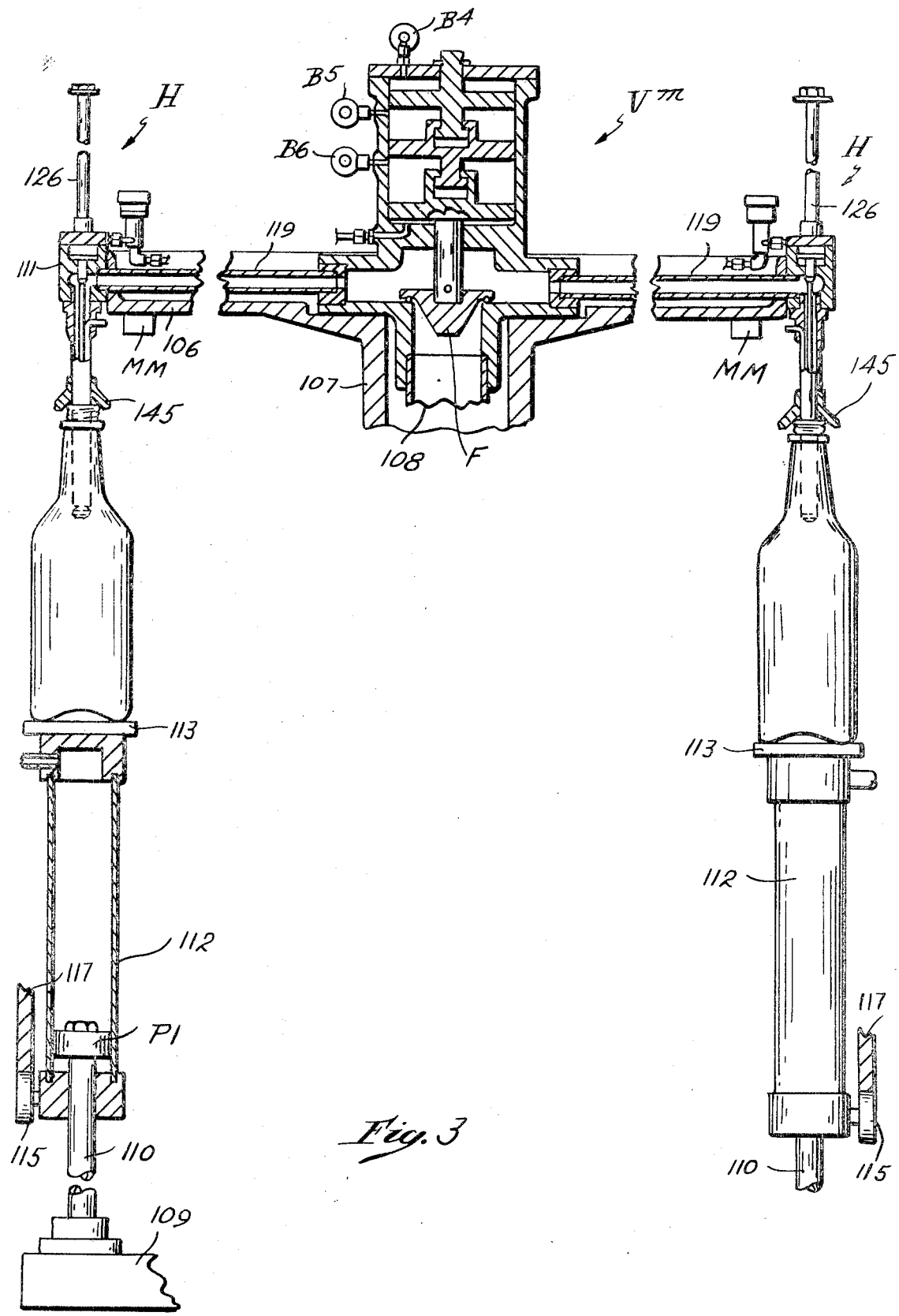

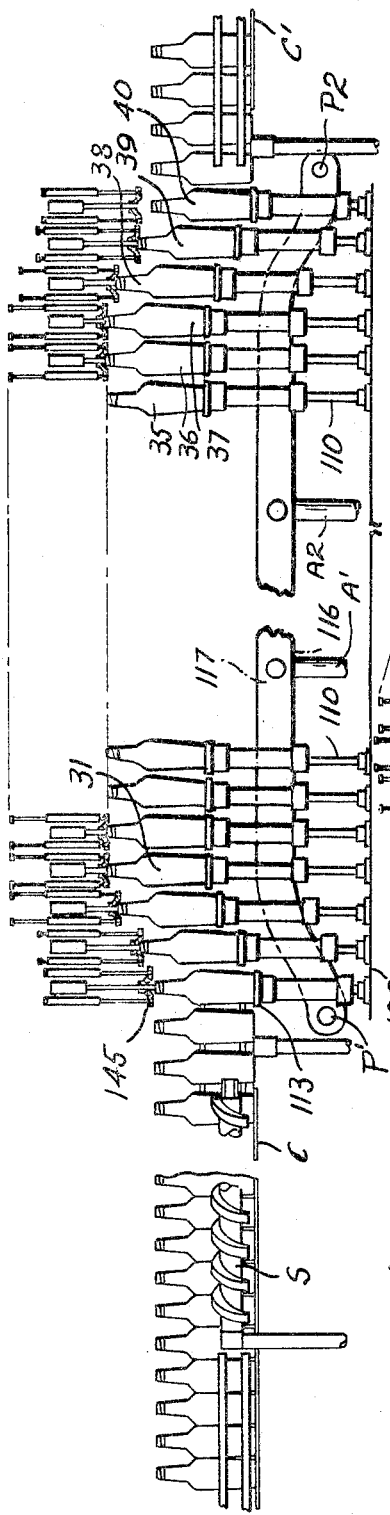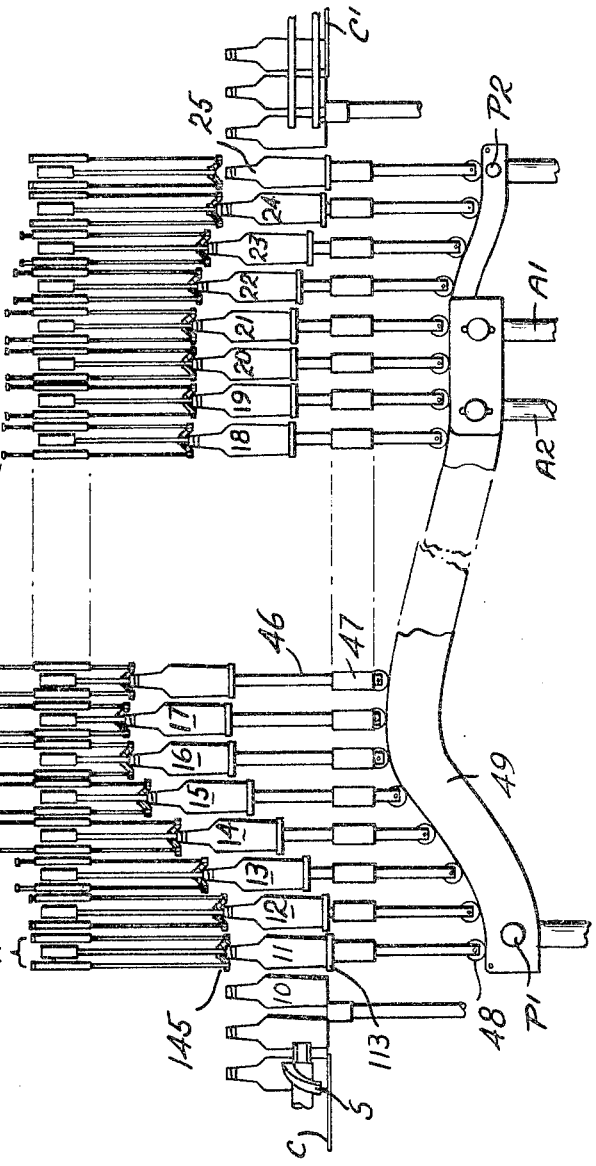
Fig. 4
Fig. 5

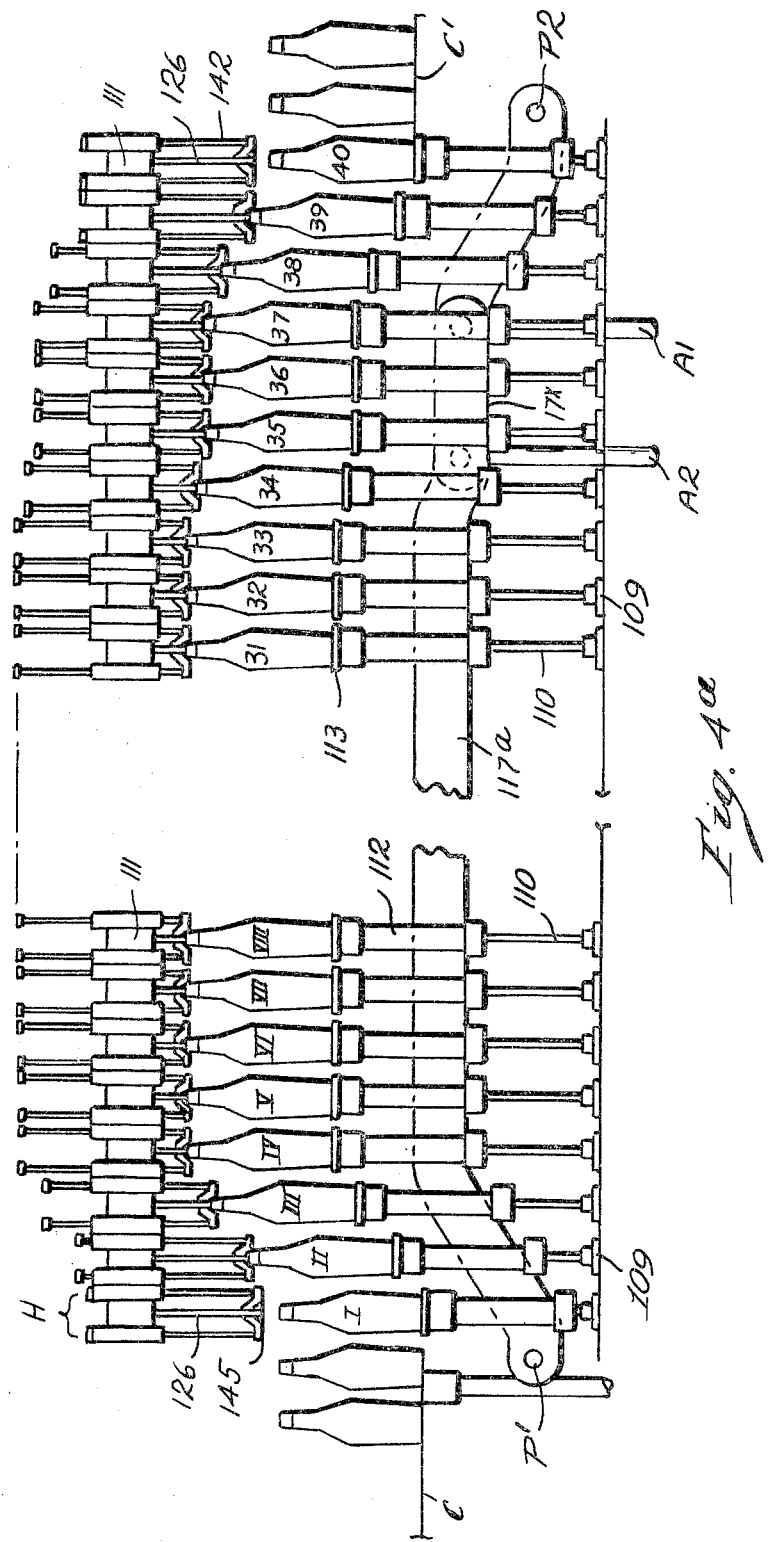

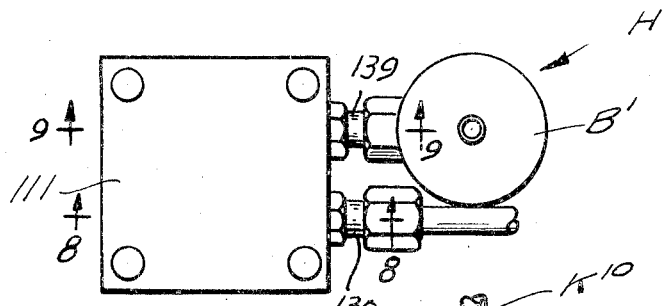
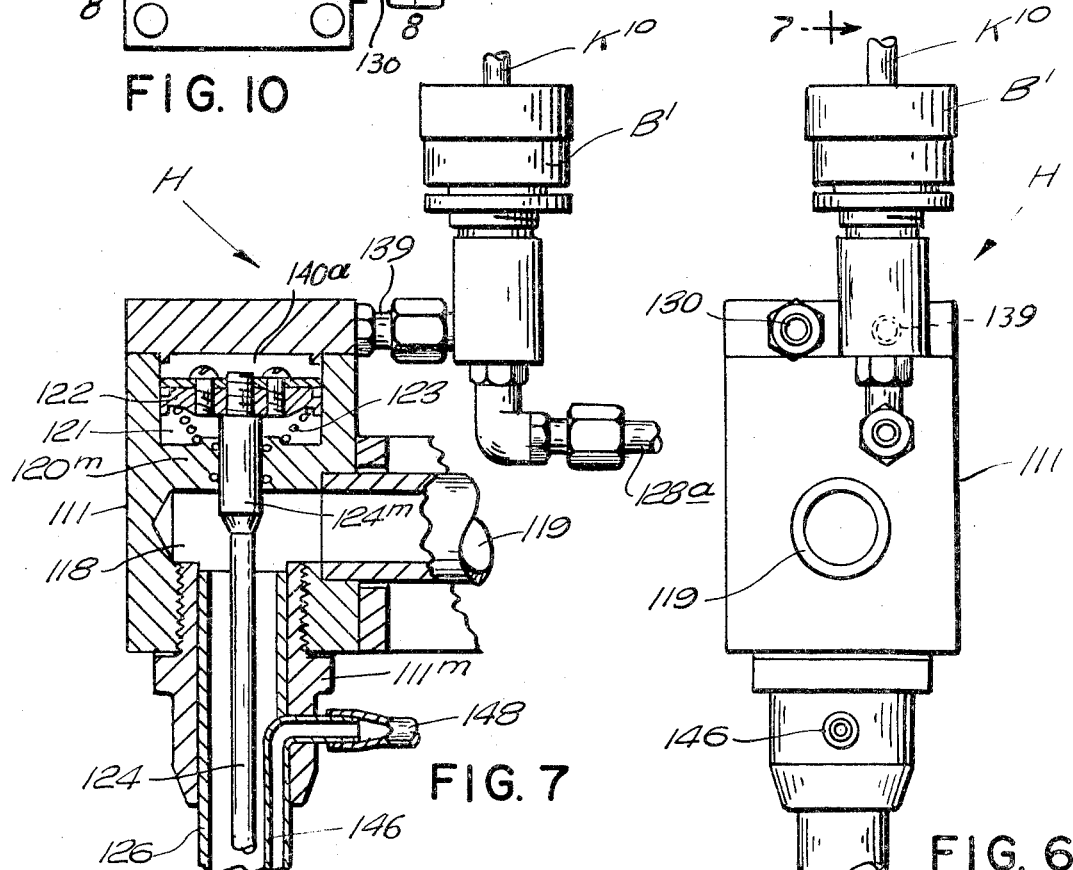
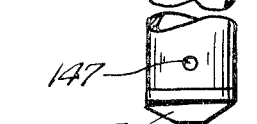
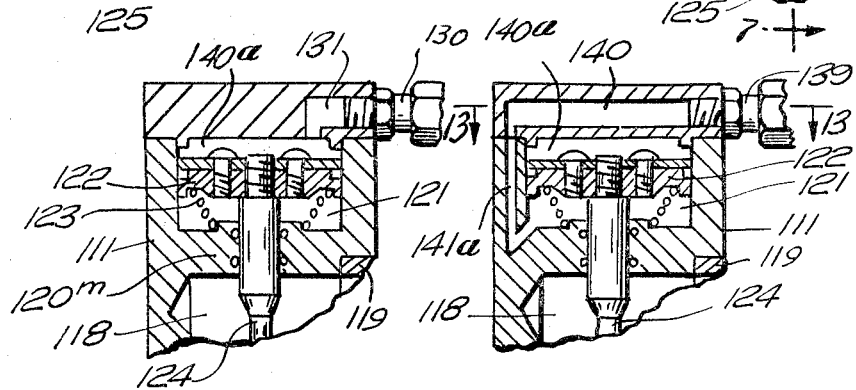

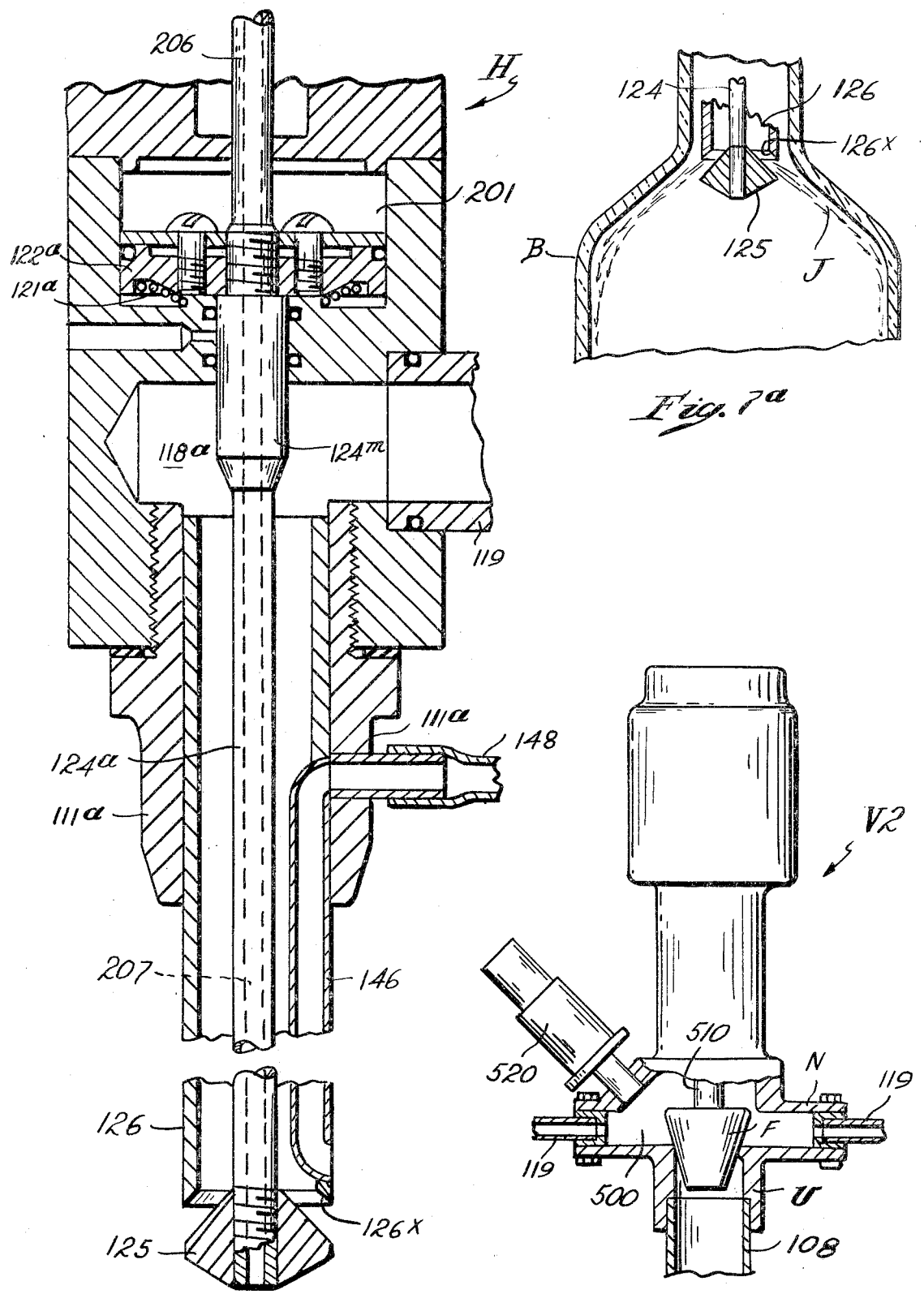

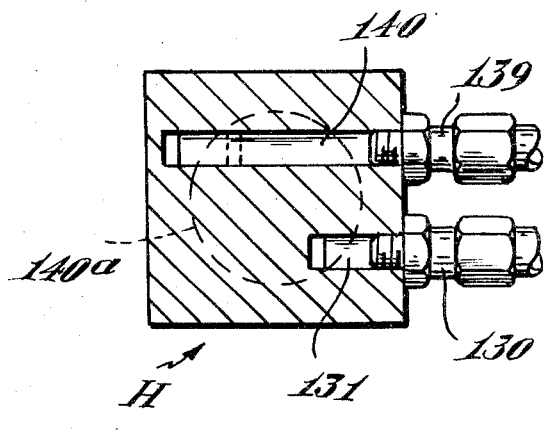

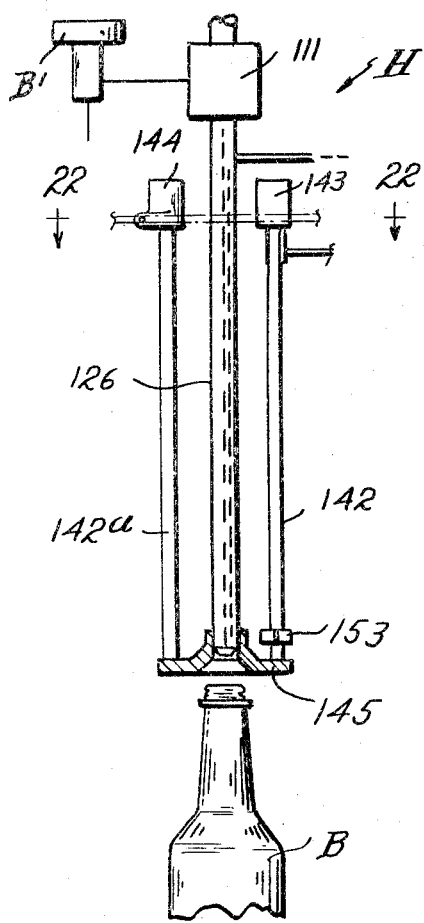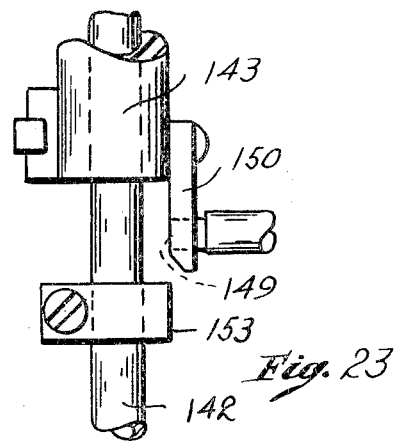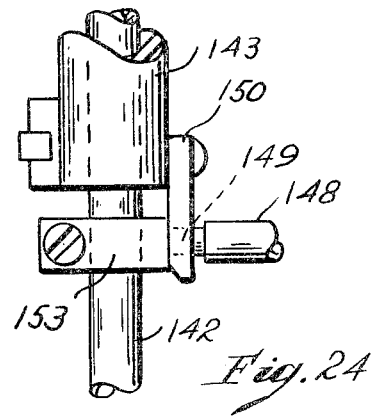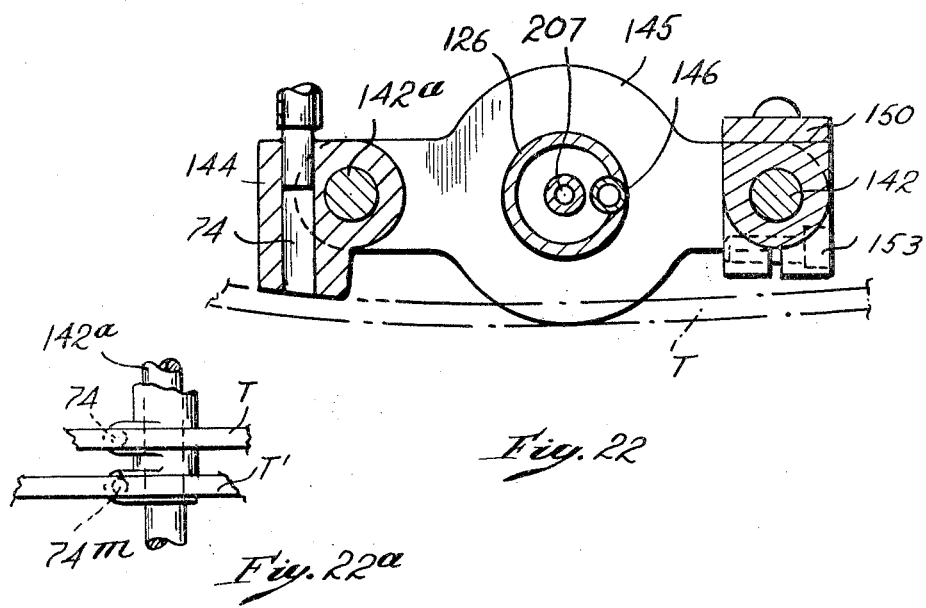

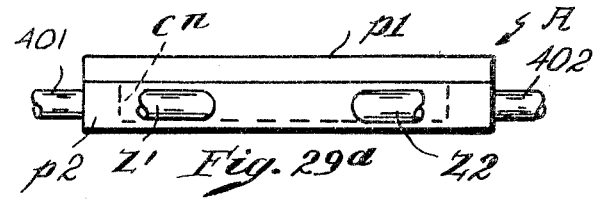
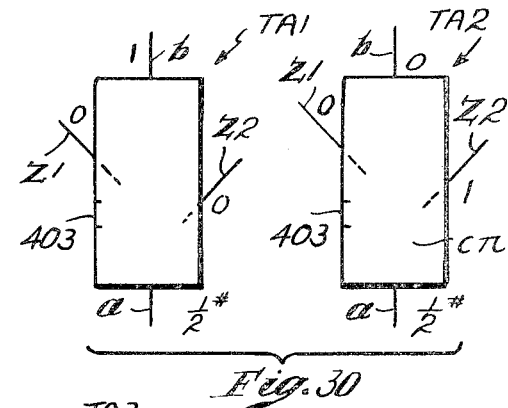
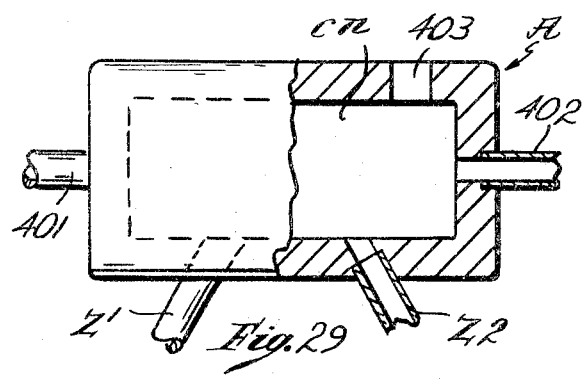
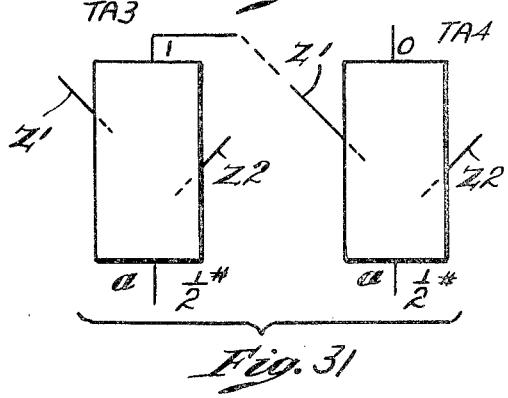
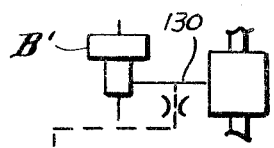
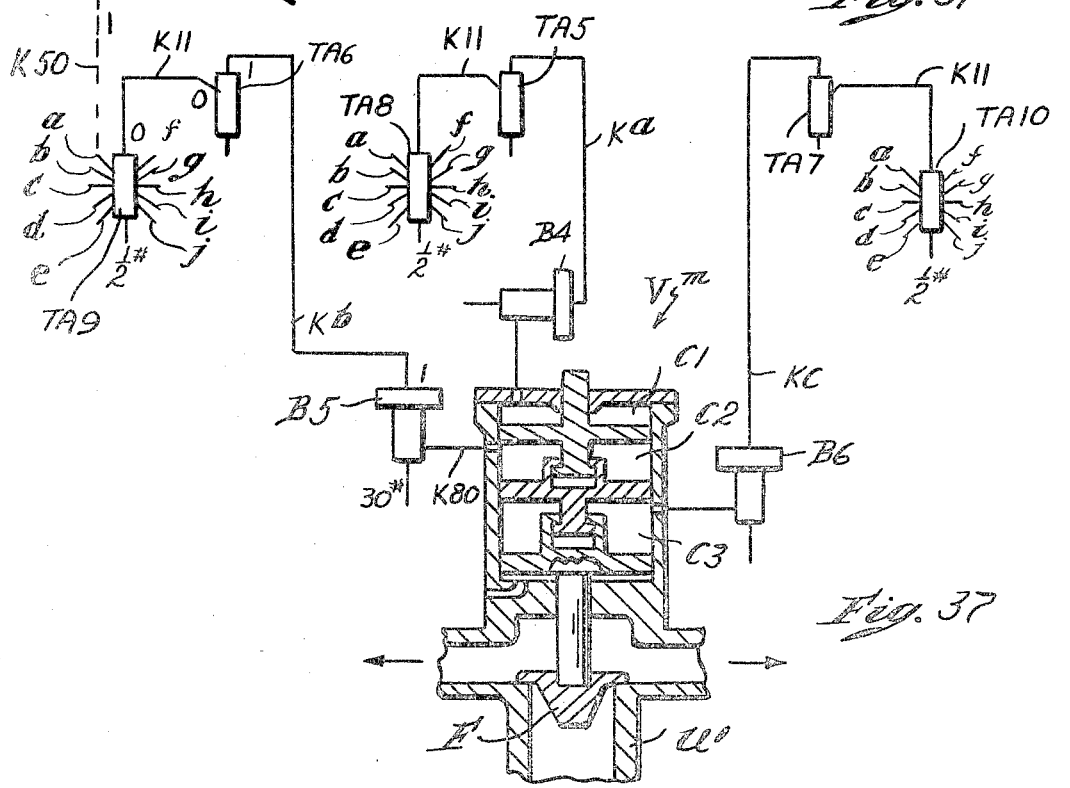

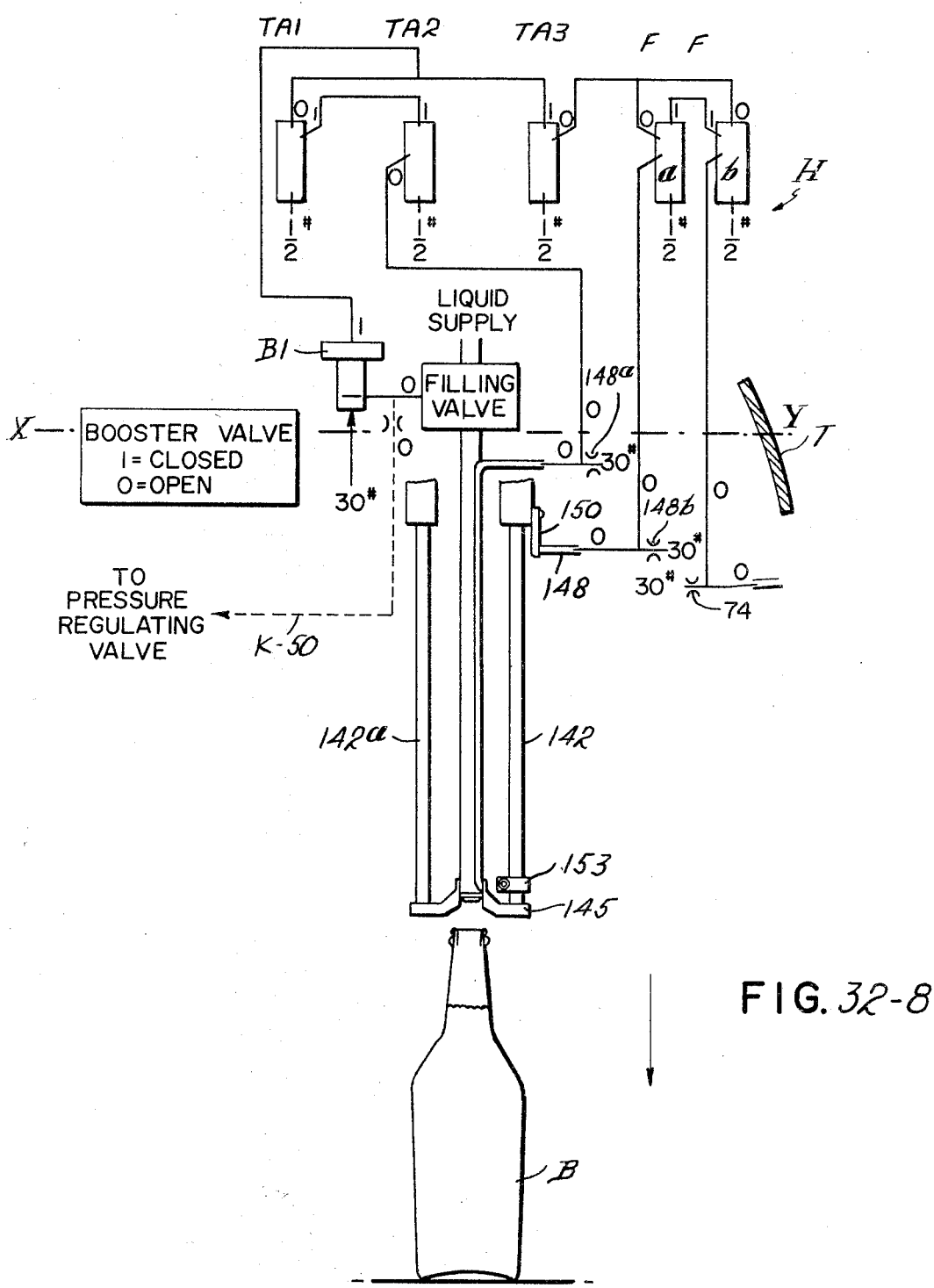

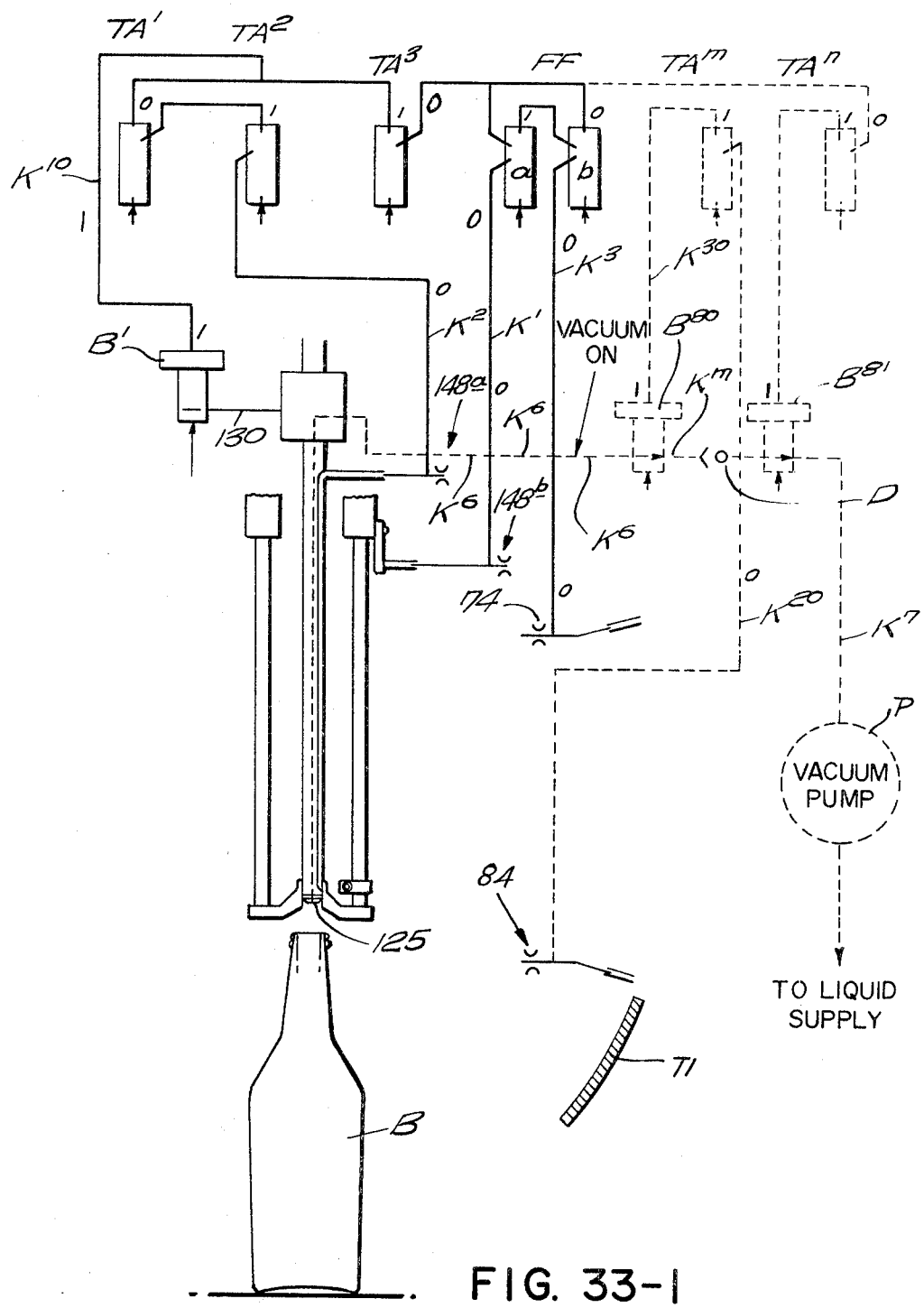

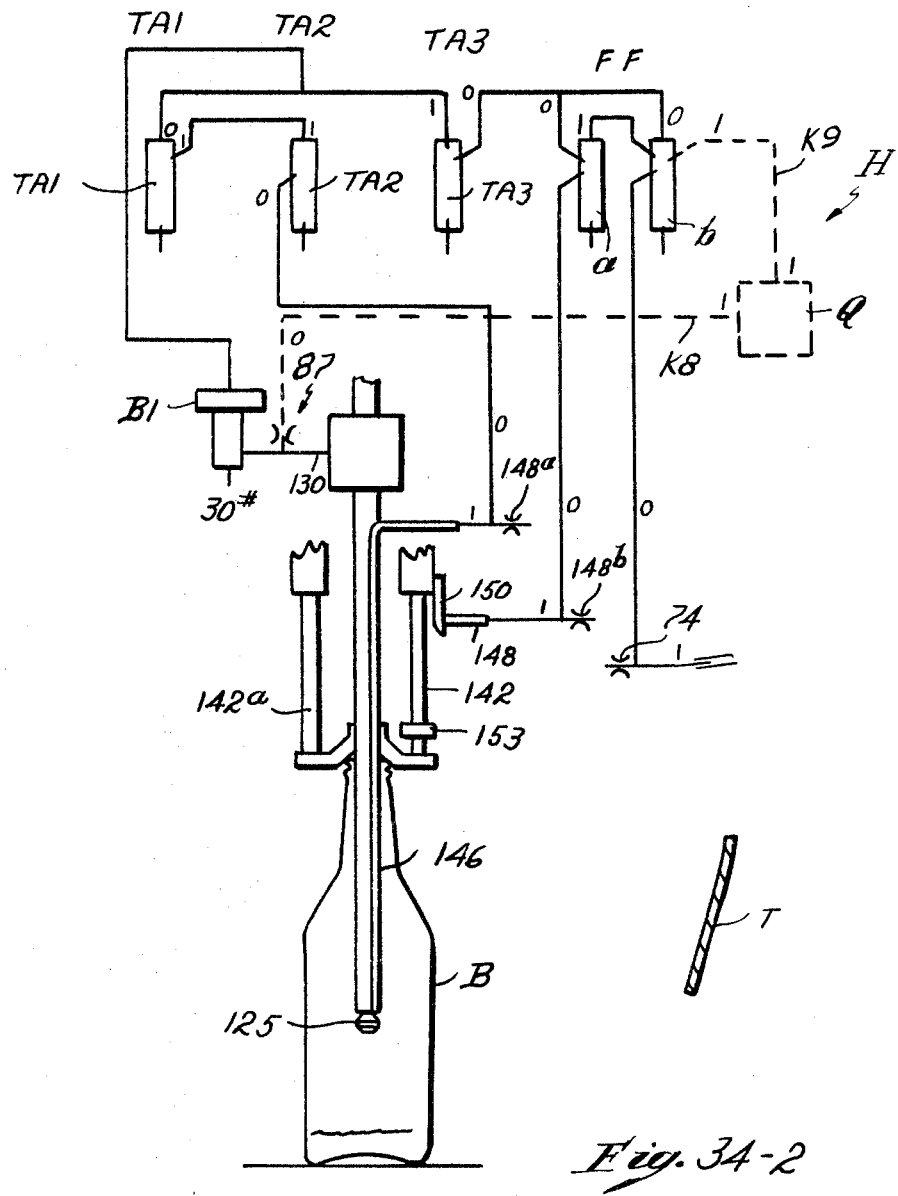

3,516,455
CONTAINER-FILLING APPARATUS
Sidney T. Carter, Shrewsbury, Mass., assignor, by mesne assignments, to "Automatic" Sprinkler Corporation of America, Cleveland, Ohio, a corporation of Ohio
Filed May 1, 1967, Ser. No. 635,040
Int. Cl. B65b 3/26; B67c 3/02
U.S. Cl. 141—90                49 Claims

ABSTRACT OF THE DISCLOSURE

A container-filling machine of the rotary type having a circular series of filling heads which revolve about the axis of the machine, each filling head comprising a vertical filling tube, each tube having a normally closed filling valve at its lower end, and a pressure-fluid motor operative to open and close the valve, a differential pressure valve for controlling the supply of pressure fluid to the motor, and means for supplying liquid to each filling tube, characterized in having a plurality of nozzles from each of which a jet of air normally issues but with provision whereby one or another of said jets may be diverted from its normal course, fluid logic means, comprising a series of fluid logic modules, each of which is sensitively responsive to the diversion of one or another of said jets, as the filling head revolves about the axis of the machine, and which, in so responding, activates the differential valve, thereby to initiate a corresponding one of certain specific operations such as may be included in the filling cycle, for example the opening or closing of the filling valve; the removal of drip from the end of the filling tube when the valve is closed; or the delivery of an inert gas into the empty container while the valve is closed before filling commences.

BACKGROUND OF THE INVENTION

In the filling of containers, particularly bottles, with liquid by a machine operation in which the containers are moved in series along a predetermined path, for example, a circular path, it is essential that the delivery of liquid into the containers be initiated promptly, as otherwise the container will not be filled when it arrives at the end of the path, and that the filling stop promptly when the bottle has been filled to the exact intended height and to stop the delivery of liquid at the end of the normal filling cycle even though the bottle is not filled. If the liquid be such that it tends to foam when agitated, as is true of milk or carbonated liquids, it should be so delivered into the bottle as to minimize foaming. Moreover, with respect to certain filling operations, it is highly desirable to prevent drip from the filling tube when the intended charge of liquid has been deposited in the container and in other instances it is desirable, before the filling commences, to introduce into the container an inert gas, such, for example, as nitrogen.

PRIOR ART

Prior automatic filling machines are usually complicated, comprising such features as devices for maintaining superatmospheric pressure within the container while it is being filled, so as to reduce the tendency to foam; devices for removing air from the container prior to filling; auxiliary tanks in which the liquid may be subjected to high pressure or other treatment and in most prior devices, relatively movable mechanical parts are employed which, in use, are subject to corrosion by contact with the liquid being handled; employ electrical contact devices prone to sparking; involve the use of an undesirable complexity of operating connections; and must be kept in sanitary condition especially when the liquid being handled is one intended for human consumption.

SUMMARY

The present invention concerns filling machines of a known type wherein a container to be filled is moved along a predetermined path while being filled and wherein for delivering fluid to the container there is provided a vertical filling nozzle having a normally closed valve at its lower end which is automatically opened, after the lower end of a nozzle has been caused to enter the container. When the liquid in the container reaches the desired height, the valve is automatically closed and the nozzle retracted from the container. The present invention provides simple means for initiating the opening and closing of the filling valve at the proper points in the cycle of a filling operation and, if desired, certain other operations comprised in the filling cycle, among them, for example, the removal of drip from the end of the filling tube after the filling valve closes and the introduction of a neutral gas into the container before the filling valve opens, and attains these results by the use of a fluid logic system devoid of moving parts, instead of electrical connections or a complicated system of hydraulic tubing, said fluid logic system occupying so little space that the outside dimensions of the machine may be smaller than those of customary machines having the same capacity.

"Fluidics", as a control means, although not as rapid in response as an electronic system, is, nevertheless effective at speeds which are generally well beyond the functional demands of pneumatic or hydraulic equipment. Individual fluid logic units have no moving parts and are very small and may readily be made of a material which is non-corrosive and unaffected by the fluids which are being handled by the machine; and there is no fire danger from sparking. A single such fluid-logic unit, although of small external dimensions, may have complex internal pathways providing for a plurality of controls; and since the number of moving parts in the entire system is at a minimum, the possibility of a breakdown in function is very much reduced as compared with prior systems. By reason of the simplicity of such a control system it becomes possible to install it in situations where it would not be practical to employ a control system of a prior type.

In accordance with usual practice, the machine of the present invention comprises filling heads in number corresponding to the number of containers involved in a single filling cycle, each head comprising a filling tube for delivering the liquid into the container. However, in accordance with the present invention, the entrance of the filling tube into the opentopped container does not seal the container and the fluid may be delivered through the tube either by gravity or under pressure; the delivery end of the filling tube may be so located within the container when filling begins as to provide maximum filling speed or minimum production of foam; optionally, the delivery end of the filling tube may be located at the same part of the container throughout the filling operation or its tip may follow the liquid level as the latter rises in the container; the delivery end of the filling tube is so shaped as to minimize foaming; the filling tube is desirably stationary and the container is moved relatively to the filling tube thereby to enter the filling tube into the container, and the motion of the container, in approaching the filling tube is effective, by fluid logic control, to open the filling valve thereby to initiate the filling operation. The container is moved relatively to the filling tube, either mechanically, by means of a rigid cam, or pneumatically but with its movement, in the latter case, limited by means of a cam, the cam, in either instance, determines the position of the container, relative to the immovable filling tube, when filling starts and the position of the container when the filling valve closes; and with provision for adjusting the cams, if desired while the filling operation is proceeding; a metering valve meters the liquid received from a supply and may, if desired, be such that under fluid logic control it responds to the varying number of filling heads in operation, to control the amount of liquid available to the filling heads; the delivery end of the filling tube may be located, during filling, in substantially that horizontal plane which will define the surface of the liquid when the container is filled, or it may be positioned near the bottom of the container when filling starts and the motion of the container may be such that the end of the filling tube remains substantially at the surface level of the liquid during the filling operation. Normally, the closing of the filling valve is the result of a signal given by a sensing device such, for example, as a tube of small internal diameter, for example ⅛ inch, which normally discharges air at a pressure approximating the downward pressure exerted by a column of water one-half inch high. The discharge end of the sensing tube is approximately one-half inch above the lower end of the filling tube. When the liquid level rises more than one-half inch above the lower end of the filling tube, the discharge of air from the sensing tube is reduced by the liquid, thereby giving a signal to a fluid logic element, which results in the closing of the filling valve; there is provision for removing drip from the end of the filling tube at the completion of filling by the establishment of suction at the upper end of the filling tube and, by the same means, for removing excess liquid from an over-filled container; means for keeping the valve closed while its filled container is being removed; safety means is provided for closing the filling valve in the event of the failure of the liquid to rise normally during the filling cycle, and there is also means whereby an inert gas, such as nitrogen, may be delivered into the container before the filling operation starts or for blowing air from the end of the filling tube prior to the filling operation to displace dust from the container.

In the accompanying drawings:

FIG. 4a is similar to FIG. 4, but showing a cam of different contour;

FIG. 7m is a section similar to FIG. 7 but showing the valve open;

FIG. 7a is a fragmentary diametrical vertical section to larger scale, through the lower end of the filling tube and valve illustrating the type of jet which the tube delivers;

FIG. 8 is a fragmentary vertical section in the plane of the line 8—8 of FIG. 10, showing the upper part of the filler head of FIG. 6 and the port through which pressure fluid is delivered thereby to apply pressure to the upper face of the valve-actuating piston;

FIG. 9 is a similar section, in the plane of the line 9—9 of FIG. 10 showing the port through which pressure fluid is normally admitted to act on the underside of the valve-actuating piston;

FIG. 10 is a plan view of the filler head of FIG. 6;

Figures 1, 32:
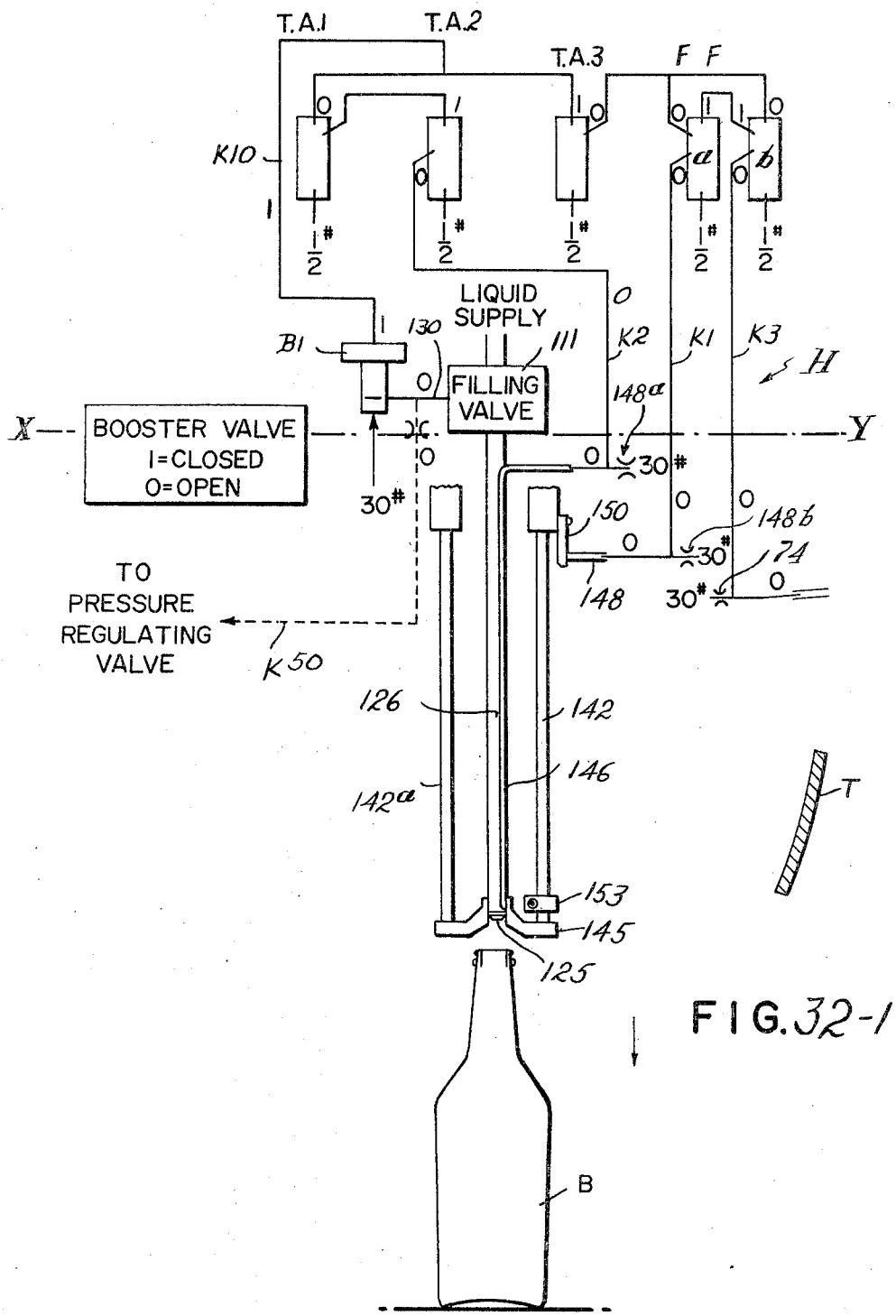
FIG. 1 is a fragmentary, small-scale, diagrammatic plan view of a rotary type machine having thirty filling heads, showing that portion of the machine at which the containers are received and discharged and at which certain control devices are located, each of said thirty heads comprising a filler tube, sensing device and control valve.
Figures 2, 32:
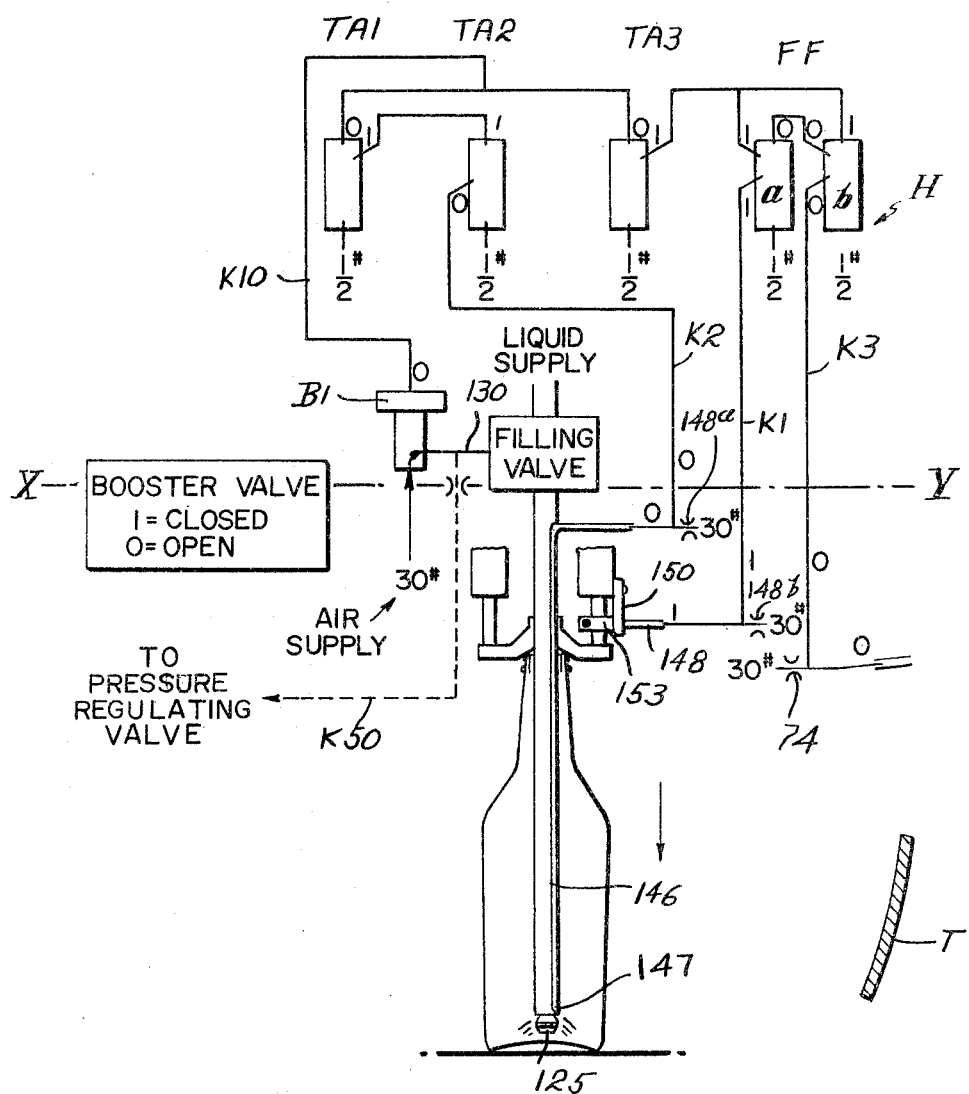
FIG. 2 is a fragmentary diagrammatic elevation of a machine according to the present invention, showing the rotary support on which the filler heads are mounted, together with one of the filler heads.
Figures 3, 32:
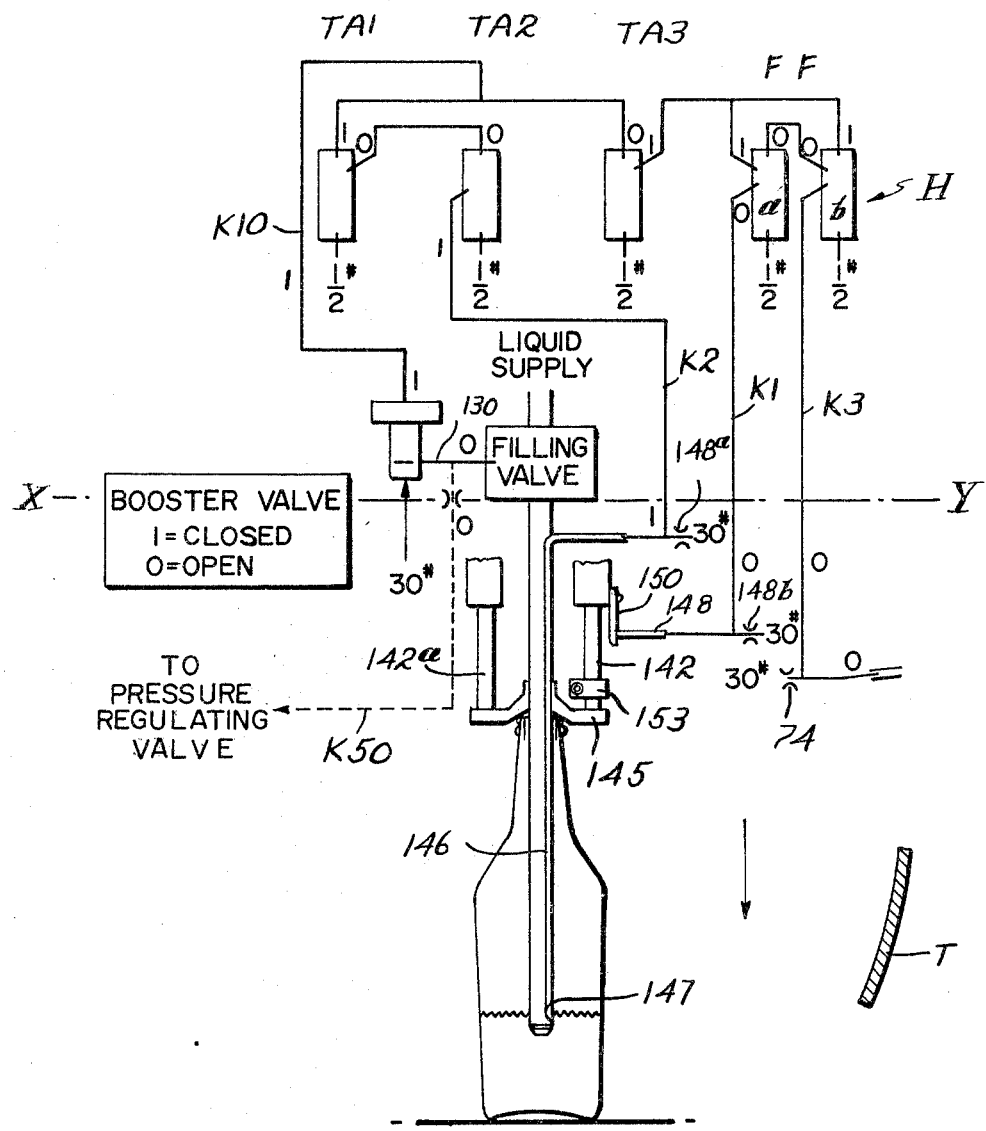
FIG. 3 is a fragmentary vertical section, omitting parts, to much larger scale than FIG. 1, substantially on the line 3—3 of FIG. 1.
Figures 4, 32:
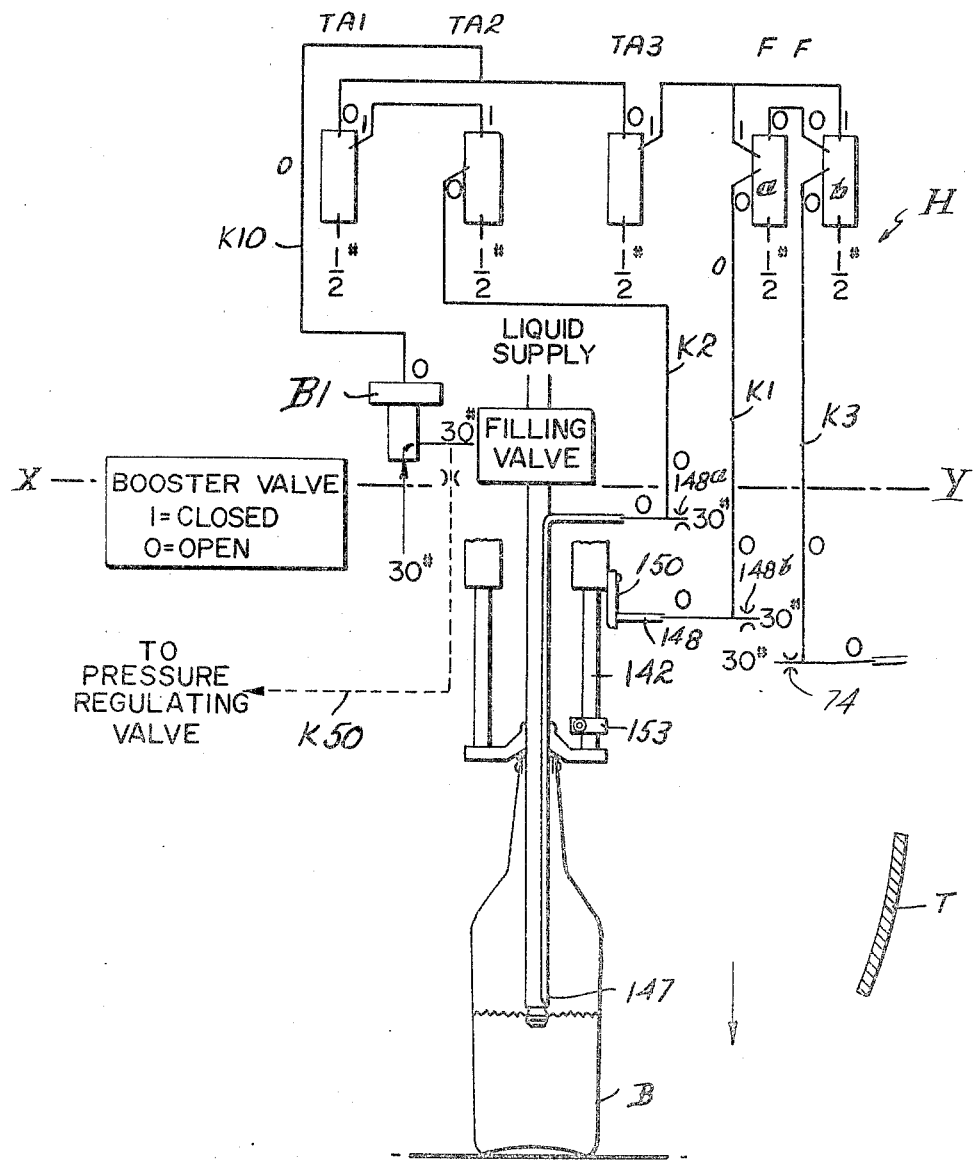
FIG. 4 is a diagrammatic, developed elevational view, to smaller scale than FIG. 3, showing the bottle supports and filler tubes of a machine such as that of FIG. 1 according to one embodiment of the invention.
Figures 5, 32:
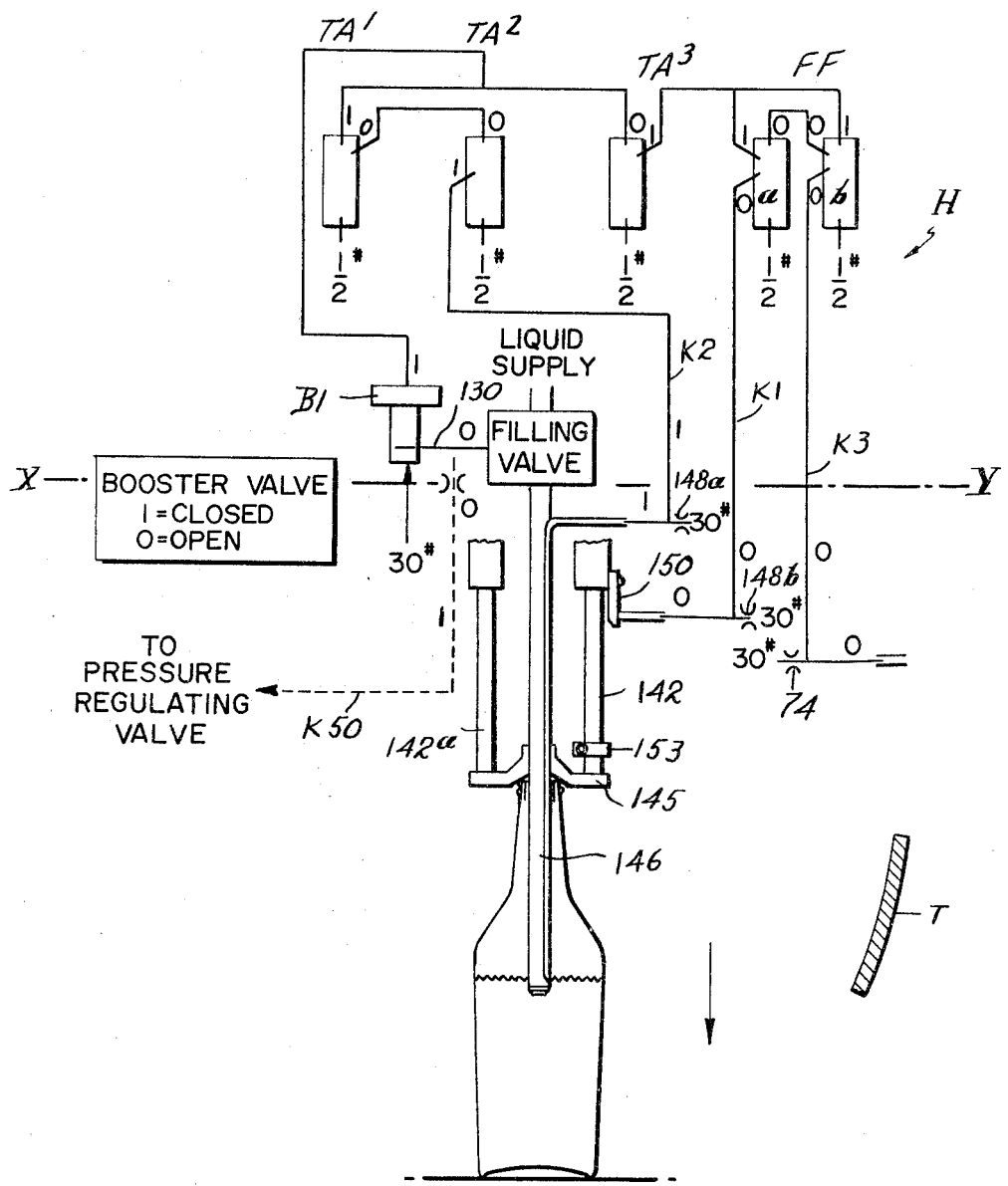
FIG. 5 is a view similar to FIG. 4 but illustrative of a modification.
Figures 6, 32:
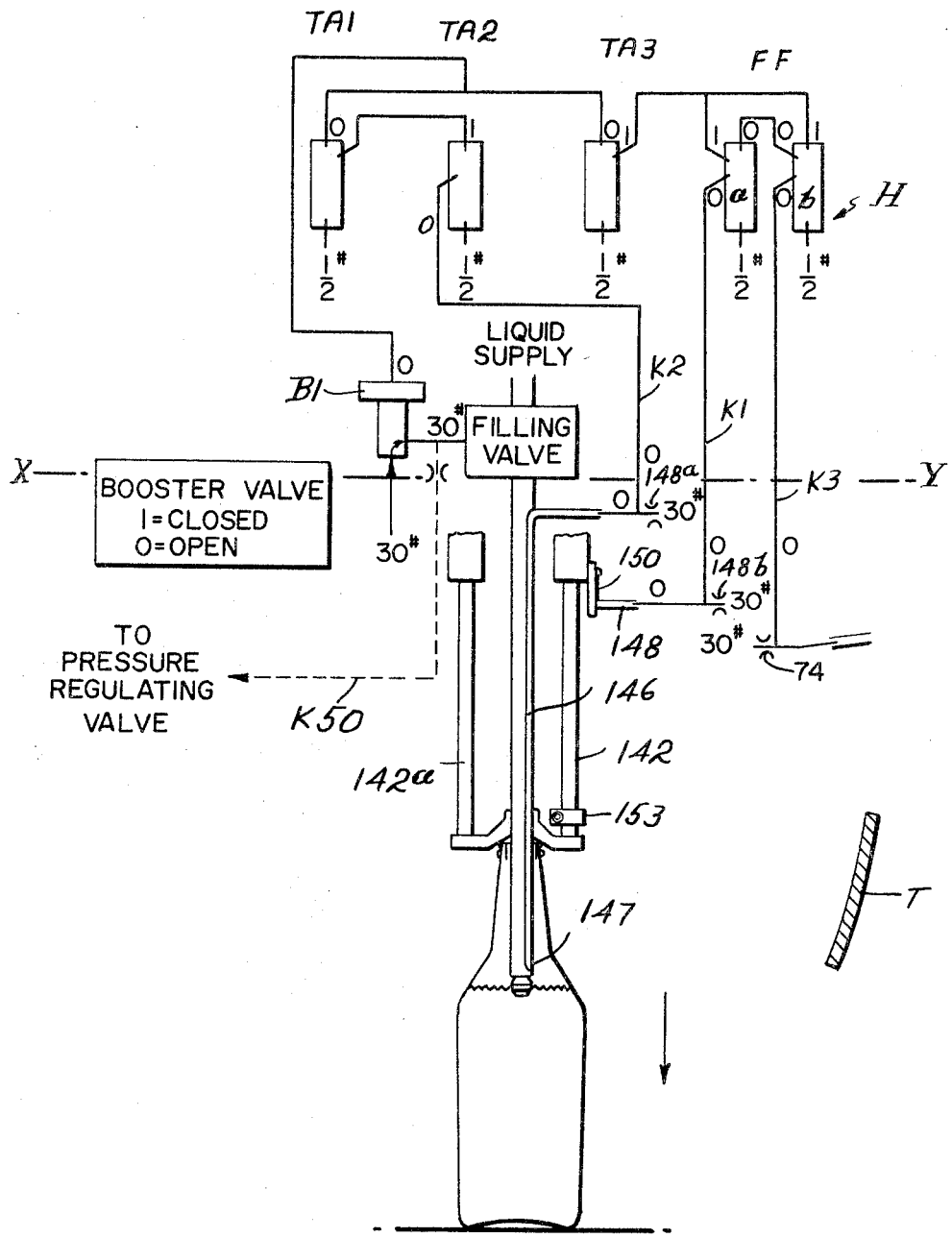
FIG. 6 is an elevation of a single filler head of one desirable type showing the valve closed.
Figures 7, 32:
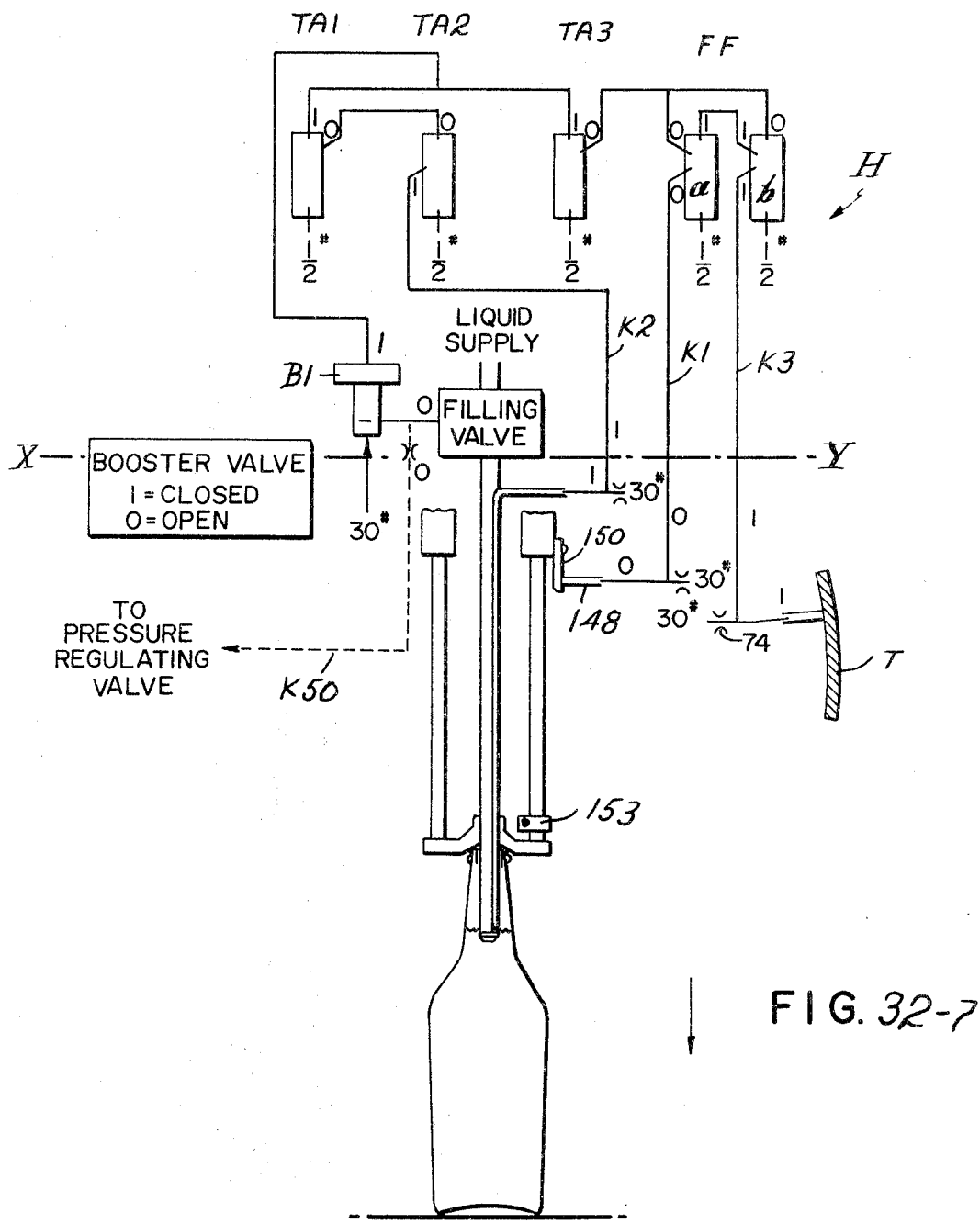
FIG. 7 is a vertical section substantially on the line 7—7 of FIG. 6.

FIG. 13 is a horizontal section on the line 13—13 of FIG. 7, showing the relative positions of the passages 131 and 140.

Figure 14:
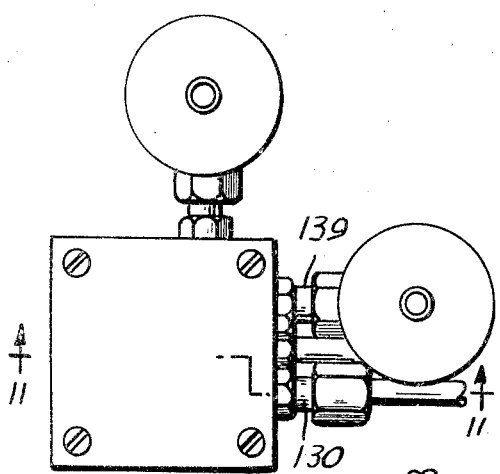
Figure 12:
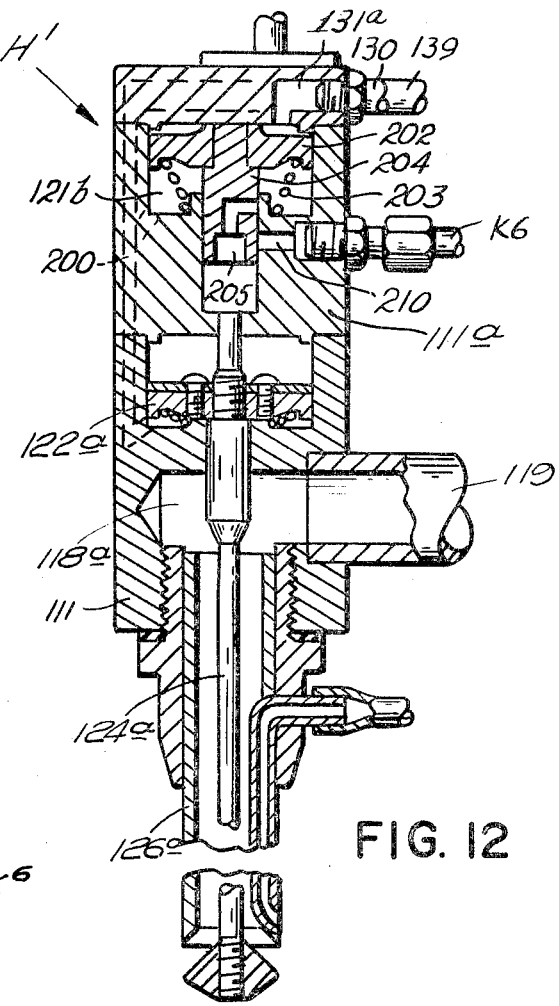
FIG. 12 is a vertical section, similar to FIG. 11, showing the filling valve open, while the suction port is closed, the latter port when open, providing for communication between the filling head and vacuum pump or alternatively, a source of pressure fluid.
Figure 11:
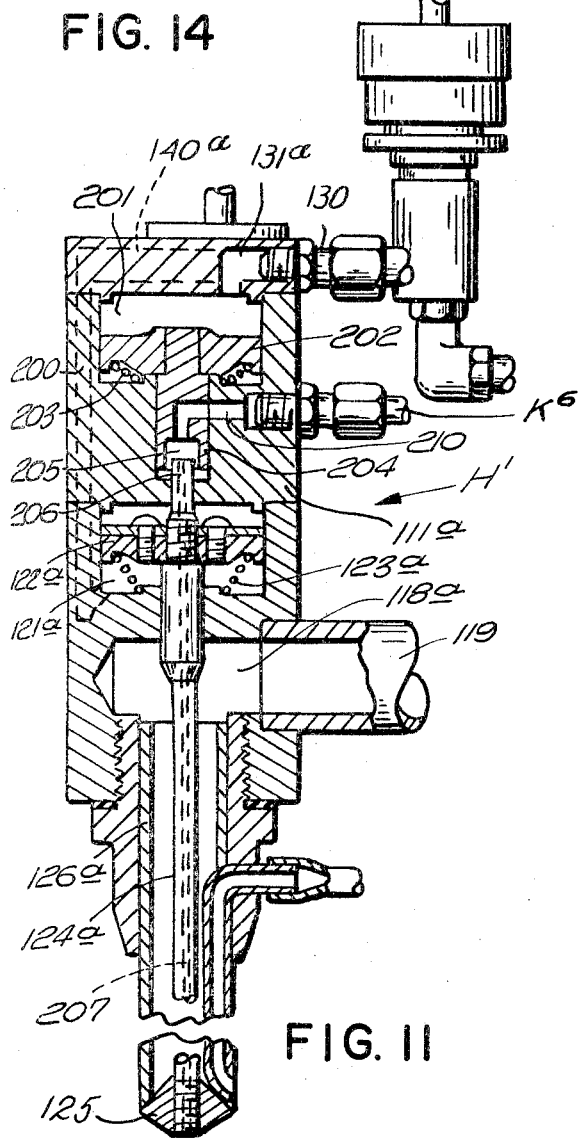
FIG. 11 is a vertical sectional view, similar to FIG. 7, but showing a filler head of modified construction designed to provide means whereby the end of the filling tube may be made to communicate with a vacuum pump and/or to permit the supply of a neutral gas to the container before the filling operation commences, the valve being closed.
Figure 16:
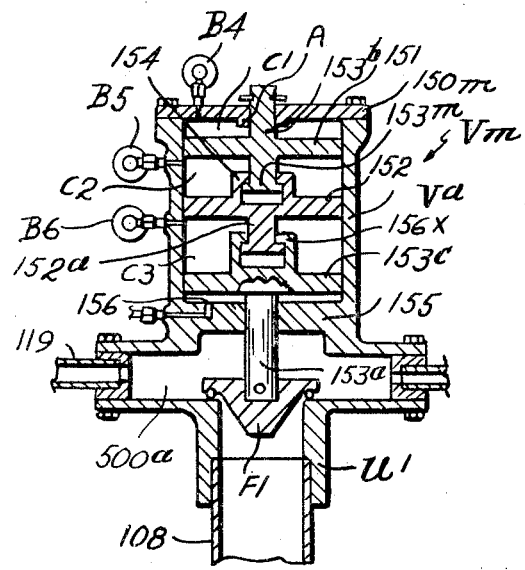
Figure 17:
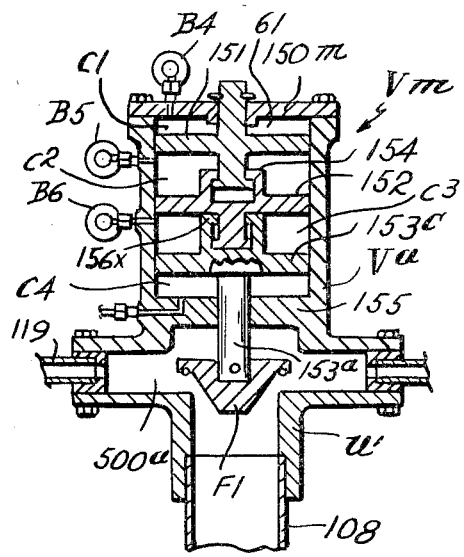
Figure 18:
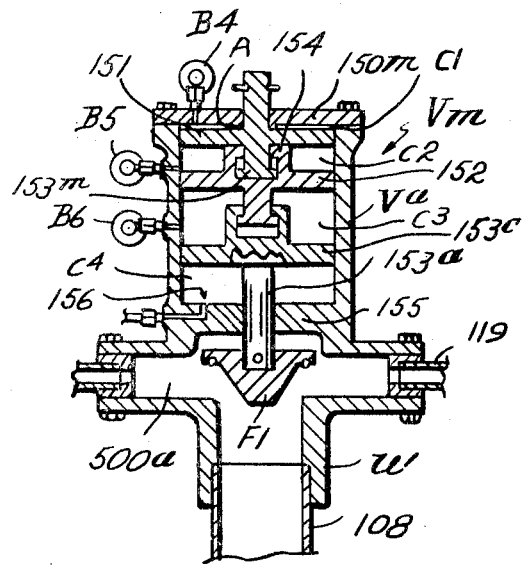
Figure 19:
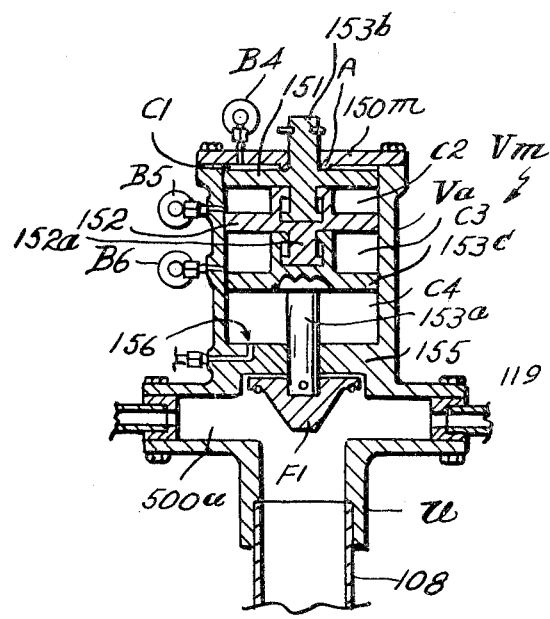
Figure 25:
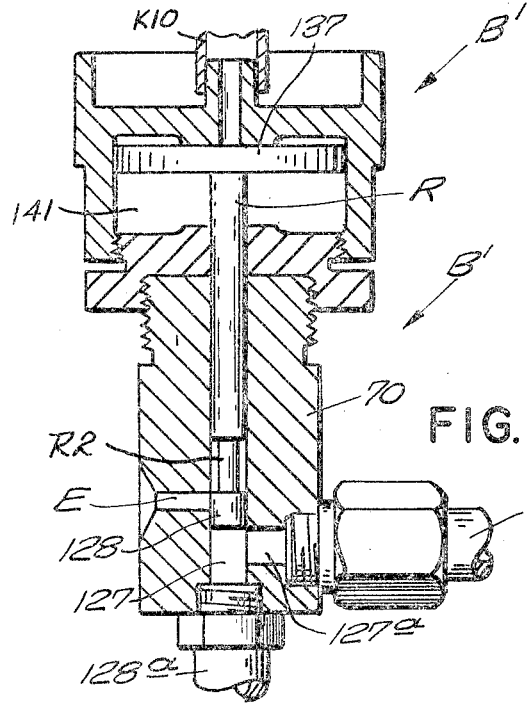
Figure 26:
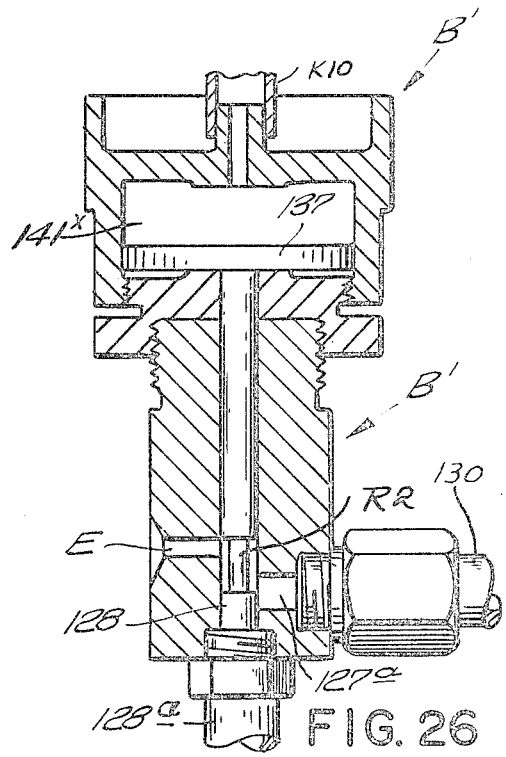
Figure 28:
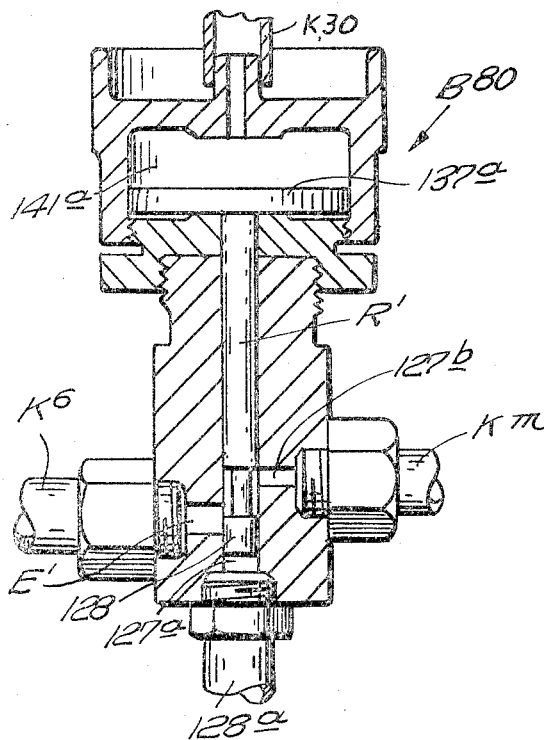
Figure 27:
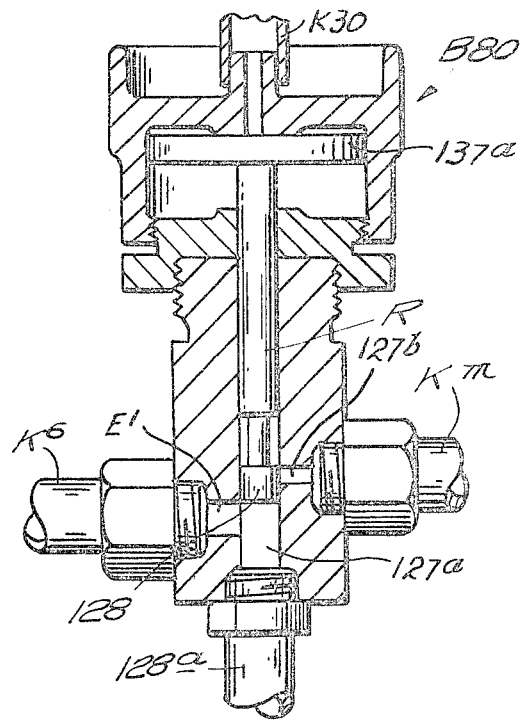
Figures 2, 33:
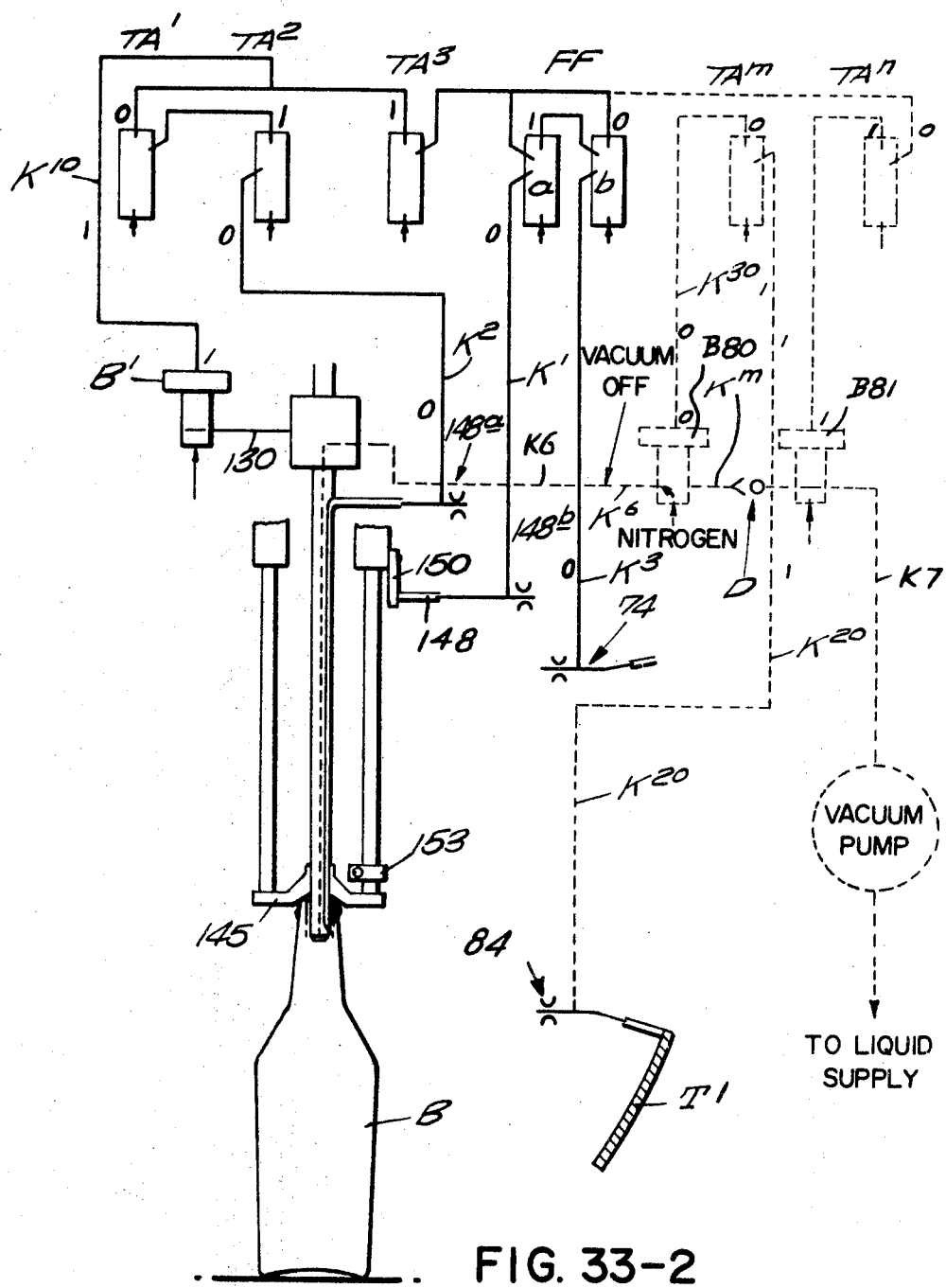
Figures 3, 33:
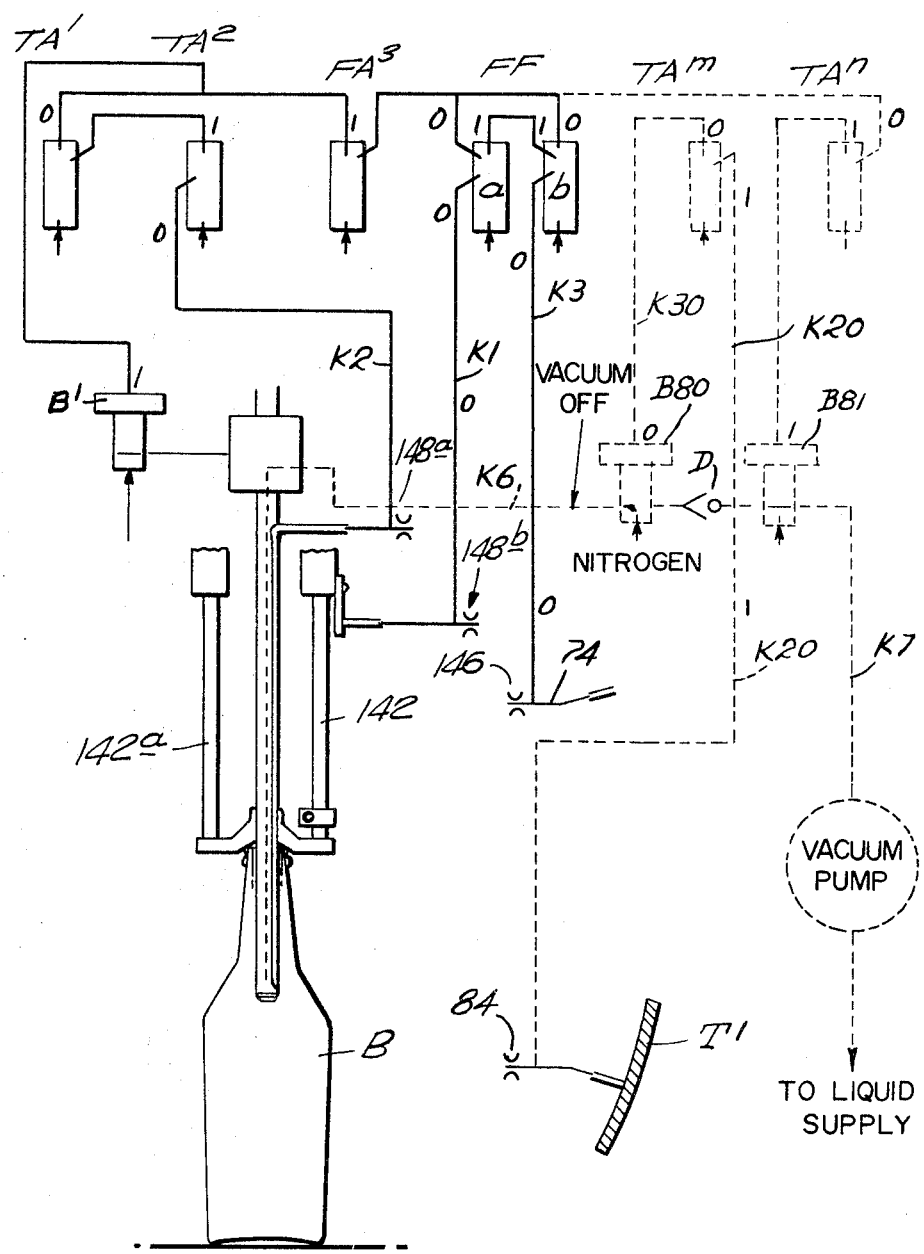
Figures 4, 33:
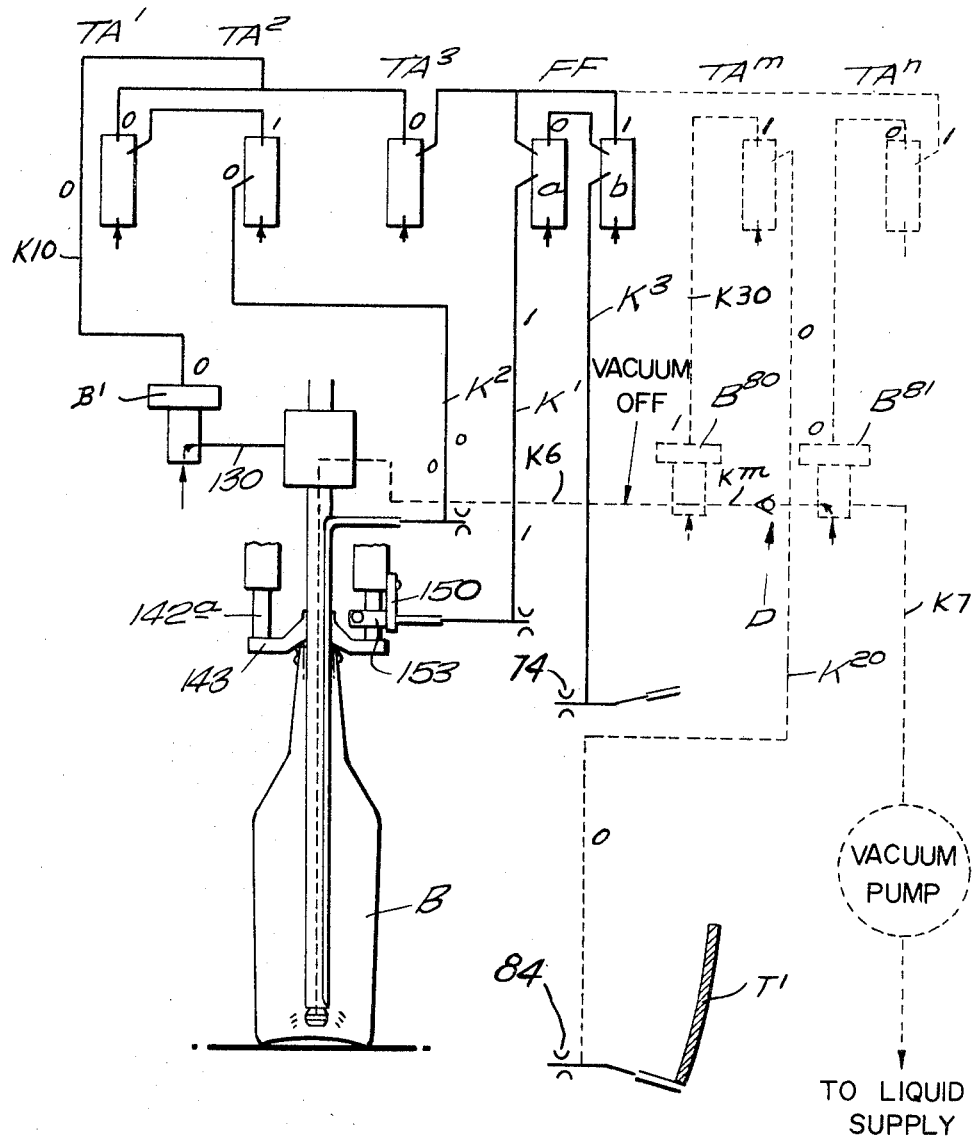
Figures 5, 33:
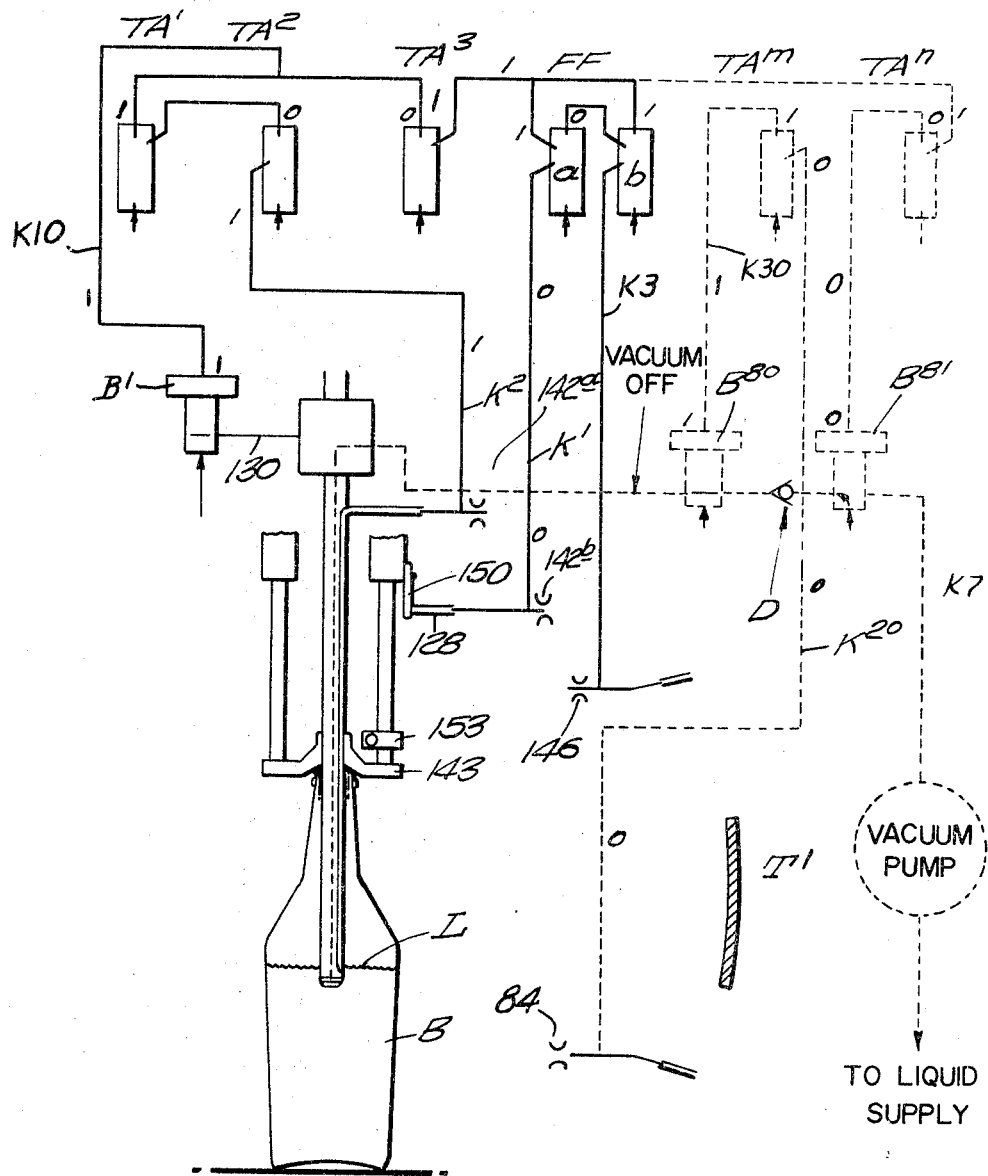
Figures 6, 33:
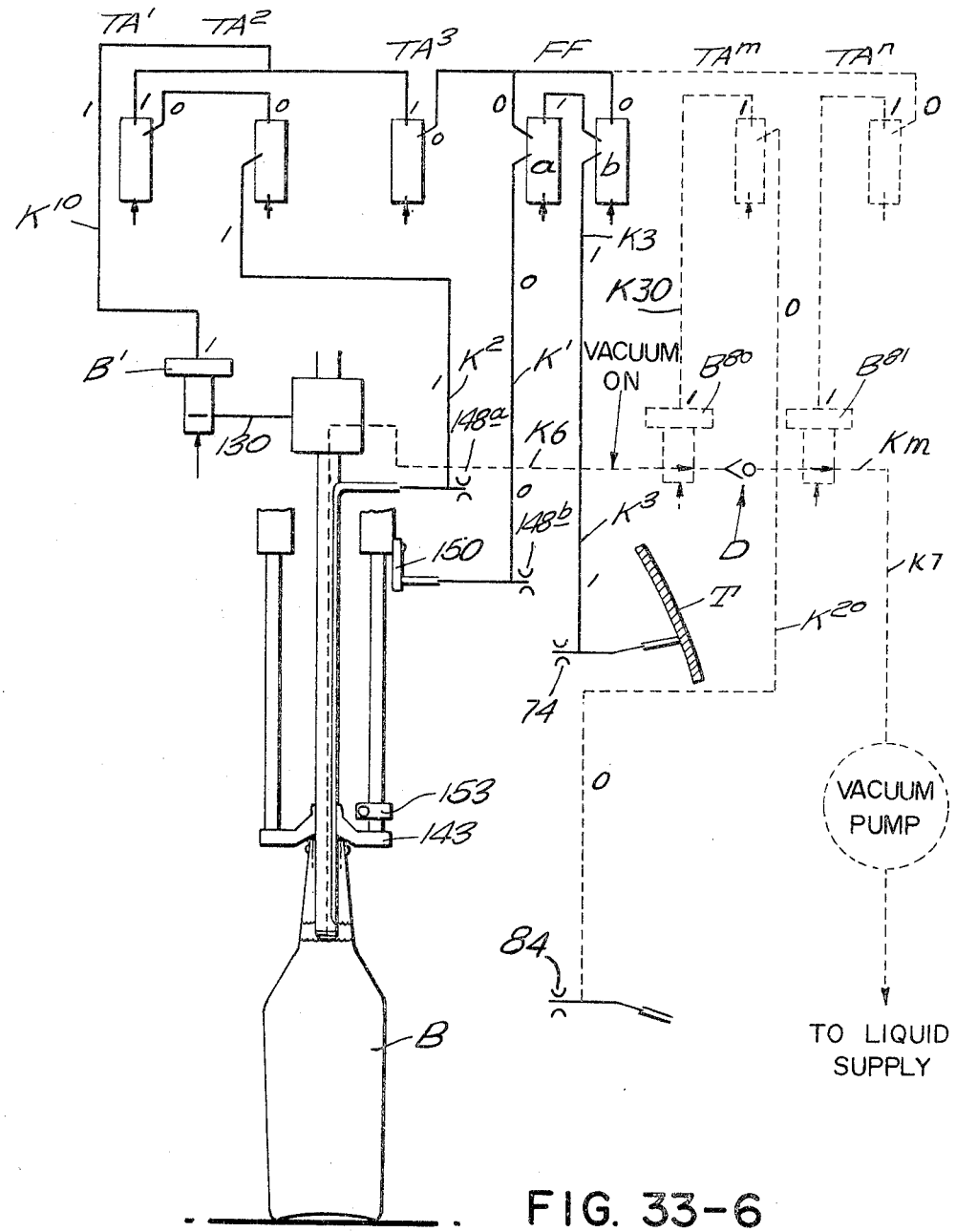
Figures 7, 33:
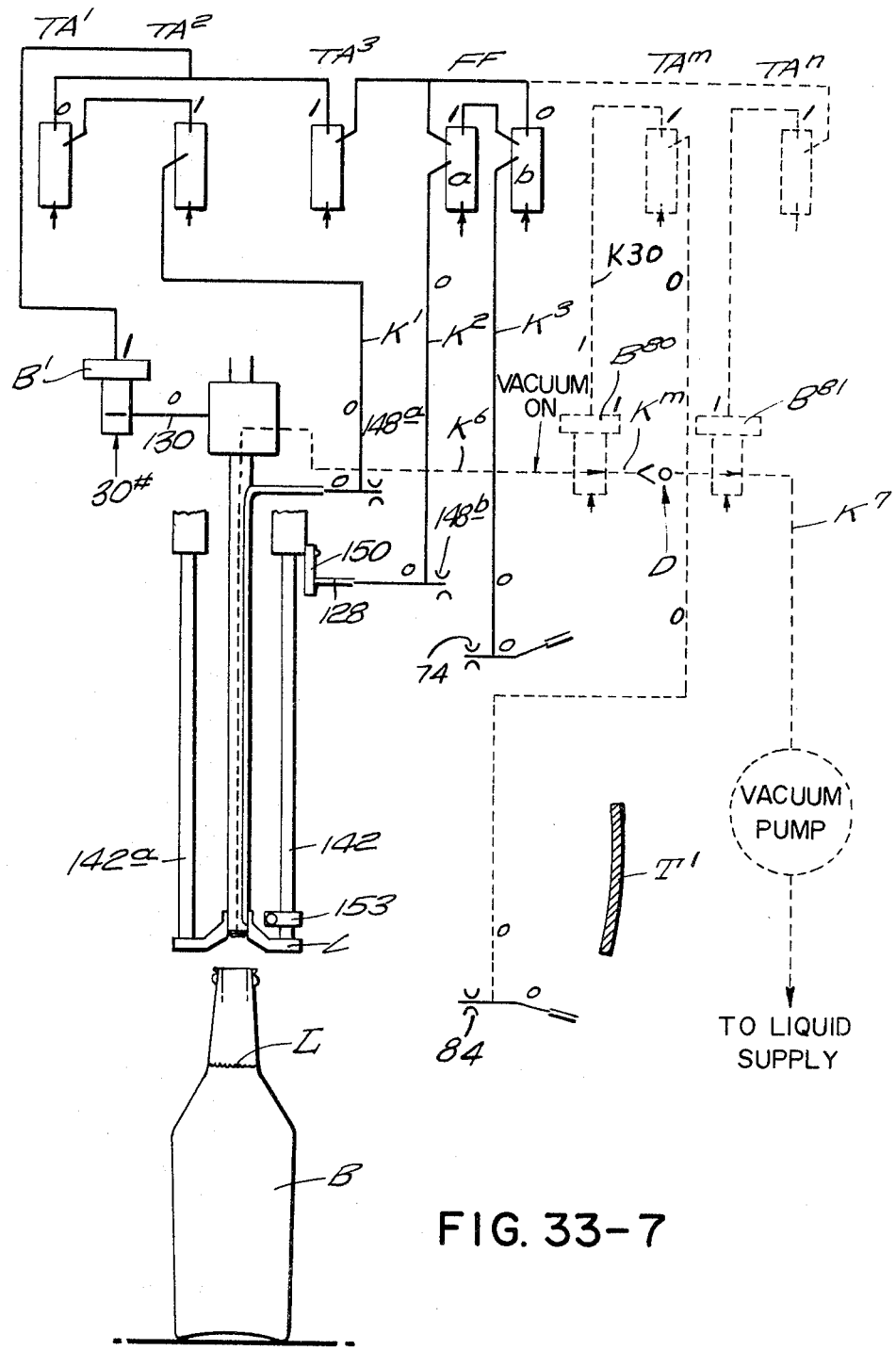
Figures 1, 34:
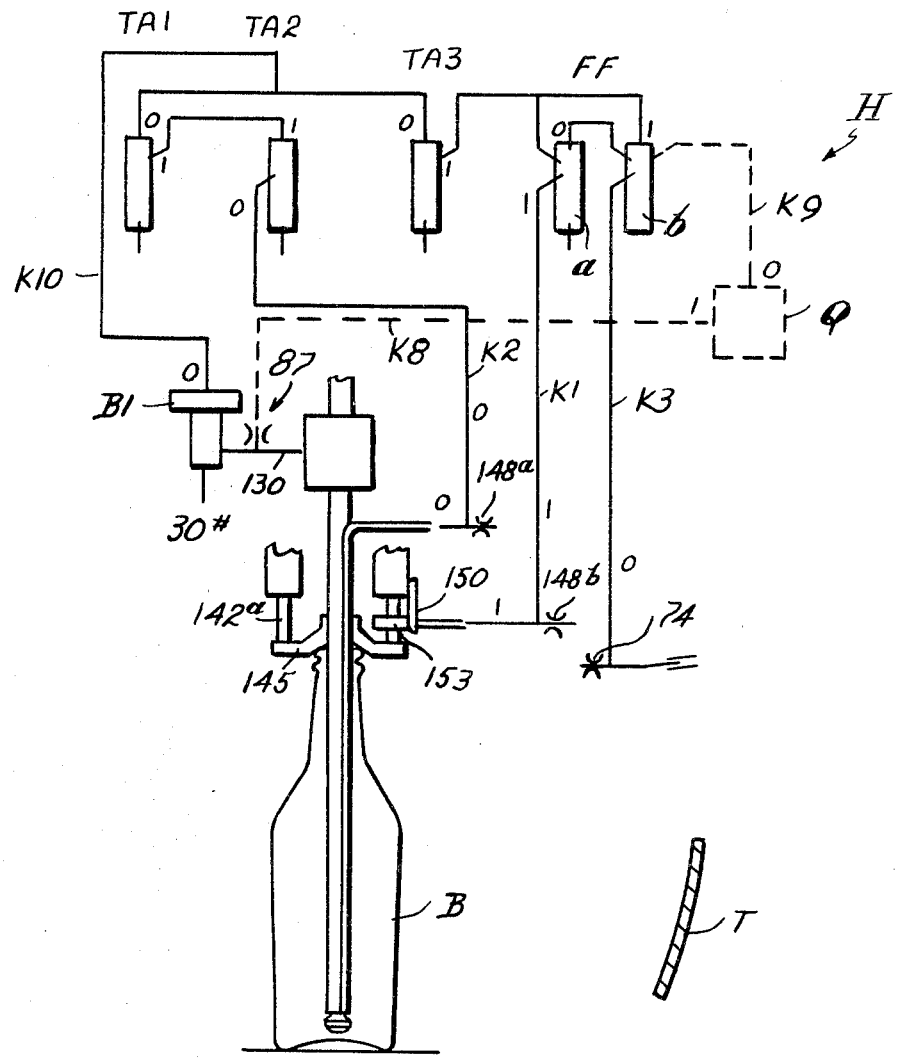
Figures 1, 35:
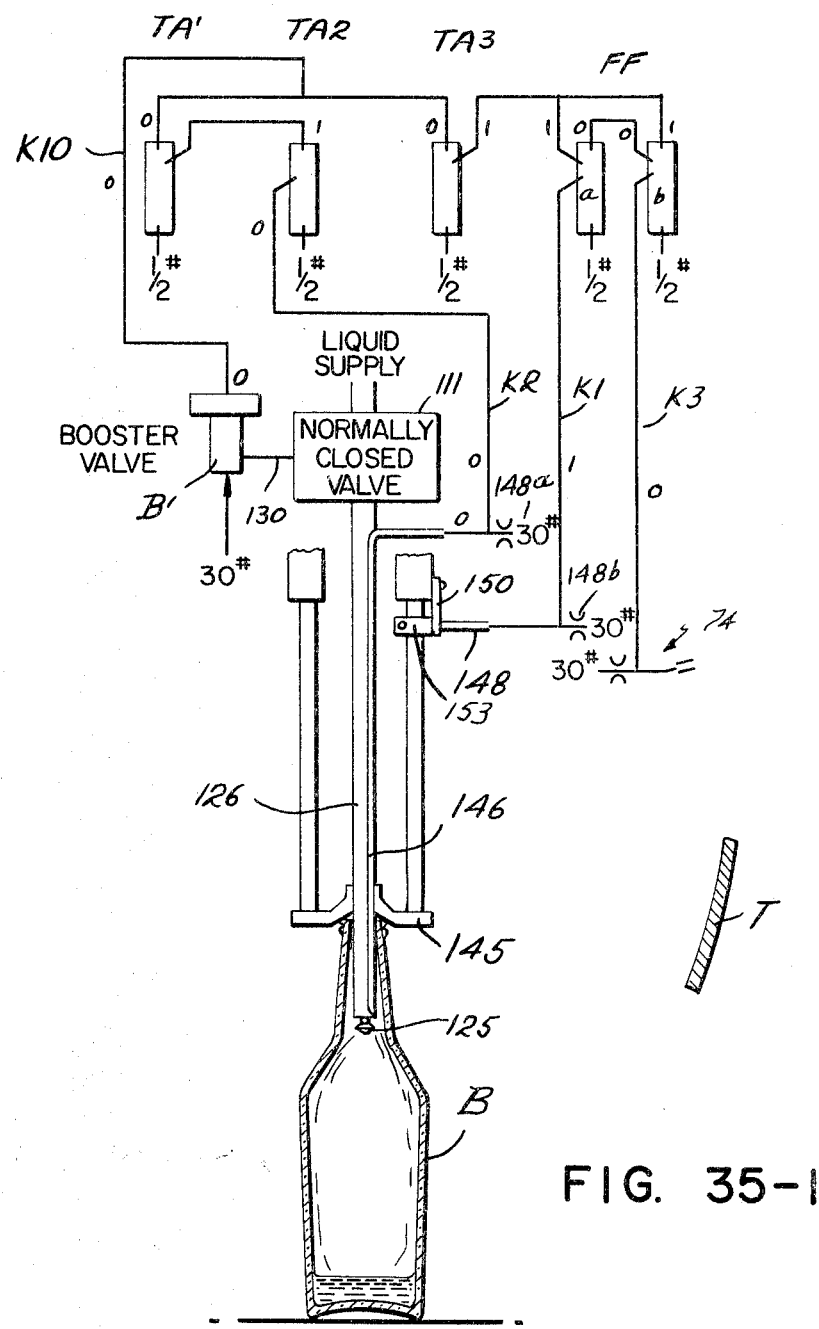
Figures 2, 35:
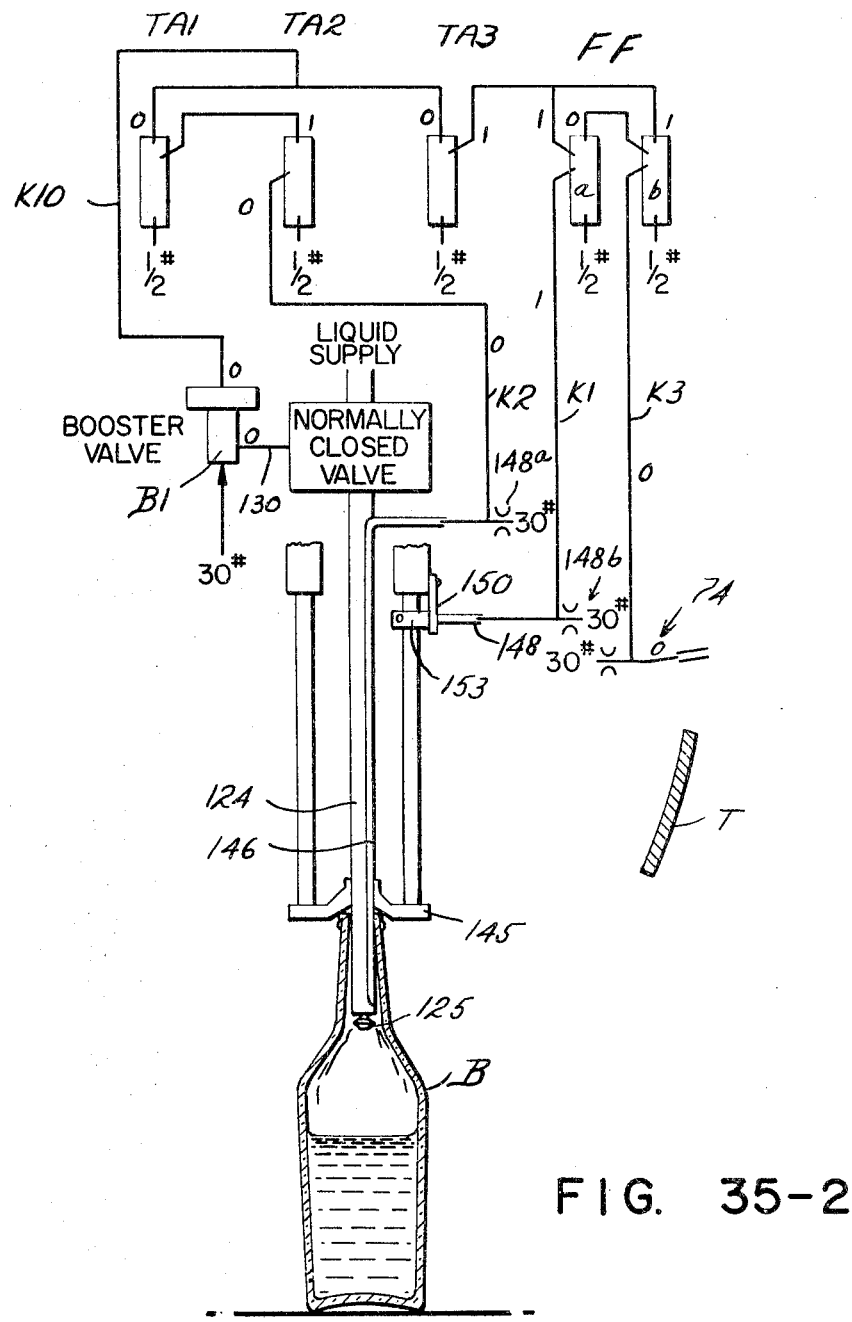
Figures 3, 35:
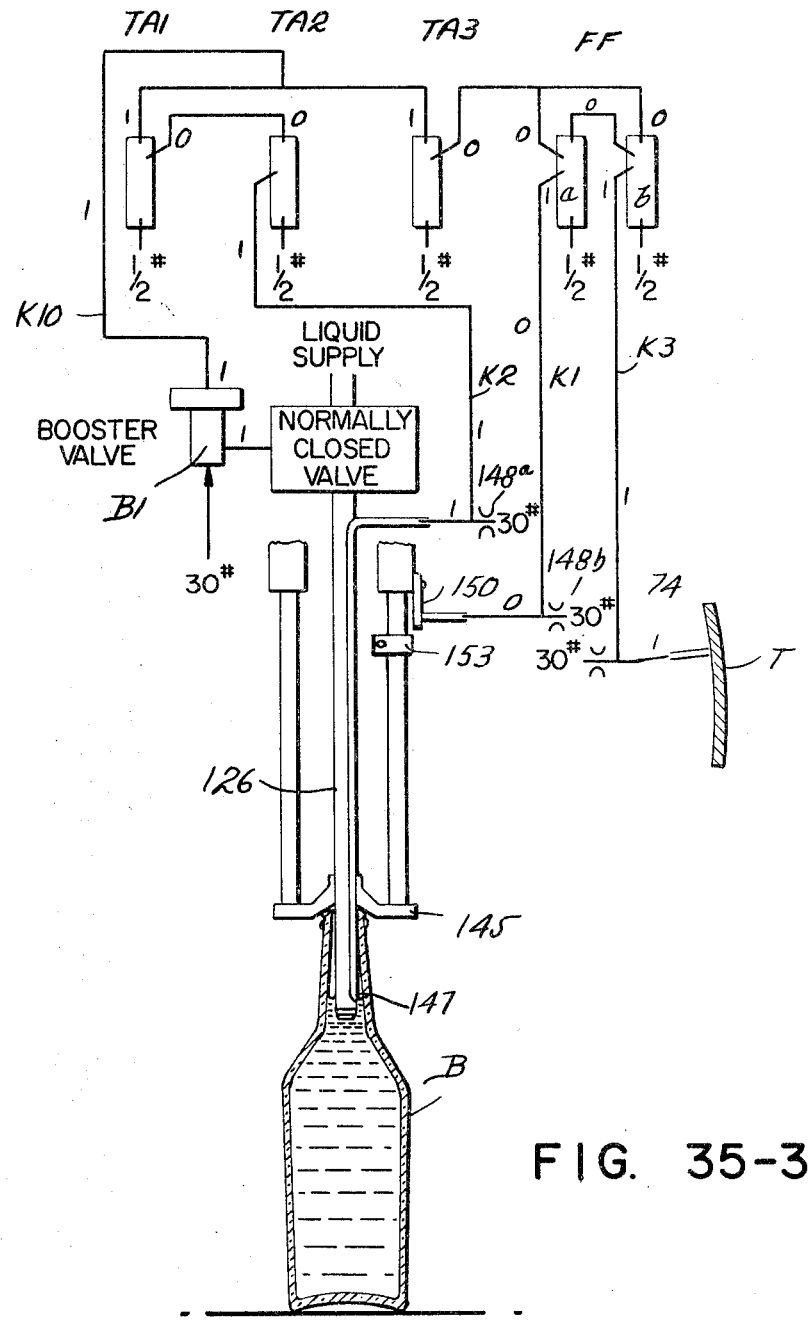
Figures 1, 36:
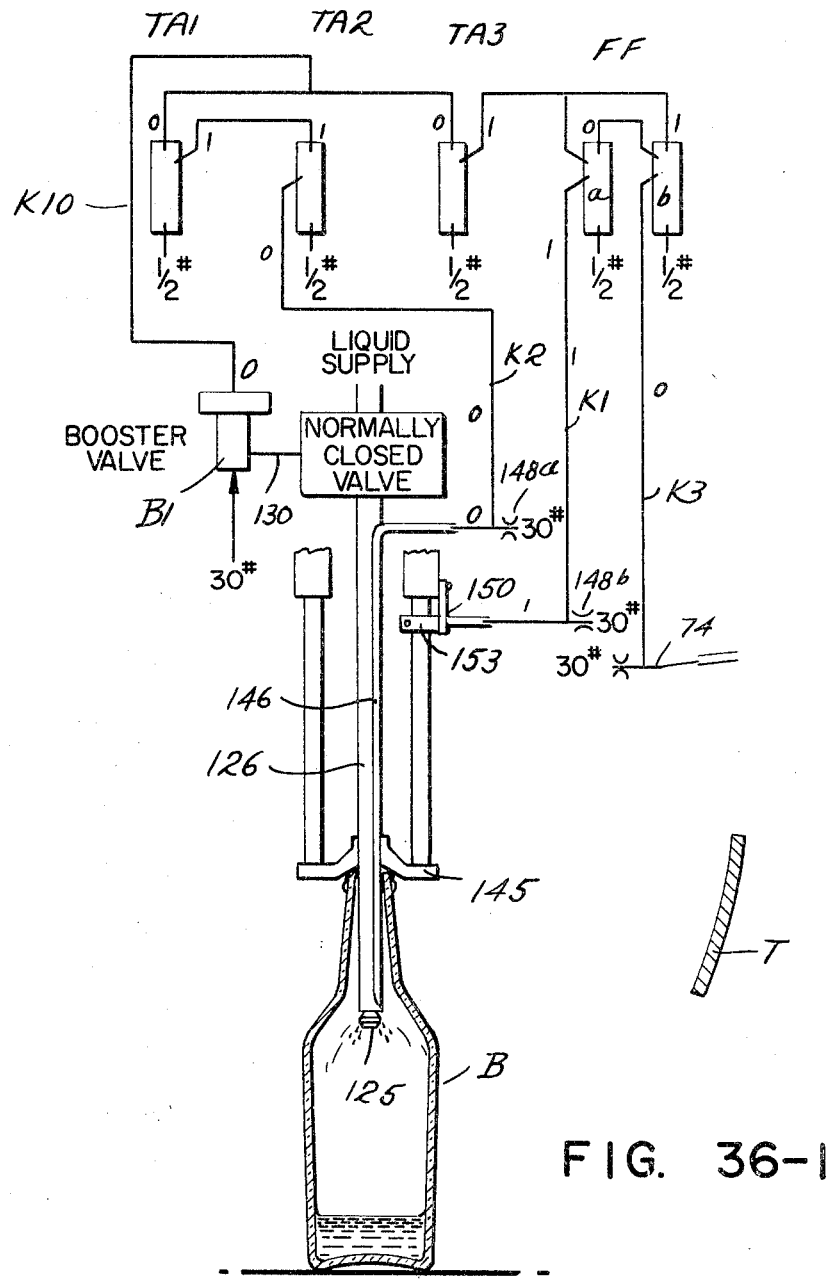
Figures 2, 36:
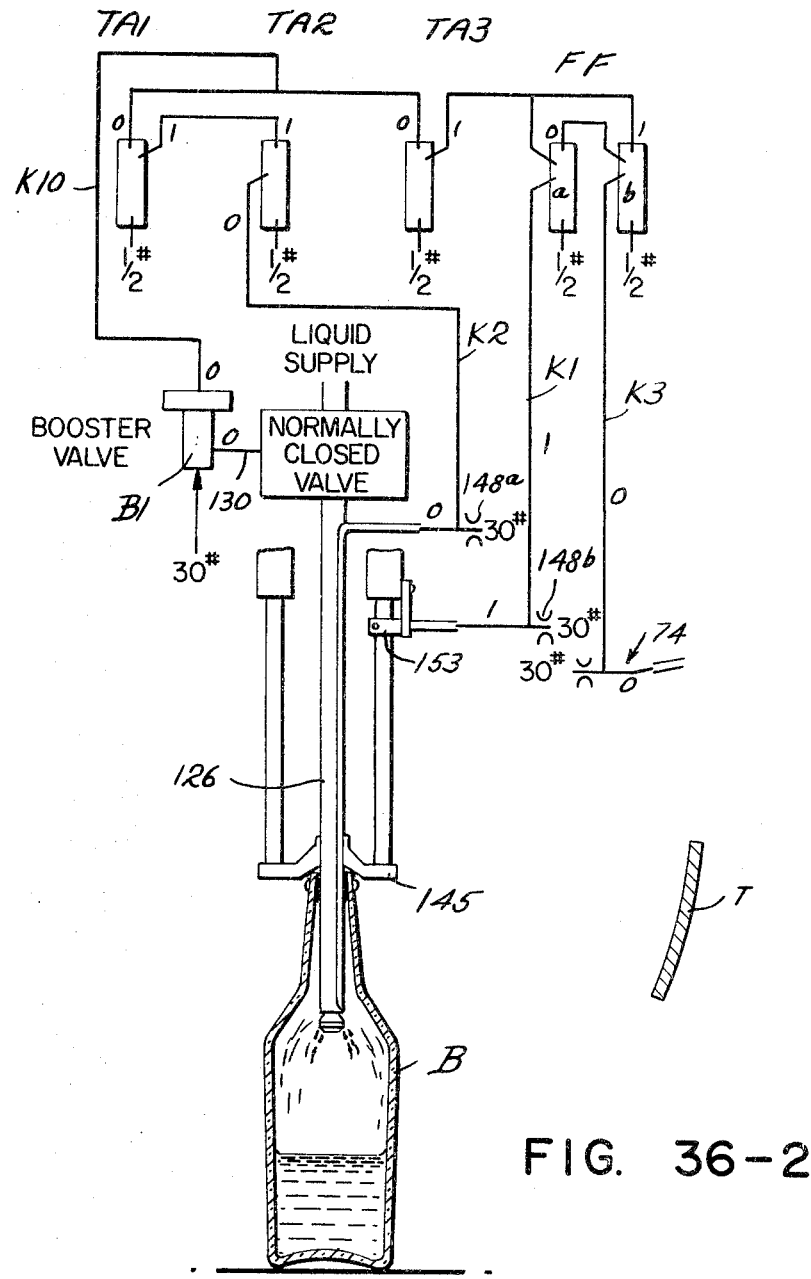
Figures 3, 36:
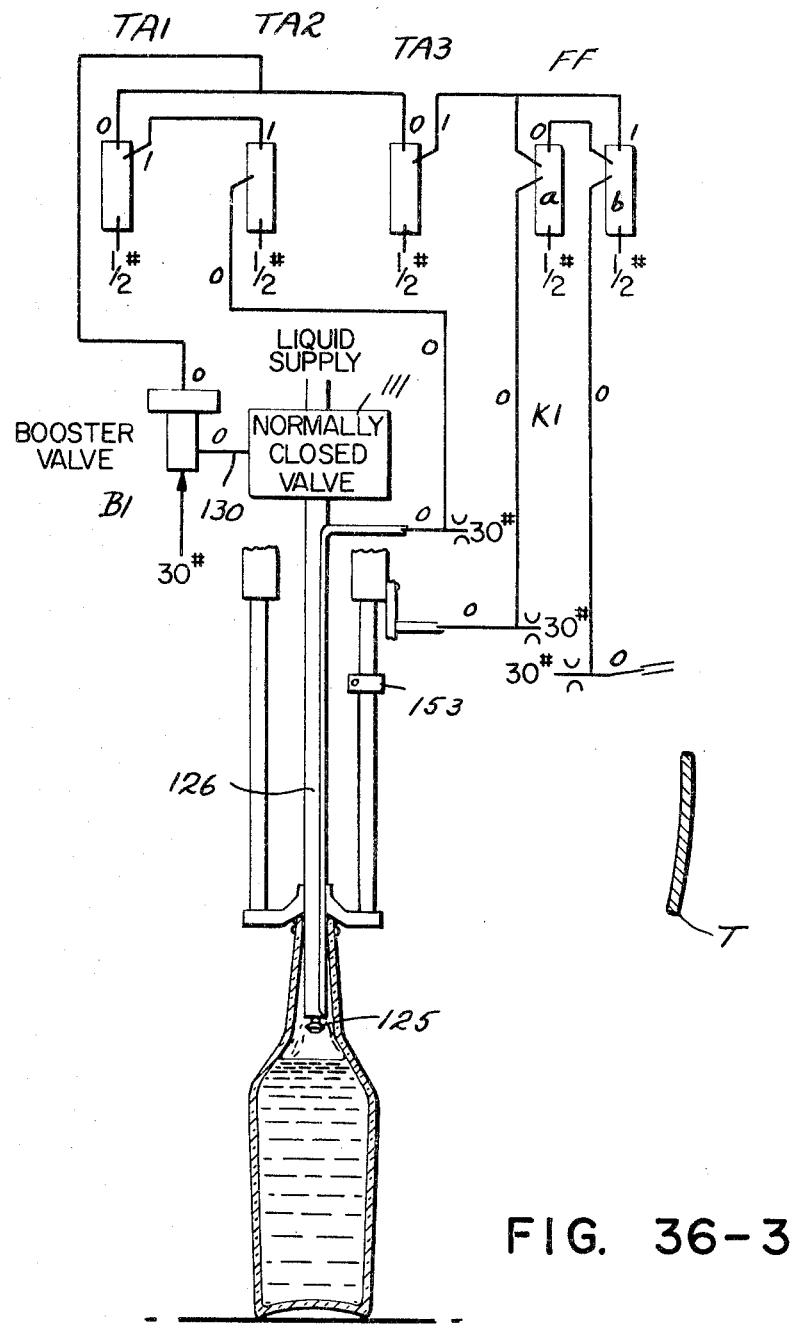
Figures 4, 36:
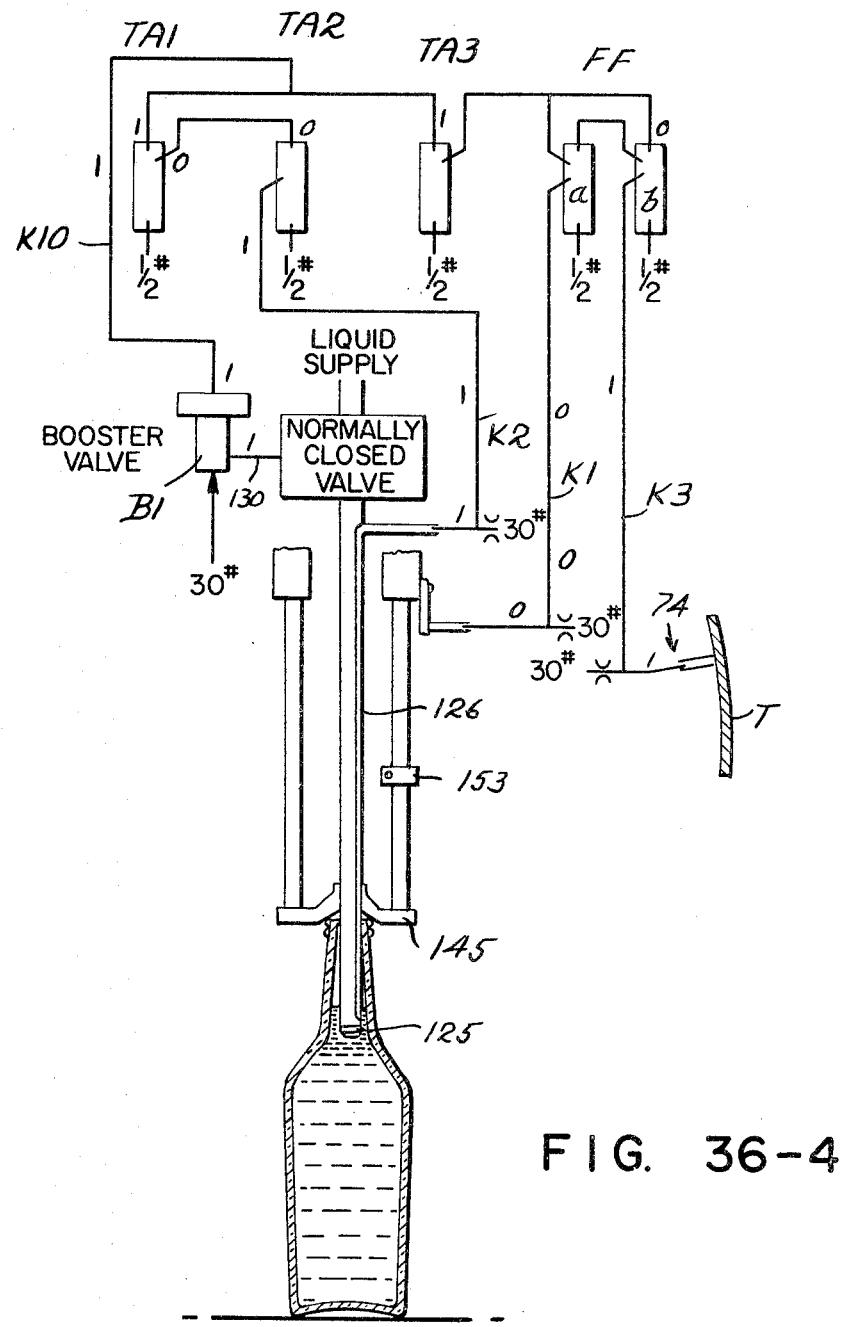

FIG. 14 is a plan view of the valve of FIG. 11;

FIG. 15 is a fragmentary section in the same plane as FIG. 11, but to larger scale than FIG. 11, showing the filling valve open;

FIG. 16 is a radial section through a regulating valve for controlling the quantity of fluid available at various times to the several filling heads, the valve being shown completely closed;

FIGS. 17, 18 and 19 are views similar to FIG. 16, but showing the valve open to different amounts, respectively, so as to admit successively larger volumes of liquid to the filler heads;

FIG. 20 is an elevation, partly in vertical section, showing a commercial type of valve which may be used under some conditions in substitution for that illustrated in FIGS. 16 to 19 inclusive;

FIG. 21 is a fragmentary elevation to approximately the same scale as FIG. 3, diagrammatically showing a single filling head with its vertical filling tube, and with the vertically slidable centering bell for guiding the top of the bottle into centered relation to the tip of the filling tube, the casing which houses the valve-actuating parts being diagrammatically represented by a simple rectangle;

FIG. 22 is a horizontal section, to larger scale, on the line 22—22 of FIG. 21;

FIG. 22a is a fragmentary elevation, to smaller scale, illustrating a modification of the arrangement of FIG. 22;

FIG. 23 is a fragmentary elevation, to larger scale than FIG. 21, showing an element, which constitutes a part of the filling head, wherein there is an orifice which functions in the fluid logic control;

FIG. 24 is a view similar to FIG. 23, but showing an orifice-closing element in operative relation to the orificed part shown in FIG. 23, and so disposed as to close the orifice in the latter part;

FIG. 25 is a diagrammatic vertical section illustrating a so-called "booster valve" of commercial type which is employed in the herein described fluid logic system for the control, for example, of a single filling valve;

FIG. 26 is a section similar to FIG. 25, but showing the movable parts of the valve differently positioned;

FIG. 27 is a vertical section showing another commercial type of booster valve useful, for example, in the establishment of suction at the delivery end of the filler tube or alternatively for providing for the delivery of a neutral gas to the filling tube;

FIG. 28 is a view similar to FIG. 27, but showing the valve parts so positioned as to form a passage to provide communication between the filling tube and vacuum pump;

FIG. 29 is a plan view, partly broken away, illustrative of the essentials of a fluid logic module of the type commonly referred to as a "turbulence amplifier";

FIG. 29a is an edge elevation of the device shown in FIG. 29;

FIGS. 30 and 31 are diagrams illustrative of the symbolic method of calibrating fluid logic diagrams;

FIGS. 32–1 to 32–8 are diagrammatic views useful in describing a fluid logic system and its mode of operation in controlling the filling apparatus disclosed, by way of example, in FIG. 5;

FIGS. 33–1 to 33–7 are diagrammatic views illustrating a fluid logic system for controlling the operation of apparatus wherein provision is made for applying suction to the end of the filling tube to remove drip or for reducing the height of the liquid in an overfilled container, and also for introducing an inert gas to the container before filling commences;

FIGS. 34–1 and 34–2 are diagrammatic views illustrative of an arrangement whereby the filling valve is automatically closed in the event of an unduly prolonged filling cycle;

FIGS. 35–1 to 35–3 are diagrammatic views illustrating a fluid logic system for controlling the operation of apparatus such as disclosed in FIG. 4;

FIGS. 36–1 to 36–4 are diagrammatic views illustrating fluid logic system suggesting a modification of the operation as described with reference to FIGS. 32–1 to 32–8; and FIG. 37 is a diagrammatic view (showing the regulating valve of FIG. 16 in section) illustrating the fluid logic system whereby the regulating valve is controlled.

Although the present invention is of broader utility, for example, in machines of that type in which the containers, while being filled, are moved along a rectilinear path, the invention is herein specifically illustrated and described as embodied in a machine of the rotary type of which a good example may be found in the patent to Meyer, No 2,500,465, dated Mar. 14, 1950, to which reference may be had for such details; for example, those relating to a supporting structure, driving means, means for supplying empty containers and for carrying filled containers away, as may be omitted from the present disclosure. Herein for ease in description and because certain features which will be described hereinafter are specifically relevant to bottles, the containers which are to be filled are illustrated and most frequently are referred to as "bottles" but it is to be understood that as to its broader features, at least, the invention is to be considered as relevant to the filling of containers in general.

Referring to FIGS 1 and 4, the bottles which are to be filled are advanced toward the filling machine by a conventional flat-top conveyor C and into the path of the helical spacer unit S which delivers the containers, which, as above noted, are referred to as "bottles," one at a time to star wheels W which, in cooperation with a fixed arcuate guide G (FIG. 1) move the bottles, one after another, along a fixed dead plate Z (FIG. 2) and into a position, and in such timed relation, that each bottle is received by one of a circular series of vertically movable trays or platforms 113.

In the present application the machine (FIG. 2), more or less diagrammatically shown, comprises a base 100 on which is rigidly mounted a frame 101 supporting the stationary deadplate Z at the level of the conveyor. A rigid circular table or carrier 106 is mounted on a rotatable hollow column 107 which houses an axially arranged liquid-supply conduit 108. The lower end of the column 107 is fixed to an annular rotatable support 109. The support 109 is turned by any suitable drive mechanism including, for example, a gear 114 (FIG. 2) deriving power from an electric motor (not shown), the drive mechanism being designed to rotate the support 109, the column 107 and the carrier 106 at an appropriate speed, and to drive auxiliary devices hereinafter referred to, for example an air compressor and vacuum pump. A circular series of spaced filler heads H (FIGS. 1, 2 and 3) is mounted in spaced relation on the carrier 106. Each filler head, as hereafter described more in detail, comprises a filling tube 126 and means for opening and closing a filling valve, as well as one or more nozzles from which air is normally discharged.

In accordance with one embodiment of the invention (FIGS. 2, 3 and 4), a series of spaced tubular, vertical piston rods 110, corresponding in number to the number of filling heads, is mounted on the annular rotary base or support 109. The upper end of each piston rod (FIG. 3) has secured thereto a piston P' (FIG. 3) which is slidable within a cylinder 112 having a closed upper head constituting one of the container-supporting trays 113. Each of the cylinders 112 is provided near its lower end with a cam follower roll 115 (FIGS. 2 and 3) which engages the lower edge 116 of a normally fixed but adjustable cam 117 (FIGS. 3 and 4) by means of which the cylinders, together with the trays 113, are limited as respects upward motion. Suitable connections (not shown) supply compressed air at constant pressure to the tubular piston rods 110, thus urging the cylinders 112 with their trays 113 upwardly. The normally fixed cam 117 is operative to determine the "filled" level of the liquid and positively to move the bottle-supporting trays downwardly after the bottle is filled so as to make sure that the bottle will be separated from its associated filling head as soon as the filling operation is complete, in this way helping to speed up production. The use of pneumatic means for raising the trays has certain advantages as compared with positive means, in particular to minimize the danger of a smash because of an imperfect container.

THE FILLING CYCLE

For convenience in description of operation, certain of the bottles are numbered in FIG. 4 to identify their positions at different stages of the filling cycle. Referring to FIG. 4, a bottle advancing toward the filling position raises the guiding bell 145 of its filling head and thereby opens the filling valve as the bottle arrives at position 31. At position 31 the bottle is at such an elevation that a jet of liquid, delivered by the filling tube, first contacts the inner surface of the bottle at a point approximately at the desired level of the upper surface of the liquid when the bottle is full. The bottle continues to advance at the same level, gradually filling, and at the position 36 it should be full. At this time, the liquid, by closing the sensing tube, causes the filling valve to close, the filled bottle now moving down step-by-step until, at the position 40 it is below the end of the filling tube and at the level of the conveyor chain C¹ which then takes it to a point of discharge. If the liquid is such that it will flow rapidly in the form of an unbroken jet, the filling time is minimized by the use of the arrangement of FIG. 4 since no time is wasted in moving the end of the filling tube into close proximity with the bottom of the bottle before filling can start.

The bottle supports 113 (FIG. 4) move along a horizontal path as defined by the cam 117, from the time the time the filling starts until the filling is complete, and the delivery end of the filling tube 126, throughout the actual filling operation, is located approximately at the horizontal plane of the desired "full" level. In such an arrangement it is desirable to deliver the liquid into the bottle so as to minimize foaming. To this end, the delivery orifice should be as large as possible. Moreover, it is also helpful to deliver the liquid in an "umbrella" jet so that it will contact the adjacent surface of the bottle with minimum impact.

For the above reasons, the filling valve feather 125 (FIG. 7) herein illustrated, is shown, by way of example, as a double cone (FIGS. 7 and 7a) having an axial, screw-threaded bore for the reception of the screw-threaded lower end of the valve actuating stem 124. The extreme end of the filling tube 126 is shaped to provide a beveled valve seat 126x with which the upper surface of the valve feather cooperates, either to close the end of the tube and stop delivery or to impart to the discharging liquid, when the valve is unseated, the shape of a hollow jet, increasing in diameter, so that when the liquid contacts the inner surface of the bottle B (FIG. 7a), it is moving downwardly almost parallel to the bottle surface and thus, without harsh impact such as would tend to cause foaming, the liquid forming a thin layer moving smoothly down the inner surface of the bottle. The outside diameter of the filling tube 126 should be as great as practical with reference to the inside diameter of the bottle neck (while leaving space for the free passage of air between the tube and inside of the bottle neck), so that the annular port thus provided between the upper surface of the opened filling valve feather and the inner edge of the filling tube will be of as large a circumference as is practical, thus providing an orifice such as to reduce the velocity and thus the force of the jet to a minimum consistent with the desired rate of fill. While a valve of the type just described is especially useful when the delivery end of the filling tube remains at the same position relatively to the top of the bottle neck throughout the filling operation, as in the arrangement of FIG. 4, the same valve may also be useful in other embodiments of the invention.

In FIG. 4a there is shown an arrangement substantially like that of FIG. 4, except for the shape of the cam 17a which at all times determines the elevation of the bottle. Thus, in this device the bottles, advanced by the supply conveyor C, are taken one-by-one by the trays 113, and, as the trays advance, successive bottles, as indicated by the series I–VIII, are raised until, as shown, a bottle at position IV is at the point at which filling starts. In rising from the position III to position IV, a bottle, by engagement with the bell 145, will have initiated the opening of the filling valve. At position IV the bottle and delivery tube are so relatively disposed that the lower end of the delivery tube is within the shoulder portion of the bottle, a location at which less foam is produced than though the filling tube were located with its delivery end in the bottle neck. Moreover, the disposal of the tube end at this location is less time-consuming than though the delivery end of the tube were to be located near the bottom of the bottle when the filling starts. The cam 117a is so contoured that from the position IV to the position 33 the relation of the bottle and filling tube remains unchanged. By the time the bottle reaches the position 33, the liquid level will have risen until it has reached or nearly reached the delivery end of the filling tube. At this point, as shown at 17x (FIG. 4a) the cam 117a dips downwardly, allowing the bottle to descend to a lower level with the result that the delivery end of the filling tube, when the bottle is at positions 35, 36 and 37, will be within the neck portion of the bottle. The filling valve is still open since the liquid level has not as yet reached the end of the sensing tube and while the bottle remains at this level the liquid rises still further until it occludes the delivery end of the sensing tube with consequent closing of the filling valve. At this time the level of the liquid in the bottle may be above the proper fill level. By applying suction to the filling tube while the bottle is at this level, surplus liquid may be withdrawn, the cam now having a further dip which allows the bottles to descend down through the positions 38, 39 and 40, to escape the centering bell 145, and the filled bottle is discharged onto the conveyor C¹. The above sequence of operations is that which results from the shape of the cam 17a and fluid-logic control illustrated in FIGS. 36–1 to 36–4 respectively as hereafter more fully described.

In the alternative arrangement disclosed more fully in FIG. 5 of the drawings, each bottle-supporting tray or platform 113 is secured to the upper end of a corresponding, vertically slidable rod 46 guided in fixed guide sleeves 47 and having a cam follower roll 48 at its lower end which contacts the upper edge of a normally stationary cam 49. In plan, this cam is a circular arc concentric with the axis of the rotary support 106 (FIGS. 1 and 2) and has an upper edge so contoured as to effect the raising of the bottles preparatory to filling while allowing the bottles to descend by gravity when being filled.

As the container advances toward filling position it is elevated to the position indicated by the numeral 17 (FIG. 5) by the cation of the cam 49. When it reaches the position 17 the delivery end of the filling tube (which in this arrangement must be at least as long as the bottle height) which entered the bottle as the latter rose, but which does not move up or down, is very close to the bottom of the bottle. In rising, the bottle top contacted and raised the corresponding centering bell 145 and as the bottle arrived at the position 17 the filling valve opened. The liquid now starts to flow into the container and continues flowing until it closes the open lower end of a sensing tube hereinafter described, whereupon the filling valve closes. However, the bottle continues to move downwardly and the downward motion of the bottle, as determined by the cam, lowers the liquid level below the sensing tube whereupon the filling valve again opens. This action may be continued until the bottle reaches the positions indicated at 19, 20 and 21, where it travels in a horizontal plane as determined by the contour of the cam 49. This cam can be adjusted up and down to change the filling height. Somewhere between the bottle positions 19, 20 and 21 the liquid level is brought to an accurate predetermined height; and with the filling valve closed, the bottle continues to travel while making a further drop as shown between the positions 22 to 25 where it is now at the same level as it was when it was first placed upon the supporting tray. At position 25 the bottle is clear of the filling tube, and is discharged into the conveyor C¹.

While as just above described the filling valve may open and close repeatedly during filling, it is possible by proper adjustment, to have the extreme lower end of the sensing tube remain just above the surface of the liquid as the bottle moves down while the filling valve remains open, until the bottle is filled, thus providing maximum efficiency.

Ideal filling is achieved for highly foamable liquids when the speed of the machine and the rate of fill is adjusted so that the lower end of the filling tube maintains a position just below or at the liquid surface while the liquid level follows the tube tip as the base of the container moves down. Desirably the liquid surface does not cover the sensing device during 90 percent of the filling cycle and the filling tube valve remains open until the container is 90 pjercent full. During the last 10 percent of fill the valve will open and close to provide accurate fill as measured by the sensing device. For a given machine speed the rate of fill can be established by controlling the liquid supply pressure.

It would be possible, if desired, to use penumatic cylinders as the container-elevating means in the apparatus of FIG. 5, and to use rigid cams as the container elevating means in the apparatus of FIG. 4.

THE BOOSTER VALVES

FIGS. 25 and 26 illustrate a differential pressure valve, which may be of commercial type, herein termed a "booster valve." As illustrated, the booster valve B¹ of FIGS. 25 and 26 comprises a casing 70 having a vertical bore whose lower part constitutes a chamber 127 within which slides a piston-valve 128 fixed to a piston rod R which slides in said vertical bore. A radial branch passage 127a leading from the chamber 127 communicates, at times, by means of a tube 130 with the chamber 140a of the filling head (FIG. 7). At its lower end the vertical bore of valve B¹ is open to a tube 128a which supplies pressure fluid at a constant pressure of 30 p.s.i. At its upper end the rod R is fixed to a piston 137 which slides in a chamber 141 of a diameter much larger than that of the vertical bore. The space above the piston communicates with a tube or passage $K^{10}$ constituting an element of the fluid logic system as hereafter described.

The piston rod R has a peripheral channel R2 just above the piston valve 128 which, at times, communicates with an exhaust port E. When the valve is loaded (FIG. 26) by low pressure fluid acting on the upper face of the larger piston 137, the relatively small piston rod is pushed down in opposition to the upwardly acting higher pressure in the chamber 127a, thus moving the piston valve 128 downwardly to the position of FIG. 26, where the chamber 127a communicates with the exhaust port E, but pressure fluid from the tube 128a is cut off.

When the booster valve B1 is unloaded, the pressure fluid in tube 128a pushes the piston valve up and finds free passage through the chamber 127a to the tube 130 and thus forces the pistons 122a and 201 down and opens the filling valve.

In FIGS. 27 and 28 a modified booster valve B80 is illustrated (also of commercial type), the construction of which is substantially like that of valve B1 of FIGS. 25 and 26, with the exception that the chamber 127b of this modified valve B80 is at a higher elevation than the chamber 127a of booster valve B1 and with a passage E1 (which is an exhaust passage in valve B1) at a lower point and communicating with a tube designated K6 in FIGS. 27 and 28. When the valve B80 of FIGS. 27 and 28 is unloaded, as in FIG. 27, the constant fluid pressure of 30 p.s.i. in the tube 128a forces the piston 128 up and provides communication between the tube 128a and the tube K6 so that the pressure fluid from the tube 128a may flow out into the tube K6. On the other hand, when the piston 137a is loaded by pressure fluid (FIG. 28) the piston 128 is moved down and the tube K6 then communicates with a tube $Km$ (FIG. 33–1) while the pressure fluid from the tube 128a is shut off.

THE REGULATING VALVE

In order accurately to meter the quantity of the liquid which is available to the filler heads so that each filler head may receive neither too little nor too much liquid (without varying the pressure of the liquid) there may be provided, for this purpose, as herein illustrated, a commercial type of regulating valve $V^2$ (FIG. 20), this valve comprising a hub U having radiating tubular nipples N for the reception of the inner ends of radial distributing tubes 119 (FIGS. 1, 3 and 20) which supply the liquid to the several filler heads H. The hub U is designed to receive the upper end of the conduit 108 (which rotates with the column 107 and the carrier 106 on which the distributing heads are mounted). this conduit 108 being connected leak-tight at its lower end in any suitable manner (not shown) to an appropriate liquid supply conduit J (FIG. 2). The casing of this regulating valve $V^2$ has a chamber 500 (FIG. 20) with a port in its lower wall defined by an annular valve seat with which there cooperates a vertically adjustable conical valve feather F, fixed to a stem 510, for controlling the upward flow of liquid from the conduit 108 into the chamber 500. A conventional automatic device 520, responsive to variations in the pressure in the chamber 500, acts to control mechanism (not shown) in the valve casing, for adjusting the valve feather so as to maintain a uniform predetermined pressure within the chamber 500 with which the tubes 119 communicate.

Since the amount of lift of the valve feather F determines the rate of supply of the liquid to the several filling heads, it follows that if the pressure in conduit 108 is constant, then, in accordance with the amount of lift of the valve feather F, the amount of fluid per unit of time available to the filling heads will be varied accordingly.

Since, in a machine of this general type, a substantial fraction of the total time of travel of a bottle from the time it enters, empty, into the machine until the filled bottle is delivered, is used in moving the bottle up to and down from the filling level and is thus not utilized in the actual filling of the bottle, it follows that the number of filling heads which will be in actual operation during a cycle varies. To meet this situation and speed-up production, an alternative form of regulating and distributing valve $V^m$ is here disclosed in FIGS. 16 to 19 inclusive.

Liquid is supplied to this regulating valve $V^m$ through the conduit 108 at any desired predetermined constant pressure. The casing $V^a$ of this valve $V^m$ is shown in FIGS. 3 and 16 to 19 and 37 as comprising a tubular hub $U^1$ having radiating tubular nipples N (like the valve $V^2$ above described) for the reception of the inner ends of the radiating distributing tubes 119 which thus communicate with a chamber 500a in the valve casing. A port, defined by an annular seat, provides communication between the conduit 108 and the chamber 500a. A valve feather $F^1$ secured to the stem 153a of a piston 153c within the cylindrical body portion $V^a$ of the valve casing, controls the supply of liquid to the chamber 500a. Within the cylindrical part $V^a$ of the casing there are two pistons 151, 152 (in addition to piston 153c) which, together with the top closure 150m (having an opening at its center) and the bottom wall 155 of the cylindrical part of the casing, define four chambers $C^1$, $C^2$, $C^3$ and $C^4$ respectively. The top closure 150m has, at its underside, an annular rib A constituting a stop to limit upward movement of piston 151. A supply passage 156 in the bottom wall 155 communicates with the lowest chamber $C^4$.

The top piston 151 is connected to the piston 152 by a rigid stem 153b having an enlarged lower end 153m which engages the underside of an annular member 154 forming a part of the piston 152, while the piston 152 has a downwardly extending stem 152a having an enlarged lower end portion which engages the undersurface of an annular part 156x of the lowermost piston 153. The admission and exhaust of air to and from the chambers $C^1$, $C^2$ and $C^3$ is controlled by booster valves $B^4$, $B^5$ and $B^6$ respectively, such, for example, as the valve of FIGS. 25 and 26, above described and whose operation is controlled by fluid logic modules.

As noted, the three pistons 151, 152 and 153c are so connected that they may move relatively to each other and the parts are so dimensioned that the normal space between the upper piston 151 and the lower surface of the top wall 150m of the valve casing equals substantially one-third the total desired lift of the valve feather $F^1$ from its seat. The total movement of the piston 152 relatively to the piston 151 is likewise one-third the total lift of the valve feather, and the total movement of the piston 153c toward the piston 152 is also one-third of the total valve movement. Assuming that the pressure in each of the chambers $C^1$, $C^2$ and $C^3$ is normally the same, for example 30 p.s.i., while a constant pressure of a lesser amount, for example 10 p.s.i., is maintained in the chamber $C^4$, then, if for example, the pressure in the chamber $C^3$ be released (FIG. 17) the 10 p.s.i. in the chamber $C^4$ will raise the piston 153c until its lift is terminated by engagement with the piston 152. The valve feather $F^1$ will thus be lifted one-third of its total possible lift.

If now the pressure in chambers $C^1$ and $C^2$ be released, the pressure in chamber $C^4$ (still acting on the piston 153c) will push the piston 153c up and with it the piston 152 so far as the latter is permitted to move by contact with the piston 151, it being observed that pressure still is maintained in the chamber $C^3$. Thus the valve feather $F^1$ is now raised two-thirds of the total lift from its seat (FIG. 1). If now the pressure be exhausted from the chamber $C^3$, the pressure which is still maintained in chamber $C^4$, acting on the piston 153c, will lift all three pistons so far as the upper piston 151 is permitted to rise by contact with the stop A at the underside of the top 150m of the casing, these three stages of valve lift being illustrated in FIGS. 17, 18 and 19 respectively.

While one order of lift for the successive pistons has been suggested, it is not necessary that the several chambers $C^1$, $C^2$ and $C^3$ be exhausted in the sequence above suggested since, by reason of the construction described, the exhaustion of any individual one of said chambers will cause the valve to lift one-third of the way from its seat, and if, then, of the remaining chambers, either one to be exhausted, the valve feather will then rise another third of the full lift. When the last chamber is exhausted the valve will be raised to full lift.

The regulating valve $V^m$, just described, is designed to provide liquid in the proper volume as the number of open filler valves decreases or increases, the arrangement being such that the lift of the valve feather $F^1$ one third of its total amount to the position of FIG. 17 provides adequate liquid for approximately one-third of the filling nozzle. The lift of the valve feather in the position of FIG. 18 provides a supply of liquid sufficient for a further group of nozzles, while the lift to the full amount, as shown in FIG. 19, provides fluid for a maximum number of filling nozzles which at any time may be in action.

THE FILLER HEADS

FIGS. 6 to 10 inclusive illustrate a filler head H according to one embodiment of the invention, wherein each filler head comprises a casing 111 having therein a chamber 118 which is in free communication with one of the tubes 119 which connects the filling head with the centrally located regulating valve $V^m$ (FIG. 3). The casing 111 of the filler head also has therein a chamber 121 (FIGS. 7 and 8) separated from the chamber 118 by a web 120m, within which is arranged a piston 122 which is urged upwardly by a compression spring 123, and also by air pressure as will be described, the piston being secured to the upper end of the vertically movable piston rod or valve stem 124 to whose lower end the filling valve feather 125 is secured. Each filler head also comprises a filling tube 126 with whose lower end the valve 125 cooperates, the interior of the filling tube freely communicating, at all times, at its upper end, with the chamber 118 of the filler head. As shown in FIG. 7, a sensing tube 146 of small inside diameter, for example one-eighth inch, enters a radial hole in the lower part 111m of the filling head casing and extends inwardly through the wall of the filling tube 126 and then downwardly to a point just above the delivery end of the filling tube where it opens outwardly at a port 147 just above the discharge port at the lower end of the filling tube. This sensing tube 146 is permanently fixed to the filling tube 126 and partakes of all the movements of the latter.

The sensing tube 146 for each filling head has an extension 148 which leads to the corresponding fluid logic assembly and terminates in an open-ended horizontal portion 146d (FIGS. 21 and 32–1). The open end of this horizontal portion 146d is opposed to a jet of air issuing from a reducing nozzle 148a (FIG. 32–1) which receives air at a pressure of 30 p.s.i. and constantly delivers a jet at a pressure of approximately ½ p.s.i. Air from this jet normally enters the open end of the part 146d and, passing down the sensing tube, is discharged from the lower end of the latter until the liquid level in the bottle rises sufficiently to oppose the free discharge of air from the lower end of the tube 146. However, the jet is still delivered by the nozzle 148a and some of this air will now be diverted into the open end of a tube K2 (FIG. 32–1) which constitutes an element of the fluid logic means, with the result that the filling valve of the corresponding head will be closed, as hereinafter more fully described.

The filling tube 126, in accordance with the embodiment of FIG. 4 is of a length such that when the empty bottle 31 is at its highest position, the valve 125 (at the start of actual filling) will be located within the bottle approximately at the desired location of the surface of the liquid in the filled bottle. In accordance with another embodiment of the invention (FIG. 5) the valve 125, at the start of actual filling, will be located close to the inner surface of the bottle bottom, for example a distance of one-fourth inch above the bottle surface. It is to be noted that the filling tube is fixed in the casing of the head and has no up and down motion.

The space 121 (FIG. 8) below the piston 122 of the filling head H communicates with a source of compressed air at a pressure of approximately 10 p.s.i. supplied, by a tube 139 (FIG. 9), to passages 140 and 141a in the casing of the filler head H. The opening and closing of the valve 125 results from the action of a booster valve $B^1$ such as that shown in FIGS. 25 and 26 as above described. The chamber 127 (FIG. 25) of the booster valve $B^1$ is connected by a tube 128a to a source of compressed air maintained at a constant pressure of 30 p.s.i. for example.

The space 141x (FIG. 26) (above the piston 137 of the booster valve) communicates by a tube K10 with modules TA1, TA2 and TA3 (FIG. 32–1) of the fluid logic system, one or the other of said modules, as hereafter described, being operative, at times, to supply low fluid pressure, for example, ½ p.s.i. to the upper face of the piston 137 of the booster valve, thus moving the large piston 137 and the relatively small piston valve 128 down to the exhaust position (FIG. 26), where chamber 127a of the booster valve communicates with an exhaust port E, thereby permitting escape of compressed air by tube 130 from the chamber 140a (FIG. 7) of the filler head H and so allowing the force of the spring 123, added to the air pressure of approximately 10 p.s.i. (constantly supplied to chamber 121 by pipe 139), to close the filling valve and thus terminate discharge of liquid from the filling tube.

Each filling head H, as shown more clearly in the fragmentary, diagrammatic elevation (FIG. 21) comprises a pair of vertical, parallel, fixed rigid guide rods 142, 142a disposed at diametrically opposite sides of the filler tube 126, these rods being vertically slidable in rigid guides 143 and 144 (FIG. 21) forming parts of the rotating carrier 106 (FIGS. 2 and 3). At their lower ends the rods 142 and 142a are fixedly secured, at diametrically opposite points, to the bottle-centering bell 145, the latter in accordance with one embodiment (FIG. 22) having a nozzle orifice, for example, the orifice 74 through which a jet of air is normally discharged. If desired, the other fixed guide 144 (FIG. 21) may be provided with one or more orifices 74, 74a (FIGS. 22 and 22a) through which jets of air are normally delivered. Under some operating conditions air issuing from one or both of these orifices 74, 74a may be diverted from its normal path, as the filling head revolves about the axis of the machine, as they pass fixed baffle members T or T1.

An orifice-closing baffle member 153 (FIGS. 21 and 24) is adjustable to a predetermined position on the rod 142. As the rod 142 moves upwardly in its guide 143, the baffle member 153 will approach the orifice 149. Thus, as the bell 145 is moved upwardly by contact with the top of the rising bottle, one face of part 153, if the latter has been properly adjusted on the rod 142, will close the orifice 149 and in so doing will normally, in response to fluid-logic action, as hereafter described, unseat the valve feather 125 and thus start the delivery of liquid. Thus, by adjustment of the part 153 up or down on the rod 142, the location of the delivery end of the filling tube relatively to the bottom of the bottle, when filling starts, may be determined.

Associated with each filler head H (FIGS. 6 and 7) there is a booster valve $B^1$, above more fully described, with reference to FIGS. 25 and 26. At times this booster valve admits pressure fluid to the chamber 140a above the piston 122, thereby moving the piston 122 downwardly in opposition to spring 123 and so pushing the filling valve feather 125 down to open position. The piston rod 124 (FIG. 7) has an enlarged upper portion 124m which slides in an axial bore in the web.

If, as hereafter more fully pointed out, the bottle should be overfilled at position 19 (FIG. 5), at which the valve closes, the application of suction applied during the period while the bottle is passing from position 20 to the delivery point, may be employed to reduce the level of the liquid to exactly the desired height. If desired, the suction may be maintained until the filling head reaches the fill-starting position, thereby eliminating drip from the delivery end of the filling tube at the completion of a filling operation.

For this, and certain other reasons, more fully described hereafter, the present apparatus provides means whereby at or near the completing of the filling of a container, suction may be established at the delivery end of the filling tube as by connecting the tube with a vacuum pump.

A filling head for use in the accomplishment of the above results is illustrated in FIGS. 11 to 15 inclusive, wherein FIG. 11 is an axial section of a delivery head embodying this feature. Since, in general, this head is similar to that shown in FIGS. 6 to 10, as above described, corresponding parts are designated in FIGS. 11 to 15, inclusive, by the same reference characters but with superscripts. Thus the filling head H' of FIGS. 11 to 15 comprises a casing 111 having the internal chamber 118a which communicates with one of the radial supply tubes 119 and it has a valve stem 124a coaxial with the filling tube 126a and which is connected at its upper end to a piston 122a arranged in a chamber 121a in the casing 111 above the chamber 118a, with a spring 123a urging the piston upwardly. In this modification the casing 111 has an upward extension 111a having a chamber 201 within which there is arranged a second piston 202 which is urged upwardly by a spring 203 and which has a short stem 204 (FIG. 11) which slides in a bore in the casing part 111a and which is coaxial with the valve stem 124.

The head H' has a chamber 131a which opens into the space 201 above the piston 202, and the chamber 131a communicates with the delivery chamber 127a of the booster valve 26 (FIG. 26) by a tube 130. When the booster valve is unloaded (FIG. 25) compressed air is delivered by the tube 130 to the chamber 131a and thence to the space 201 of the filling head (FIG. 11), thus loading the piston 201 of the filling head and so tending to open the filling valve feather 125. However, when the piston 137 of the booster valve is loaded (FIG. 26) (by the delivery of compressed air through the line K10), the piston valve 128 of the booster valve moves to the position shown in FIG. 26 and allows air to exhaust from the tube 130 and thus relieves the pressure in the chamber 201 (FIG. 11). The spaces 121 and 121a beneath the pistons 122 and 202 are connected by means of passages 200 and 140b (FIG. 11) with a tube 139 (FIG. 14) which is always supplied with compressed air at a pressure of approximately 10 p.s.i. which normally assists the springs 123a and 203 in urging the pistons 122a and 202 upwardly thereby normally keeping the delivery valve feather 125 seated. Then when pressure is applied to the upper surface of the piston 137 of the booster valve, pushing the piston 128 downwardly to the position of FIG. 26, and so cutting off the supply of high pressure air to the pipe 130, it, at the same time, opens an exhaust passage comprising the chambers 127a and E (FIG. 26), allowing the compressed air in the spaces above the pistons (FIG. 11) of the filling head to escape, and the lower pressure supplied by tube 139, assisted by the springs, moves the pistons of the filling head upwardly thereby closing the valve feather 125. The piston stem 204 has an axial bore 205 (FIG. 11) which, at times, communicates with a vacuum port 210 in the wall of the casing part 111a. A tube K⁶ leads from port 210. The axial bore 205 (FIG. 11) is open at its lower end to receive an upward extension 206 of the valve stem 124a with a loose fit. In this embodiment, the valve stem 124a has an axial bore 207 (FIGS. 11 and 15) which is open at its upper end to the space 205. This bore 207 extends down through and is open at the lower end of the filling valve feather 125 which, at times, closes the delivery end of the filling tube. When the filling valve 125 is closed (FIG. 11) the upper end of the bore 207 communicates with the port 210, but when the filling valve 125 is open (FIG. 12) the port 210 is closed by the stem 204 of the piston 202.

By connecting the tube K⁶ to a vacuum pump, and thus producing suction at the lower end of the filling tube, while the filling valve 125 is closed, drops which cling to the end of the tube may be drawn away. If it be desired to introduce an inert gas such as nitrogen into the bottle preliminary to filling, the tube K⁶ may be supplied with the gas at a suitable pressure, for example 30 p.s.i. (the valve 125 at this time being seated as shown in FIG. 11) and the gas will enter the port 210 and flow down through the axial bore 207 in the stem 124a into the bottle, displacing the air therein.

AUTOMATIC CONTROL OF FILLING CYCLE FLUIDICS

FIGS. 32–1 to 32–8; 33–1 to 33–7; 34–1 and 34–2; 35–1 to 35–3; and 36–1 to 36–4 are diagrams illustrative of the fluid control of the apparatus by a fluid logic system. To facilitate interpretation of these diagrams, the following brief discussion of the principles of fluidics is presented, with a special reference to the type of fluid logic module here.

Among the many types of active fluid-units or modules which are in practical and experimental use at the present time are those commonly known as "turbulence amplifiers." Such devices are herein identified by the symbol TA. A commercial model of such a device might appear externally as a simple, generally elongate block of any desired external contour, for example, cylindrical, or as here shown for example, as substantially rectangular (FIG. 29) having small aligned tubes 401, 402 projecting from its opposite ends, respectively and one or more similar tubes Z¹ or Z² (termed "signals") projecting from one or both of its longitudinal ends and with one or more vent openings 403 (FIG. 29) in its wall. Interiorly it might appear, for example, as shown in FIG. 29, as having an elongate shallow chamber Cn into which the small input tube 401 would deliver a power supply air jet, while the other small tube 402, coaxial with the tube 401, would normally receive the air from the input jet and convey away a part at least, of the air to some point of use. In the annexed diagrammatic views the air conveying tubes are indicated simply by straight lines.

In the discussion of fluidics, the binary system of notation is employed in describing the function of a fluid module. In such a module (FIG. 29) as that just described, the compressed air or other fluid, is delivered as a jet into the chamber Cn. Experiment has shown that the pressure of the air issuing from the output tube 402 may be expected to be in the neighborhood of 35 percent of the supply pressure. Thus by proper selection of the input pressure, a predetermined "useful" pressure would be recovered from the output. This situation would be indicated, on a diagram, by placing the numeral 1 beside the output tube, regardless of the actual pressure. If, however, in the same device, a signal, that is to say a jet of compressed air were to be delivered into the chamber by a lateral tube, such as the tube Z¹ or Z², the continuity of the input jet would be broken, by the dynamic energy of the signal jet, within the chamber Cn, with the creation of turbulent flow and the escape of a substantial part of the compressed air from the vent 403 (FIG. 29). The result would be that the pressure of the air issuing from the output 402 (FIG. 29) would be a relatively small percent of the input pressure, less than would be effective for producing useful work. This result would be indicated on a diagram by placing a 0 beside the output tube or any transmission line receiving pressure fluid from the output tube. Combinations of such simple turbulence amplifiers can be made to produce varied results, for example, such that a positive output designated by the numeral 1 from one of these devices might be so delivered as a "signal" to the second of such devices, whereby the output of the latter would be represented by 0. Such a couple of turbulence amplifiers is termed a "flip-flop" and is here diagrammatically identified by the symbol FF. Note that because of the vent openings 403 there is no substantial build-up of pressure within the module and that the desired functioning of the module does not involve the building up of internal pressure.

Such a device as that shown in FIGS. 29 and 29a, as commercially made, may comprise two plates $P^1$, $P^2$ of rigid material, for example, hard plastic, with grooves or cavities formed in the face of one plate together with bores to receive the several tubes, and having the two plates so assembled that the second plate provides the upper wall for the grooves or cavities in the first, the two plates being rigidly united leak-proof to form a single unit.

The cavities and tubes may be of very small diameter, and the exterior size of such a unit need be only a few inches in length and width, so that in a system of this type the space required for these modules is relatively small compared with control elements such as are found in most other types of control systems. Such an assembly of interconnected modules as that herein disclosed, and wherein each individual module is devoid of movable parts may be defined as a "pure fluid logic system" but the system here disclosed is hereinafter referred to for simplicity in description merely as "fluid logic means."

Such a turbulence amplifier is customarily represented in a diagram (FIGS. 30 and 31) as an elongate, open rectangle having simple straight lines representing the input and output tubes and similar straight lines, intersecting one or both of the longitudinal sides of the rectangle usually at an acute angle, to indicate transversely directed jets or "signals."

Thus, referring to FIGS. 30 and 31, turbulence amplifiers (here diagrammatically illustrated and designated by the symbols $TA^1$ and $TA^2$, respectively, are shown with a line $a$ indicating the input tube and with the character ½ # beside the input, indicating that there is an input pressure of one-half pound. In rectangle $TA^1$ each of the lateral or "signal" tubes $Z^1$ or $Z^2$ has an 0 indicating that these tubes are idle, the result (the delivery of useful pressure) through the output tube $b$ being designated by the numeral 1 beside the tube $b$.

On the other hand, rectangle $TA^2$ has the numeral 1 beside the signal tube $Z^2$ which means that this tube is delivering air into the inner chamber. The result is to spoil the effectiveness of the incoming jet so that the output tube $b$ now has an 0 standing beside it, which means that the output from this unit is useless, even though actually the pressure at the outlet may be substantially above atmospheric.

If two such units be associated as shown in FIG. 31, with the first unit $TA^3$ delivering useful pressure, as indicated by the numeral 1 but with this output being delivered as a signal into the second unit by the tube $Z^1$, then the output from the second unit $TA^4$ would be 0 so that the combination results in a reversal of the normal operation of the first unit alone. Such an arrangement, as above noted, is termed a "flip-flop," diagrammatically indicated by the symbol FF.

In the annexed diagrams, the symbol TA designates a turbulence amplifier; FF designates a flip-flop; and $$\leqslant 30''$$

designates an adjustable reducing nozzle whereby 30 p.s.i. is reduced to ½ p.s.i. more or less to obtain the desired operating pressure and which delivers a continuous jet unless the end of the nozzle is blocked by a barrier, such, for example, as the device here designated by the letter T or $T^1$ or by the block 153 above described, whereby the output from a nozzle, which previously was designated 0, now develops a useful back pressure designated 1 in any line diverging from the nozzle. Adjustability of the pressure reducing nozzle is necessary, since it is not practical to provide a micrometer spacing of the end of the nozzle from the relatively moving barrier device.

Futhermore, in the diagrams, a simple rectangle indicates the casing of the valve actuating means for a single filling head H; the lower edge of the rectangle being shown, in some instances, as located in a horizontal plane designated by a line X-Y, for example in FIGS. 32–1 to 32–8, which may be used as a reference in comparing those parts which move vertically with those, for example, the filling tube which do not move up and down. Each of the diagrams schematically represents an elevation of a single filling head with associated parts, although in certain of these diagrams an arcuate, normally fixed element or barrier, designated by the character T is shown, which, in the actual machine, will be curved in a horizontal plane about the axis of revolution of the container support. Also, in FIG. 3 for example, a rectangular figure, designated by the character MM, indicates a fluid logic module which, in itself, may combine all of the fluid control passages for a given filling head, together with the connecting lines. Thus, while the diagrams provided for the purpose of explanation would seem to indicate that a large amount of space would be occupied by the several fluid logic units and the passages or tubes connecting them, as a matter of fact, because of the absence of any moving part, it is possible to concentrate all of the elements of such a system as those here illustrated in a very small space, for example within a single rectangular block of but a few inches in maximum dimensions.

While the turbulence amplifier type or module has here been shown for illustrative purposes, because of its simpicity, it will be understood that other types of air logic units, such as are known in this field, might be substituted for the turbulence amplifiers here suggested. Devices of this general type, intended for specific purposes, may be obtained in the commerical market or ordered from the manufacturer of such devices, so that further specific description appears unnecessary.

CONTROL OF REGULATING VALVE

The fluid logic control for the regulating valve $V^m$ is diagrammatically illustrated in FIG. 37. This view shows the control valve $V^m$ in vertical section with the valve feather F seated and diagrammatically shows the booster valves $B^4$, $B^5$ and $B^6$ which are of a construction, for example, like that of the booster valve $B^1$ (FIGS. 25 and 26), such that, when any one of them is loaded, pressure is released from the corresponding chamber $C^1$, $C^2$ or $C^3$ respectively, of the regulating valve $V^m$. The several booster valves (FIG. 36–1) are connected by lines Ka, Kb and Kc to output nozzles of fluid logic modules, here shown as the turbulence amplifiers $TA^5$, $TA^6$ and $TA^7$ respectively. A signal nozzle of each of the modules $TA^5$, $TA^6$ and $TA^7$ respectively, is connected by a line $K^{11}$ to the output of a corresponding module $TA^8$, $TA^9$ and $TA^{10}$ respectively. Each of these latter modules has, at each side, a plurality (here shown as five) of signal nozzles designated, respectively by the letters $a$, $b$, $c$, $d$, $e$, $f$, $g$, $h$, $i$ and $j$. Each of these signal nozzles, for example, the nozzle $a$ of the module $TA^9$ communicates, by a line $K^{50}$ with one, respectively, of the thirty filler heads H, this line $K^{50}$ being connected to the tube 130 through which pressure fluid flows from the booster valve $B^1$ to the chamber 131 (FIG. 8) of the filler head and thereby opens the filling valve. When the filling valve is closed there is zero pressure in the line $K^{50}$. Between the line $K^{50}$ (FIG. 37) and the tube 130 there is a pressure reducer such that although when the filling valve is open there is pressure of 30 p.s.i. in the tube 130, the pressure in the line $K^{50}$ is actually ½ p.s.i. although in accordance with the fluid logic system (FIG. 36-1) the pressure in the line $K^{50}$ is indicated by the numeral 1. Assuming that the filling heads are numbered from 1 to 30, corresponding lines $K^{50}$ of the several filler heads will terminate each in one of the signal nozzles *a*, *b*, *c*, etc., respectively of the devices $TA^8$, $TA^9$ and $TA^{10}$, as shown in Diagram 36-7. When any one of the filling valves opens, the corresponding line $K^{50}$ will bear the numeral 1 in the diagram. Referring, for example, to the device $TA^9$ of FIG. 37, the delivery of pressure fluid into the signal nozzle *a* by the line $K^{50}$ will result in a zero output from the device $TA^9$ with a consequent positive output pressure of 1 from the device $TA^6$ which is connected by the line K*b* to the booster valve $B^5$, thus applying pressure 1 to this valve, which results in opening line $K^{80}$ to exhaust, thus reducing pressure in the chamber $C^2$ of the regulating valve. This results in raising feather F of the regulating valve to one-third its full lift. The same action takes place whenever, as the result of the opening of one of the filling valves, positive pressure is supplied, by the corresponding line $K^{50}$, to one of the signal nozzles *a*, *b*, *c*, etc. of the devices $TA^8$, $TA^9$ and $TA^{10}$. Thus the quantity of liquid available to the filling heads, at a given time, changes in response to variation in the number of filling heads which are open.

FLUIDIC CONTROL OF APPARATUS OF FIG. 5

FIGS. 32-1 to 32-8 inclusive, illustrate the way in which fluid logic is used in controlling the filling cycle as performed by apparatus (FIG. 5) wherein the delivery end of the filling tube is closely adjacent to the inner surface of the bottom of the bottle when the filling tube first begins to discharge liquid. In these diagrams a single filling head H comprising a casing 111, a filling tube 126, a sensing tube 146 and a guiding bell 145 is shown with relation to a bottle B which, during the filling operation moves up and down as may be recognized by comparison with the horizontal datum plane X–Y. A booster valve $B^1$, such as above described (FIGS. 25 and 26) supplied with compressed air at 30 p.s.i. is operative, at times, to open the normally closed valve 125 at the delivery end of the filling tube whose upper end receives liquid from one of the radial supply tubes 119 (FIG. 1).

The filling head H as shown in these diagrams comprises at least three pressure reducing nozzles 148*a*, 148*b* and 74, each of which continuously discharges a jet of air unless the discharge is opposed in one way or another. The nozzles 148*a*, 148*b* and 74 will be adjusted so as to discharge air at a pressure of approximately ½ p.s.i. which will result in a pressure at TA approximating the downward pressure (0.0361 p.s.i.) of a column of water ½ inch in height.

Referring to FIG. 32-1, it will be assumed that an empty bottle B has been placed in position 11 (FIG. 5), directly below a filling head H; that the filling valve feather 125 is seated; and the effective air pressure, at various parts of the fluid logic system is, as indicated in the diagram; compressed air at 30 p.s.i. is being supplied to the chamber 127 of the booster valve $B^1$ (FIG. 25), and the jet from nozzle 148*a* is directed into the open upper end of the sensing tube 146 but has no effect at this time since the sensing tube is open at its lower end so that air delivered into the tube discharges freely from the lower end of the tube. Thus the presusre in line $K^2$ (FIG. 32-1) is indicated as 0. The jet from nozzle 148*b* is delivered by the tube 148 (FIG. 24) to the orifice 149 (FIG. 23) in the part 150 but since this orifice is now open, the air discharges without developing any effective pressure, so that line $K^1$ is 0. The jet from nozzle 74 is at this time unopposed so that pressure in line $K^3$ is 0. Thus no operative pressure will be delivered to the signal jets of any of the devices $TA^1$, $TA^2$, $TA^3$ or FF. Since a pressure jet, designated ½" is indicated as entering the lower end of each of the devices $TA^1$, $TA^2$, $TA^3$ and each unit *a* and *b* of FF, the output for $TA^3$ is 1 and the net result is that there is positive pressure 1 in line $K^{10}$ which, acting on the piston 137 (FIG. 26) of the booster valve $B^1$ has pushed the piston down, preventing the 30 p.s.i. in the conduit 128*a* (FIG. 26) from entering the filling head, and any pressure fluid which was in the chamber 140*a* (FIG. 7) of the filling head H has been released through the exhaust port E of the booster valve (FIG. 26); thus the piston 122 (FIG. 7) of the filling valve has been raised by the spring 123 and the pressure in chamber 121 and is holding the filling valve feather 125 is closed position (FIG. 7). This may be regarded as the "normal" or idle position.

Referring to Diagram 32-1 (and noting by reference to horizontal datum line X–Y, that the filling tube has not moved but that the bottle B has been raised by the cam 49 (FIG. 5) to the position 17 as seen in FIG. 5), it will be seen, that the rising bottle engaged the centering bell 145 (FIG. 32-2) and moved the latter up, carrying with it the rods 142 and 142*a* (FIG. 21) and also member 153 which has closed the orifice 149 (FIG. 24) in the part 150. Closing this orifice has blocked the free discharge of air from the nozzle 148*b* resulting in pressure 1 in the line $K^1$. Lines $K^2$ and $K^3$ are still at 0 pressure; thus pressure in line $K^1$ has resulted in a 0 output from the first unit *a* of FF with the result that the second unit *b* of FF delivers a positive pressure 1 which causes the device $TA^3$ to have a 0 output. Since line $K^2$ is still at 0 the device $TA^2$ now delivers a pressure of 1 which neutralizes $TA^1$. This results in 0 pressure in the line $K^{10}$, so that the piston of the booster valve $B^1$ (FIG. 26) is relieved of pressure which permits the 30 p.s.i. pressure supplied to the booster valve by the tube 128*a* to push the piston valve 128 (FIG. 26) upwardly, together with the piston 137, thus allowing the 30 p.s.i. pressure to enter passages 127 and 127*a* (FIG. 25) of the booster valve $B^1$ and thus to enter the conduit 130 which delivers the compressed air into the chamber 140*a* (FIG. 8) of the filling head H (FIG. 8), pushing the piston 122 of the latter down in opposition to the spring 123 (while the chamber 121 is exhausted through passages 41*a* and 140 and tube 139 (FIG. 9)) and unseating the valve feather 125 and so opening the delivery end of the filling tube. Liquid now begins to flow down the filling tube and into the bottle which, as above pointed out, has risen to a level such that the discharge end of the filling tube is spaced a short distance, for example, ½ inch from the inner surface of the bottom of the bottle.

Diagram 32-3 shows the bottle as having moved down a short distance (for example, to a position between 17 and 18, FIG. 5), while the level of the liquid has risen so that it has overtaken the end of the filling tube and has closed the orifice 147 (FIG. 7) at the lower end of the sensing tube. Since the pressure of the air delivered by the sensing tube is so small, desirably approximating the downward pressure exerted by a column of water one-half inch in height, the level of the liquid need rise but a little above the lower end of the sensing tube to stop the discharge of air from the sensing tube. The result of this is that the discharge from the nozzle 148*a* can no longer enter the sensing tube. Thus pressure 1 is built up in the line $K^2$ with the result that the output from the device $TA^2$ is reduced to 0. As the bottle moved down, part 153 moved down and uncovered the orifice in member 150 so the line $K^1$ is now 0. Line $K^3$ is unaffected. This does not affect the output of FF*b*, since there is still an output of 0 from FF*a*. Thus the output from $TA^1$ becomes 1 and line $K^{10}$ becomes 1; the chamber 141 of the booster valve receives pressure such as to depress the piston 137 and move the piston valve 128 down to closing position, thus exhausting the chamber 140*a* of the filling head, permitting the spring 123, assisted by air pressure of 10 p.s.i. in chamber 121 of the valve head (FIG. 7), to raise the piston 122 and thus close the valve 125 at the delivery end of the filling tube.

The bottle continues to descend and, as shown in FIG. 32–4, the level of the liquid in the bottle has again dropped below the orifice 147 of the sensing tube, so that the flow of air in the sensing tube is resumed; the pressure in line $K^2$ drops to 0; lines $K^1$ and $K^3$ are unaffected; line $K^{10}$ is 0; the filling valve feather 125 is again unseated and the parts have been restored to the position illustrated in Diagram 32–2 and the bottle is approximately half full. However, the bottle is still descending and the level of the liquid is rising relatively to the bottom of the bottle so that in a very short time as shown in FIG. 32–5 the same situation exists as is shown in Diagram 32–3 where the liquid has blocked the discharge of fluid from the sensing tube, the result being that the booster valve $B^1$ has again closed and the discharge of liquid from the filling tube is terminated. This cycle of operation may continue, with the liquid level following the delivery end of a filling tube until the bottle is filled.

Ideal filling is achieved for highly foamable liquids when the speed of the machine and the rate of fill is adjusted so that the lower end of the filling tube maintains a position just below or at the liquid surface and the liquid level follows the tube as it rises from the base of the container. Under these ideal conditions the liquid surface will not block the orifice 147 of the sensing device during the first 90 percent of the filling period. During the last 10 percent of fill, the valve will repeatedly open and close to provide accurate fill as determined by the sensing device. For a given machine speed the rate of fill can be established by controlling the liquid supply pressure.

In FIG. 32–6, the surface of the liquid has risen nearly to the final or "filled" level; and the filling valve is open and the sensing tube is unobstructed, so that the last cycle of the filling operation is commencing.

As shown in FIGS. 32–1 to 32–6 inclusive, the nozzle 74 is delivering a jet of pressure fluid which discharges freely into the atmosphere and line $K^3$ has been 0 during all of the filling cycle. However, when, as a result of the rotation of the part 106 (FIGS. 1 and 2) the delivery end of the filling tube has arrived at the "filled position" (position 19 of FIG. 5), the rotation of the carrier has brought the nozzle 74, FIG. 32–7, into such a position, relatively to the fixed barrier T, that the free delivery of fluid from the nozzle 74 is blocked and so the pressure in the line $K^3$ becomes 1; thus the output pressure from the right-hand unit b of the device FF is 0, the result being that the device $TA^3$ has an output of 1, and likewise the device $TA^1$ has an output of 1, so that the booster valve $B^1$ receives a pressure of 1 and thereby closes the filling valve so that the delivery of liquid to the bottle ceases. Thus the filling cycle has been completed (FIG. 32–8) and the bottle, moves downwardly from position 21 to position 25 (FIG. 5) and at position 25 the top of the bottle is spaced below the lower end of the centering bell 145 and nozzle 148b is unobstructed. Thus, the discharge of liquid from the filling tube cannot be resumed until the part 153 is restored, by rise of another bottle, to the position shown in Diagram 32–2, even though in the meantime the nozzle 74 has moved away from the barrier T.

Reference has heretofore been made to the desirability of preventing drip from the end of the filling tube when the latter is withdrawn from the bottle and, as above suggested, provision may be made for preventing such drip by applying suction to the upper end of the filling tube at the end of each filling cycle. If suction is thus applied for removing drip, the suction is desirably first established as the bottle arrives at the position indicated at 21 or 22 in FIG. 5, after the situation shown in FIG. 32–7 has been arrived at, that is to say, just after the bottle begins to move downwardly after the completion of the filling cycle. One arrangement for accomplishing these results is described as follows:

DRIP REMOVAL; OVERFILL CORRECTION; NITROGEN SUPPLY

FIGS. 33–1 to 33–7 illustrate a fluid logic control system generally similar to that of FIGS. 32–1 to 32–8 but with the addition of means whereby drip from the filling tube may be removed automatically at the end of a filling cycle and/or whereby the level of the liquid in an overfilled container may be dropped down automatically to an accurate "filled" level, and whereby, if desired, an inert gas, for example, nitrogen, may be introduced into the container, automatically, prior to the commencement of the filling cycle.

For this purpose the apparatus employs a filling head such as above described with reference to FIGS. 11 to 15, instead of that shown in FIGS. 7 to 10 and, in addition to the fluid logic elements shown in FIGS. 32–1 to 32–8, includes two additional booster valves $B^{80}$ and $B^{81}$ of the kind shown in FIGS. 27 and 28;— –additional turbulence amplifiers $TA^m$ and $TA^n$; a vacuum pump P; and an additional nozzle 84 which normally discharges a jet of compressed air.

The chamber $E^1$ (FIG. 27) of the booster valve $B^{80}$ communicates with chamber 210 of the filling head which is shown in FIGS. 11 to 15, by means of a conduit $K^6$; the chamber 127b of booster valve $B^{80}$ communicates by means of a conduit $K^m$ with the chamber $E^1$ of booster valve $B^{81}$; and the chamber 127b of booster valve $B^{81}$ communicates with the vacuum pump P by means of a conduit $K^7$ (FIG. 33–2) and the chamber 127 (FIG. 25) below the piston 128 of the booster valve $B^{80}$ communicates with the module $TAn$ by the line $K30$. A check valve D in conduit $K^m$ prevents the passage of pressure fluid from booster valve $B^{81}$ to booster valve $B^{80}$, although permitting the passage of pressure fluid from booster valve $B^{80}$ to booster valve $B^{81}$.

FIG. 33–1 shows the apparatus in "normal" condition (the filling valve 125 being closed) in readiness to start a filling cycle. A bottle B is shown beneath the lower end of the filling tube (position 11 of FIG. 5). At this time nozzles 148a, 148b, 74 and 84 are unobstructed, and lines $K^2$, $K^1$, $K^3$ and $K^{20}$ are 0. It is assumed that nitrogen gas at 30 p.s.i. is available to booster valve $B^{80}$ through a conduit 128a (FIG. 27).

Thus, for example, if with the filling valve closed (pressure in chamber 201) and the tube $K^6$ (as shown in the valve head of FIG. 11) be connected, as illustrated in FIG. 33–6, to a pair of booster valves B80 and B81 in series (these booster valves being of the kind shown in FIGS. 26 and 27), and with both booster valves loaded (FIG. 33–7), and with the tube $K^m$ of the second booster valve communicating with a vacuum pump, an uninterrupted vacuum line is thus established from the tip of the closed filling valve through the passages 207, 205 and 210 (FIG. 11), the lines $K^6$, E, 127b, $K^m$ and line $K^7$, thus sucking off drops which cling to the end of the tube, or, if desired, withdrawing excess liquid from the neck of the bottle after the filling tube has closed.

The output from $TA^m$ is 1, so that booster valve $B^{80}$ is loaded. The output from $TA^n$ is 1 and booster valve $B^{81}$ is loaded, and the output from $TA^3$ is 1 and booster valve $B^1$ is loaded. Thus the filling valve is closed; line $K^6$ from chamber 210 of filling head H (FIG. 11) is open through booster valve $B^{80}$ to the line $K^m$ and the latter communicates through booster valve $B^{81}$ and line $K^7$ with the vacuum pump P.

Thus, at this time, if any fluid adheres to the closed filler valve feather 125, it will be drawn off through the axial bore 207 in the filling valve stem 128.

If it be desired to introduce an inert gas such as nitrogen into the bottle, preliminary to filling (and with the filling valve closed), the same general arrangement of parts may be employed as that used for removing drip from the filling tube. FIG. 33–2 shows the parts arranged in readiness for this operation.

At this time nozzles 148a, 148b and 74 are still unobstructed, so that lines $K^1$, $K^2$ and $K^3$ are still 0, but nozzle 84 has been carried around by the rotation of the part 106 until it is blocked by the barrier $T^1$, so that line $K^{20}$ is 1. The tube $K^6$ (FIG. 11) is now connected to a booster valve $B^{80}$ (FIG. 33–2) of the kind shown in FIGS. 27 and 28, the valve $B^{80}$ being unloaded (FIG. 27) while the second booster valve $B^{81}$ is loaded. If now nitrogen be supplied to the inlet tube 128a of the booster valve $B^{80}$ this gas will then pass through the chambers 127a and $E^1$ of the booster valve and thence through the tube $K^6$ and through the passages 210 and 205 (FIG. 11) of the filling head and through the axial passage 206 of the valve stem 124a and thence out through the closed valve feather 125 into the bottle. The output from $TA^m$ and line $K^{30}$ is zero (0) with the result that the booster valve $B^{80}$ is unloaded thereby cutting communication with line $K^m$ but opening communication between the chamber $E^1$ of booster valve $B^{80}$ and the chamber 210 (FIG. 12) of the filler head. Thus, if nitrogen gas be the pressure fluid supplied to the bosster valve $B^{80}$, this gas is free to flow down through the axial passage 207 (FIG. 11) of the filling valve stem and into the container, even though the valve feather 125 is still seated.

FIG. 33–3 shows the bottle as having risen still further until the delivery end of the filling tube is at the level of the shoulder of the bottle but the filling valve is not yet opened. The lines $K^1$, $K^2$ and $K^3$ are still 0, and line $K^{20}$ is still 1, so that the booster valve $B^{80}$ is still unloaded while booster valve $B^{81}$ is still loaded. Nitrogen may still flow into the container.

FIG. 33–4 shows the bottle as having risen until the delivery end of the filling tube is but a short distance from the inner surface of the bottom of the bottle. The nozzle 84 has passed beyond the barrier $T^1$ so that line $K^{20}$ is 0 again. Thus the output from $TA^m$ is now 1 and booster valve $B^{80}$ is loaded (FIG. 28) and has cut off communication between the nitrogen supply and the filler head. At the same time the rise of the bottle to its highest level has caused block 153 to close the orifice in part 150 so that line $K^1$ is now 1 and the output from $FFa$ is 0; the output from $FFb$ is 1 and so the signal for $TA^n$ is 1 and thus the output from $TA^n$ is 0. Booster valve $B^{81}$ is thus unloaded. At this time the check valve D prevents pressure fluid from booster valve $B^{81}$ from passing through the line $K^m$ to the booster valve $B^{80}$. Since, as above noted, the output from $FFb$ is 1, the output from $TA^3$ is 0 and the output from $TA^1$ is also 0; thus the line $K^{10}$ is 0 and booster valve $B^1$ is unloaded, and the filling valve is open. Line $K^2$ is still 0 since the liquid has not yet closed the sensing tube.

FIG. 33–5 shows the bottle as having moved down until the end of the filling tube is below the shoulder of the bottle, but the liquid has risen so rapidly as to close the orifice in the sensing tube. Line $K^2$ is thus 1; line $K^1$ is now 0; the output from $TA^2$ is 0, and the output from $TA^1$ is 1, so that the line $K^{10}$ is 1 and booster valve $B^1$ is loaded and has closed the filling valve. The booster valves $B^{80}$ and $B^{81}$ are unchanged as compared with the arrangement shown in FIG. 33–4.

In FIG. 33–6 the bottle is shown as having moved down until the end of the filling tube is at the "filled level." However the liquid level is above the desired filled level and closes the sensing tube. The line $K^2$ is now 1; booster valve $B^1$ is loaded, and the filling valve has closed. However, nozzle 74 has now reached the barrier T so that line $K^3$ is 1. The output from $FFb$ is thus 0; the output from $FFa$ is 1; the output from $TA^3$ is 1; the output from $TA^1$ is 1, and booster valve $B^1$ is loaded. Because the output from $FFb$ is 0, the signal to $TA^n$ is 0, the output from $TA^n$ is 1 and booster valve $B^{81}$ is loaded. Booster valve $B^{80}$ is still loaded and thus (FIG. 11) there is a clear suction line 207, 205, 210, $K^6$, $E^1$, 127b, $K^m$, $B^{81}$, and $K^7$ between the vacuum pump P and the end of the filling tube. Thus any surplus liquid above the tip of the filling tube is drawn off. Since the location of the tip of the filling tube is fixed and a rigid cam controls the height of the bottle, the result of this situation is that the level of the liquid is brought to an accurately predetermined position, that is, the desired "filled" position.

In FIG. 33–7 the bottle shown as having moved down below the centering bell but since both booster valves $B^{80}$ and $B^{81}$ are still loaded, the suction is maintained and operative to draw off any fluid from the end of the filling tube as the bottle is moved toward the discharge position. The parts are now in readiness for a repetition of the circle for the filling of the next bottle. It is contemplated that the nitrogen gas might be delivered into the bottle through the sensing tube 146, if desired, rather than through the passage 207 in the valve stem.

FLUID LOGIC SYSTEM APPLICABLE TO FIG. 4

FIGS. 33–1 to 35–3

FIGS. 36–1 to 36–4

The fluid logic system for controlling the arrangement as illustrated in FIG. 5 has been described with reference to FIGS. 32–1 to 32–8. The fluid logic system for controlling the apparatus of FIG. 4, wherein the bottle remains at the same level throughout the filling operation is somewhat simpler than that for controlling the arrangement of FIG. 5. Thus, in accordance with the arrangement of FIG. 4, when the bottle arrives at position 31 it has already risen to the filling level and has raised the centering bell 145 to the position shown in FIG. 35–1, thus closing the orifice in the part 150 and making line $K^1$, 1; (lines $K^2$ and $K^3$ being 0). The result is, as shown in FIG. 35–1, that line $K^{10}$ is 0 and booster valve $B^1$ is unloaded so that the filling valve is open. However it must be remembered that in the arrangement of FIG. 4, the filling tube is shorter than that used in the arrangement of FIG. 32–2, so that the delivery end of the filling tube is now positioned as shown in FIG. 35–1. In the arrangement of FIG. 4, the filling valve remains open throughout the entire filling operation and there is no loss of time in moving the end of the filling tube down to the bottom of the bottle before beginning the filling operation.

As shown in FIG. 35–2 the fluid-logic system remains unchanged, the valve feather remains open, the liquid level is rising and the bottle is moving toward the right as viewed in FIG. 4. This continues until the liquid level has risen up into the neck of the bottle approximately to the desired filled position as shown in FIG. 35–3, wherein the liquid level has now overtaken the end of the filling tube and has closed the orifice 147 at the end of the sensing tube 146, thus causing line $K^2$ to become 1 so that the output from $TA^2$ becomes 0. Since the bottle has reached the position 38 and has moved down a short distance, nozzle 148b is no longer blocked and line $K^1$ has become 0, but at this time the filling head, in its revolution about the axis of the machine has brought nozzle 74 oppoosite the barrier T so that line $K^3$ is now 1, the result is that the output from $TA^3$ is 1 and thus the line $K^{10}$ is 1 and the booster valve $B^1$ is loaded and the filling valve is closed and will remain closed as the bottle continues to move down to the delivery position 40 (FIG. 4) even though in so doing the orifice of the sensing tube is open. However, if provision is made for removing drip or for automatically reducing the level of an overfilled bottle to the desired filled level, the arrangement of FIG. 33–1 to 33–7 would be employed wherein, as shown in FIG. 33–6, both booster valves $B^{80}$ and $B^{81}$ are loaded when the bottle reaches the position 35 (FIG. 4) and the suction line is open between the filling valve and the vacuum pump.

The procedure as just above described and as illustrated in FIGS. 35–1 to 35–3 and wherein the delivery end of the filling tube remains within the bottle neck throughout the entire filling operation, is not desirable when filling bottles of certain shapes, since it creates excessive turbulence within the bottle with resultant foaming. Thus a procedure such as illustrated in FIGS. 36–1 to 36–4 is preferable under many circumstances, this procedure involving the location of the delivery end of the filling tube during the major part of the operation at a part of the bottle such as to reduce the foaming to a minimum. Thus as shown in FIG. 36–1 the end of the filling tube is within the shoulder of the bottle, it being understood that the bottle, in rising, has contacted the bell 145 and has raised the latter so as to bring the block 153 into such position as to close the orifice in part 150, thus making the line $K^1$ 1 with resultant opening of the filling valve. It may be assumed that the bottle is now in position 31 of FIG. 4, line $K^2$ being 0 because the orifice at the end of the sensing tube is unobstructed and line $K^3$ being 0 with the result that the output from $TA^1$ and $TA^3$ is 0 and line $K^{10}$ is 0 and the booster valve $B^1$ is open, resulting in opening of the filling valve 125. The parts remain in this position as shown in FIG. 36–2 as the bottle travels along with its bottom in the same horizontal plane while the liquid gradually rises as shown in FIGS. 36–2 and 36–3 until it is about to enter the neck of the bottle. At this point the bottle begins to move down. Note the drop in the upper surface of cam 117*a* between bottle positions 33 and 34 (FIG. 4*a*). Line $K^1$ remains 0 since the orifice at the end of the sensing tube is still closed, and the booster valve $B^1$ remains open. Filling thus continues until the liquid level has risen enough to block the orifice of the sensing tube as shown in FIG. 36–4 whereupon line $K^2$ becomes 1, line $K^1$ remaining 0, but now nozzle 74 has reached the barrier T so that line $K^3$ has become 1, the result of which is that line $K^{10}$ is now 1 and booster valve $B^1$ is closed and will remain closed so long as nozzle 74 is blocked by the barrier T, thus permitting the bottle to be moved down to the delivery level 40 without reopening the filling valve. If it be desired to remove drip, the arrangement of FIGS. 33–1 to 33–7 would be employed wherein, while the bottle is moving without further drop from position 35 (FIG. 4*a*) to position 37, the filling tube will be connected to a vacuum pump. With the arrangement just described it is possible to fill the bottle rapidly without undue foaming even though the bottle neck be of a type which would cause excessive foaming if the procedure of FIGS. 35–1 to 35–3 were used. By properly contouring the cam which controls the elevation of the bottle, it is readily possible to follow the procedure illustrated in either of FIGS. 35 or 36 respectively.

The baffles T and $T^1$ are arcuate members concentric with the axis of the machine and supported (desirably) with provision for adjustment peripherally of the machine and may also be of adjustable arcuate extent. As illustrated in FIG. 22*a*, these two baffles T and $T^1$ are arranged in different horizontal planes so that the functioning of one will not interfere with that of the other regardless of their circumferential extent. Thus, the baffle T which determines the fill height will be so located, circumferentially as to become effective approximately as a bottle reaches the position 18 of FIG. 5, while the baffle $T^1$ which controls the admission of a neutral gas to the bottle just before filling commences, will be arranged, circumferentially, to become effective as the bottles start to rise, beginning approximately at the position of the bottle 12 of FIG. 5.

SAFETY CONTROL—LEAKY CONTAINER

In the above discussion it has been assumed that the liquid level will rise within the container after the filling valve has opened and that when the liquid has risen to the "filled" position the filling valve will close automatically in response to the blocking of the sensing tube by the liquid. However, if the container be defective, for example, cracked or otherwise imperfect so that liquid would leak rapidly from the container, the filling valve might remain open indefinitely so far as the above-described automatic control by the sensing tube is concerned. To avoid such a situation a simple arrangement such as that illustrated in FIGS. 34–1 and 34–2 is provided, which shows the same arrangement as is illustrated and described with reference to FIGS. 32–1 to 32–8, but with the addition of a time-delay device Q, for example, a closed chamber of predetermined capacity.

In FIG. 34–1 the container, shown as a bottle B, has risen to the position at which filling should start, having raised the centering bell 145 and moved the part 153 into position to block the orifice in the part 150 and thus has opened the filling valve by producing 0 pressure at the booster valve $B^1$. In this arrangement a reducing nozzle 87 takes air from the line 130 (which transmits air at 30 p.s.i. from the booster valve $B^1$ to the filling head H, when the filling valve is open) and delivers the air, so received, to a line $K^8$ which transmits the air to a delay device, for example, a chamber Q of a limited capacity having a restricted outlet in its wall through which air may escape slowly but at a pressure indicated as 0 until the pressure has been built up in the chamber to a predetermined value. When the filling valve is closed, no air flows through the line $K^8$ and so the pressure at the inlet of chamber Q is 0 and its output pressure is likewise 0. The output from chamber Q, is through the line $K^9$ which delivers a signal to FF*b*. This signal is normally 0 and consequently the output from FF*b* is 1 and so remains during the major portions of a normal filling cycle (see FIGS. 32–1 and 32–6), as the result of the operation of the sensing tube.

However, when the filling valve is open, line $K^8$ has a pressure of 1 and during the filling cycle pressure is gradually built up in chamber Q. By properly dimensioning the chamber Q the pressure therein will not become so great as to provide an output of 1 during the normal filling cycle, that is, before the sensing tube calls for closure of the filling valve at the end of the cycle.

However, if the sensing tube does not call for closure of the filling valve at the end of a normal cycling period, pressure builds up in the chamber Q until the latter has an output of 1 (FIG. 34–2) which results in an output of 0 at FF*b* and a consequent output of 1 at $TA^3$, with the result of placing load on the booster valve $B^1$ and closing the filling valve. The provision of the delay device Q does not interfere with the normal operation of the apparatus as determined by the sensing tube unless, within a normal cycle period the sensing tube fails to function, whereupon, at the conclusion of the normal cycle, the arrangement of FIGS. 34–1 and 34–2 takes control and closes the filling valve. Thus, if, for example, a container be defective, so that liquid leaks from it so rapidly that the bottle is not filled within a normal time, the filling operation will automatically cease, avoiding loss of the liquid and the wetting of the surroundings.

Each of the cam devices 49 and 117 (FIGS. 5 and 4) desirably consists of two parts, each pivoted or hinged at one end as indicated at $P^1$ and $P^2$ and with adjusting devices $A^1$ and $A^2$ of any suitable or conventional type whereby the slopes of the active surfaces of the cam devices may be varied. The upper edge of the cam device 49 and the lower edge 116 of the cam 117 are so contoured as to determine the maximum lift of the containers at which filling starts; the path which the container shall follow after filling starts; and the path which the container shall follow after the filling valve closes. If a single set of cams, such as shown in FIGS. 4 and 5, does not provide sufficient adjustment to accommodate bottles of all heights or containers of unusual shape, it is contemplated that substitute cam elements of suitable shape and dimensions may be provided for replacing the cams here illustrated.

In the annexed claims wherein reference is made to a stationary filling tube it is to be understood that the term "stationary" is only intended to refer to vertical motion and is not to be construed as meaning that the tube does not move horizontally.

I claim:

1. In combination, in a container-filling machine of the kind which comprises a filling head including a vertical filling tube which is fixed with reference to vertical movement, a valve seat at the lower end of the tube which defines a delivery orifice, a normally seated valve feather cooperable with the seat to close the orifice, a stem to which the feather is secured and which extends upwardly within the tube, a fluid pressure motor comprised within the filling head and which is operative, at times to actuate the stem thereby to unseat the feather, means for supplying the liquid for delivery by the tube into a container, a vertically movable container-support, means for delivering an empty container to the container-support while the latter is in a container-receiving position means operative to raise and lower the container-support, with the empty container thereon, thereby entering the delivery end of the filling tube into the container, characterized in having a plurality of nozzles, each of which constantly delivers a jet of compressed air at a pressure of approximately 0.045 p.s.i., means which is responsive to the rise of a container from said container-receiving position and thereby diverts air from one of said jets from its normal course, means which responds to the rise of the surface of the liquid in the container to a predetermined distance of approximately one inch above the horizontal plane of the valve seat and, in so responding, diverts air from a second of said jets from its normal course, and fluid logic means comprising a plurality of modules, said modules being such and being so interconnected as to constitute a pure fluid logic system which so reacts to the air diverted from the first of said jets as to initiate the opening of the filling valve and which so reacts to air diverted from the second of said jets as to initiate the closure of the filler valve.

2. In combination, in a filling machine according to claim 1, further characterized in that each module has an inlet orifice for the reception of gaseous fluid and each has at least one port from which said gaseous fluid may be discharged, and means whereby pressure fluid at a constant pressure of approximately one-half p.s.i., is supplied at all times to the inlet orifice of each of the several modules.

3. Apparatus according to claim 2 further characterized in that the fluid-logic modules are so interconnected that, as the liquid level rises within the container, the filling valve opens and closes repeatedly until the level of the liquid in the container has risen approximately to the desired fill height.

4. Apparatus according to claim 1, further characterized in having means for removing drip from the end of the filling tube when the filling operation is complete, and wherein the operation of said drip-removing means is initiated by said fluid logic means.

5. Apparatus according to claim 1, further characterized in having means operative to reduce the level of the liquid in the container if, when the filling valve closes, the container is overfilled, and wherein the operation of said level-reducing means is initiated by the fluid logic means.

6. Apparatus according to claim 1, wherein provision is made for supplying inert gas, further characterized in having means for delivering the inert gas into the empty container before the filling valve opens, and wherein the operation of said gas-delivering means is initiated by the fluid logic means.

7. Apparatus according to claim 1, further characterized in that the filling tube is of a length such that the filling valve is located close to the inner surface of the bottom of the container when the filling valve opens, and the support for the container moves downwardly progressively as the filling operation continues.

8. Apparatus according to claim 1, further characterized in that the container-support and the means to raise and lower said support are so devised that the liquid level, throughout the filling operation, remains closely adjacent to the horizontal plane of the delivery orifice of the filling tube.

9. Apparatus according to claim 8, further characterized in that the delivery end of the filling tube is located at the start of the filling operation in that horizontal plane at which the surface of the liquid should stand when the filling operation is complete, and the fluid logic means is so devised that the valve will remain open until the level of the liquid has risen at least to said plane.

10. The combination according to claim 1, wherein the machine comprises a circular series of like filling heads, means supporting said heads while advancing them along an arcuate horizontal path, container-supports, each corresponding to one of the filling heads, each support being directly below and remaining in registry with a corresponding filling head as the latter advances, said means for delivering empty containers to the support comprising means for disposing a container on each support while the latter is at a receiving level and at a predetermined point in its path of advance, and said means for raising and lowering said supports comprising means for raising each support with a container thereon into operative relation to the corresponding filling tube.

11. A machine according to claim 10, and wherein the container is a bottle, and wherein the means for raising the bottle-supports is such that, after raising a support to dispose the bottle thereon at the elevation at which filling starts, it maintains the support at said elevation until the filling valve closes at the completion of the filling operation.

12. Apparatus for filling bottles having necks, according to claim 10, further characterized in that the filling tube is of a length such that, when the filling valve opens, the delivery end of the tube is located within the neck of the bottle which is to be filled and in approximately that horizontal plane at which the surface of the liquid should be located when the bottle is full.

13. A machine according to claim 10, wherein, the means for raising each container-support comprises a fluid pressure motor comprising a piston and cylinder, with provision for supplying compressed air at constant pressure to each cylinder, and having a cam to limit the upward movement of the container-support.

14. Apparatus according to claim 10, further characterized in that the valve stem is of circular transverse section and the delivery end of the filling tube has a beveled, downwardly divergent, annular valve seat, and a valve feather which is circular in transverse section and has a conical seat-engaging surface whereby, when the valve feather is unseated, the liquid is delivered in an annular, hollow, downwardly extending umbrella-like jet.

15. Apparatus according to claim 10, further comprising means for preventing the filling valve from opening while the filled container is being withdrawn from the filling head, comprises a nozzle constituting an element of the filling head and from which a jet of compressed air is normally discharged, a fixed baffle so arranged that, as the filling head reaches that part of its path of travel at which the filled container is to be discharged, the baffle deflects air from said nozzle, and a fluid logic element, whose output is changed from a 0 value to a 1 value, in response to the deflection of said air, becomes effective to prevent the reopening of the filling valve, although the orifice of the sensing tube is at that time unobstructed.

16. Apparatus according to claim 1, and wherein the containers to be filled are bottles, each having a neck and a shoulder portion, said apparatus having, in combination, said means for raising and lowering said supports comprising cam means which determines the elevation of the container throughout the entire operation, characterized in that the cam means is of a contour such that when the filling valve opens, the delivery end of the filling tube is within the shoulder portion of the bottle and so remains until the liquid level reaches the delivery end of the filling tube, the contour of the cam being such that the bottle is then permitted to descend until the delivery end of the filling tube is within the bottle neck and there remains until the liquid level has risen above the lower end of the delivery tube, further characterized in that the fluid logic means is operative thereupon to close the filling valve and to remove overfill from the bottle.

17. A machine according to claim 1, which comprises a plurality of filler heads each of which comprises a vertical filler tube, a pressure motor comprising a piston having a rod, and a valve feather, fixed to the end of the rod, for closing the filling tube, said rod and valve feather having an axially extending bore therethrough, and wherein the fluid logic means is operative, at times, automatically to connect the upper end of the bore with a vacuum means including a vacuum pump thereby to suck off drip from the end of the tube.

18. Apparatus according to claim 17 including further means for supplying a neutral gas to the upper end of said bore, characterized in that the fluid-logic means constitutes the only means which is operative automatically to determine whether suction shall be applied to the bore in the piston rod or whether neutral gas shall be delivered to the upper end of the bore.

19. Apparatus according to claim 18, wherein the means for supplying neutral gas under pressure to the upper end of the bore and the means for creating suction in the upper end of said bore comprises two booster valves, each having an actuating piston and a plug valve actuated thereby, said booster valves being of identical construction and each so designed that a load applied to its actuating piston opens a passage through each respective booster valve, means providing communication between one of said booster valves and the upper end of the bore in the filling valve stem, means providing communication between the other of said booster valves and the vacuum pump, means providing communication between the two booster valves, a check valve interposed between said booster valves, means operative to supply fluid at predetrmined pressure to one end of the plug valve of each of said booster valves such as normally to move the actuating pistons of said booster valves in opposition to load placed upon said piston, said fluid-logic means being operative, at times, to load both of said booster valves and thus to move both plug valves down thereby to provide a through passage from the vacuum pump to the upper end of the bore in the valve stem.

20. A container-filling machine according to claim 1, characterized in that the means which responds to the rise of the surface of the liquid in the container comprises a sensing tube fixed relatively to the delivery nozzle and with its open lower end closely adjacent to the lower end of the nozzle while the upper end of the said sensing tube is so positioned as normally to receive fluid from the second-named of said jets but which, when the liquid in the container rises to a predetermined height above the lower end of said sensing tube, refuses to receive more fluid from the jet and thereby causes air from the jet to be diverted.

21. Apparatus according to claim 20, further characterized in that for controlling the supply of pressure fluid to said valve-actuating motor, there is a normally unloaded booster valve, said fluid logic means being operative to apply load to the booster valve and so exhaust pressure fluid from the motor and so allowing the filling valve to close but being operative, in response to the reduction of air flow through the sensing tube to unload the booster and so admit compressed air to the motor to close the filling valve.

22. Apparatus according to claim 20, wherein the sensing device comprises a tube of an inside diameter of the order of 1/8 inch, means for supporting the sensing tube so that its lower end is in a horizontal plane approximately spaced one half inch above the plane of the filling orifice, means for supplying compressed air to the sensing tube at a pressure approximating the weight, per unit of area, of a column of water one-half inch high.

23. Apparatus according to claim 20, further characterized in having a booster valve for supplying or cutting off pressure fluid, at a pressure of approximately 30 p.s.i., to or from said motor, said booster valve having an actuating piston secured to one end of a valve stem having a plug valve near its opposite end, and means whereby fluid, at a predetermined actuating pressure, approximately the downward pressure of a column of water one-half inch high, is applied to the actuating piston of the booster valve so as normally to position the plug valve to cut off the supply of pressure fluid to the valve-actuating motor, and the fluid-logic means is responsive to a signal from the sensing device to activate means to remove the pressure load from the actuating piston of the booster valve thereby so to position the plug valve as to allow pressure fluid to enter the valve-actuating motor.

24. The combination according to claim 1, wherein the machine comprises a circular series of like filling heads, means supporting said heads while advancing them along a horizontal path, container supports, each corresponding to one of the filling heads, each support being directly below and remaining in registry with a corresponding filling head as the latter advances, said means for delivering empty containers to the support comprises means for disposing a container on each support while the latter is at a receiving level and at a predetermined point in its path of advance, characterized in that the means for raising and lowering the container-supports comprises a cam of such contour as to raise each support to that maximum elevation at which filling starts and at which the delivery end of the filling tube is positioned close to the inner surface of the container bottom, and then gradually to lower the container-support as the filling progresses at such a rate that the delivery end of the filling tube remains substantially at the level of the liquid in the container as said level rises, the downward movement of the container-supports being such, as determined by the contour of the cam that, after the filling valve closes, the container supporting means remains at the same level for several degrees of arc of the rotation of the table, and then moves downwardly .o a discharge level.

25. A filling machine according to claim 1, and which comprises a support on which a plurality of filler heads are mounted, a hollow column carrying the support and which is rotatable about its axis, means for rotating the column, each filler head comprising a vertical filling tube open at its upper end to receive liquid and having a valve at its lower end for closing it, a regulating valve casing, mounted at the upper end of the column, at the center of the series of filling heads, said regulating valve having a chamber for the reception of liquid, a conduit within the column operative to deliver liquid to said chamber of the regulating valve, and tubes radiating from said regulating valve, one for each filling head, each tube being operative to convey liquid from said regulating valve chamber to one of the filling heads, respectively, the regulating valve comprising means for maintaining a constant predetermined pressure within said chamber.

26. The combination according to claim 1, wherein the machine comprises a circular series of filling heads, a rotary support for said heads, turning about a vertical axis, each filling head comprising a vertical filling tube fixed at its upper end to said support, each filling tube having a normally closed filling valve at its lower end, a pressure fluid motor comprised in each filling head operative to open and close the valve, a circular series of container-supports, each corresponding to and always registering with one of said heads, said means for raising and lowering said supports comprising means operative to raise and lower the container-supports thereby to move a container, mounted thereon, upwardly relatively to the delivery end of the corresponding filling tube, means for supplying liquid to each filling tube, said means responsive to the rising of said container comprising a nozzle from which a jet of air normally issues, a barrier operative, as the container rises to filling position, to deflect the air from the jet, and a pure fluid-logic module which is sensitively responsive to the air deflected from the jet and in so responding activates means for opening the filling valve.

27. Apparatus according to claim 1, further characterized in that said means for raising and lowering said supports comprises cam means which determines the elevation of the container throughout the entire operation, said cam means being so contoured as to maintain a selected elevation of the container for a predetermined length of time; to raise the container from a receiving to a filling level; and thereafter to lower the container; said cam means being adjustable to vary its contour as desired.

28. A machine for filling bottles having shoulder portions according to claim 1, and wherein said means for raising and lowering said support comprises cam means which determines the position of a bottle when filling starts, the length of the filling tube and the contour of the cam being such that when filling starts the delivery end of the filling tube is within the shoulder portion of the bottle and there remains until the liquid has risen to the level of the delivery end of the tube, the cam being such as then to permit the bottle to descend, and the fluid-logic means being operative so to control the filling valve while the bottle descends as to close the valve when the liquid is at the "filled" level.

29. In combination, in a machine for filling containers with liquid, means for advancing containers along a predetermined path, means operative to deliver liquid into each container as it advances, a pure fluid-logic means, and means actuatable thereby, in the event that a container is overfilled, automatically to draw off surplus liquid from the container until the surface of the liquid is at a predetermined level, said machine being of the rotary type and comprising a series of container supports and means for moving them in a circular path about a central vertical axis and wherein for delivering liquid into each container there is a filling tube which extends down into the container while the latter is being filled, a valve feather normally operative to close the lower end of the tube, a fluid pressure motor for opening the valve, and a stem within the filler tube to whose lower end the valve feather is secured, there being a bore extending uninterruptedly through the valve and longitudinally through the length of the valve stem; the fluid-logic means comprising means operative, while the valve is closed, to initiate the delivery of compressed gaseous fluid to the upper end of the bore in the stem.

30. Apparatus according to claim 29, wherein, at times, suction is established at the upper end of the axial bore in the filling valve stem, further characterized in that for initiating the creation of suction at the upper end of the valve stem, when the container has reached the proper point in its travel during the filling cycle, there is provided a nozzle which revolves with the filling tube as the latter revolves about the vertical axis of the machine and normally delivers a free unobstructed jet of air, and a stationary barrier, for deflecting said jet of air, so located that when the container reaches the aforesaid point in its course of travel, the fluid-logic means is so affected, by the deflection of the air jet, as to cause that one of a plurality of booster valves, which communicates with a vacuum pump, to be loaded, thereby communicating said vacuum pump with the upper end of said bore.

31. A container-filling machine of the kind which comprises a stationary, vertical filling tube, a vertically movable bottle-supporting tray, and means operative to move the tray thereby to elevate a bottle standing thereon so that the lower portion of the filling tube is within the neck of the bottle and to keep the bottle in said position until it is subsantially filled, the filling tube having a delivery orifice at its lower end, a valve for closing said orifice, means for moving the valve, means for controlling the operation of said valve moving means comprising a sensing device, the pure fluid-logic means being responsive to signals received from the sensing device to cause the valve moving means to close said valve whenever, during a normal filling cycle, the depth of liquid in the container rises in the bottle neck to a level above the delivery orifice of the filling tube.

32. Apparatus for filling containers with liquid according to claim 31, further characterized in having emergency means operative automatically to close the filling valve in the event that the sensing device should fail to perform its intended function within a normal filling cycle.

33. Apparatus according to claim 32, further characterized in that the emergency means for closing the valve, if it is not closed by a signal from the sensing device, comprises a device having a chamber therein, means communicating said chamber with a source of fluid pressure, which source slowly builds up the pressure in said chamber to a predetermined value after a predetermined period of time, said device delivering a signal to the pure fluid-logic means once a predetermined pressure is reached, causing said pure fluid-logic means to close the filling valve.

34. In combination, in a container-filling machine of the kind which comprises a circular series of filling heads, a rotary support for said heads turning about a vertical axis, each filling head comprising a vertical filling tube fixed at its upper end to said support, each filling tube having a normally closed filling valve at its lower end, a pressure fluid motor comprised in each filling head operative to open and close the valve, a circular series of container-supports, each corresponding to and always registering with one of said heads, means including a cam operative to raise and lower the supports thereby to move a container, mounted thereon, upwardly relatively to the delivery end of the corresponding filling tube, pure fluid-logic means, for supplying liquid to each filling tube, each filling head having a sensing tube fixedly attached to the filling tube, the sensing tube having a delivery orifice, located closely adjacent to but above the delivery end of the filling tube, from which a jet of air normally issues, the pressure of said jet being of a magnitude such that if the level of the liquid in the container is above the delivery orifice of the sensing tube, air from the jet will be diverted, thereby initiating response of the fluid logic means and so close the filling valve.

35. In combination, in a container-filling machine of the kind which comprises a circular series of filling heads, a rotary support for said heads turning about a vertical axis, each filling head comprising a vertical filling tube fixed at its upper end to said support, each filling tube having a normally closed filling valve at its lower end, a pressure fluid motor comprised in each filling head operative to open and close the valve, a circular series of container-supports, each corresponding to and always registering with one of said heads, means operative to raise and lower the supports thereby to move a container, mounted thereon, upwardly relatively to the delivery end of the corresponding filling tube, means for supplying liquid to each filling tube, a nozzle from which a jet of air normally issues, a barrier operative to divert air from said jet as the revolving filling head arrives at the position at which filling should start, and a fluid-logic module which is sensitively responsive to the diversion of the jet and which in so responding initiates the operation of means for supplying an inert gas to the container.

36. In combination, in a container-filling machine of the kind which comprises a circular series of filling heads, a rotary support for said heads turning about a vertical axis, each filling head comprising a vertical filling tube fixed at its upper end to said support, each filling tube having a normally closed filling valve at its lower end, a pressure fluid motor comprised in each filling head operative to open and close the valve, a circular series of container-supports, each corresponding to and always registering with one of said heads, means operative to raise and lower the supports thereby to move a container, mounted thereon, upwardly relatively to the delivery end of the corresponding filling tube, means for supplying liquid to each filling tube, means providing a passage through which gaseous fluid may flow into the container whether or not the filling valve is closed, valve means operative, at times, to deliver a compressed inert gas into said passage, a vacuum pump, and valve means operative, at times, to provide communication between the vacuum pump and said passage, nozzles from which jets of air normally issue, means operative at predetermined points in the revolution of the filling head to divert air first one of said jets and then another of said jets, and fluid-logic modules which are sensitively responsive to the diversion of each respective jet and which in so responding activate said valve means thereby at times to provide communication between the vacuum pump and said passage and at other times to provide for the delivery of the inert gas into said passage.

37. In a container-filling machine for filling open-topped containers, in combination with a filling head comprising a vertical filling tube open at its upper end to receive liquid and having a valve for closing its lower end, a spring tending to close said valve, and a fluid pressure motor for opening it, a booster valve comprising a casing having therein a chamber for the reception of a slidable piston, the piston having a rod which slides in a bore in the casing of the booster valve and which has an enlargement constituting a plug valve operative, at times, to close a passage leading to the valve-actuating motor, the lower end of the piston rod of the booster valve being constantly exposed to pressure fluid at a pressure sufficient to operate the valve-actuating motor, and, when the piston of the booster valve is unloaded, to move the plug valve to permit pressure fluid to enter and operate the valve-actuating motor to open the filling valve, and pure fluid-logic means comprising a fluid-logic module normally operative to deliver an output of 1 to load the piston of the booster valve and thereby exhaust air from the valve-actuating motor and allow the filling valve to close, and means to change the output of said module to 0 whereby the booster valve piston is unloaded and the booster valve opens and admits pressure fluid to the valve-actuating motor and thereby opens the filling valve.

38. In combination, in a machine for filling open-topped containers, said machine being of the kind which comprises, in combination, a filling head including a vertical, elongate filling tube having at its lower end a valve feather, a stem secured at its lower end to the feather and which extends upwardly through the tube, a fluid pressure motor for moving the valve stem, means for supplying compressed air at constant predetermined pressure, a control device, including a plug valve which, when closed, prevents air from said supply from reaching the fluid pressure motor, said plug valve being exposed to and tending to open in response to the pressure of the air of said supply, an actuating piston, of an area exceeding that of the plug valve, the piston having a rod to which the plug valve is secured, and means normally loading the piston comprising a fluid-logic means, including three modules $TA^1$, $TA^2$ and $TA^3$, connected in parallel; sensing means operative to deliver a negative signal to module $TA^2$ so long as the level of the liquid in the container is below the lower end of the filling tube, and means operative, but only when the container is positioned in readiness for the start of the filling operation, to deliver a positive signal to module $TA^3$, the means for connecting the several modules being such that when negative and positive signals are delivered respectively to modules $TA^2$ and $TA^3$, the output of the third module $TA^1$ is negtaive and thereby pressure on the piston of the control valve is released whereby the control valve opens and the pressure motor thereby opens the filling valve.

39. In combination, in a machine for filling open-topped containers, said machine being of the kind which comprises a circular series of filling heads, a rotary support for said heads turning about a vertical axis, each filling head comprising a vertical filling tube fixed at its upper end to said support, each filling tube having a normally closed filling valve at its lower end, a pressure fluid motor comprised in each filling head operative to open and close the valve, a circular series of container-supports, each corresponding to and always registering with one of said heads, means operative to raise and lower the supports thereby to move a container, mounted thereon, upwardly relatively to the delivery end of the corresponding filling tube, means for supplying liquid to each filling tube, means operative to open each filling valve as the result of the rising of each respective support to a distance approximating the desired depth of liquid in the filling container, means operative to remove drip from the end of the filling tube after the filling valve closes, means whereby an inert gas may be introduced into the empty container before the filling valve opens, means for removing liquid from an overfilled container thereby to dispose the surface of the liquid in a predetermined plane, and pure fluid-logic means operative automatically to control the opening and closing of the filling valve, the removal of drip, the admission of an inert gas to the container, and the removal of surplus liquid from an overfilled container.

40. In combination, in a machine for filling open-topped containers, the machine being of that kind which comprises a filling head including a vertical filling tube which is fixed with reference to vertical movement, a valve seat at the lower end of the tube which defines a delivery orifice, a normally seated delivery feather cooperable with the seat to close the orifice, a stem to whose lower end the featehr is secured and which extends upwardly within the tube, a fluid pressure motor within the filling head which is operative, at times, to actaute the stem thereby to unseat the feather and at other times to seat the feather, a differential pressure valve for controlling the delivery of pressure fluid to the motor which actuates the filling valve, means for supplying liquid for delivery by the tube into a container, a vertically movable container support, means for moving the support from a container-receiving position to a container discharge position, means for delivering an empty container to the support while the latter is in a container-receiving position, and means operative to raise the support with the empty container thereon, thereby causing the delivery end of the filling tube to enter the container, characterized in having pure fluid logic means comprising a plurality of interconnected modules which constitutes the sole means for controlling the filling operation.

41. The combination according to claim 40, further characterized in that the differential pressure valve has a low pressure chamber and a high pressure chamber with a large piston in the low pessure chamber and a small piston in the high pressure chamber, means rigidly connecting said pistons in spaced relation, said differential pressure valve being operative to control the admission of air to or its release from the pressure fluid motor, and means for conducting such air, at useful pressure, as results from the functioning of the pure fluid-logic means, to the low pressure chamber of the differential pressure valve.

42. The combination according to claim 41, further characterized in having means responsive to the rise of the container to filling position so as to deliver low pressure air to the pure fluid logic means so that the latter, in responding to such low pressure air, ceases to deliver pressure fluid to the differential pressure valve thereby allowing the filling valve to open.

43. The combination according to claim 41, further characterized in having a nozzle from which low pressure air is constantly discharged and wherein, in response to the rise of liquid in the container, relatively to the location of the filling valve, air from the jet is diverted and delivered to one of the modules of the pure fluid logic means.

44. The combination according to claim 40, and wherein the pure fluid logic means includes a series of fluid logic module means, and a plurality of nozles from each of which a jet of air is normally discharged, characterized in that said module means are so interconnected that, in response to an intermittent diversion of air from one of said jets, the filling valve opens and closes repeatedly until the level of the liquid in the container has risen approximately to the desired height.

45. The combination according to claim 40, further characterized in having a plurality of nozzles, each of which constantly delivers a jet of compressed air at a pressure of the order of 0.045 p.s.i., means which is responsive to the rise of a container from said container-receiving position to filling position and thereby diverts air from one of said nozzles from its normal course, means which responds to the rise of the surface of the liquid in the container to a predetermined distance, approximately ½", above the horizontal plane of the valve seat and, in so responding, diverts air from another of said nozzles from its normal course, and wherein the pure fluid logic means so reacts to the air diverted from the first of said nozles as to initiate the operation of the motor to open the filling valve, and which also reacts, to the air diverted from the second of said nozzles, to initiate the operation of the fluid pressure motor thereby to seat the valve feather and terminate discharge of liquid from the tube.

46. The combination according to claim 45, further characterized in that the plurality of interconnected modules of the pure fluid logic means comprising a series of fluid-logic modules, to each of which compressed air at low pressure is constantly supplied and to one or another of which air, diverted from one of said nozzles, is delivered in such a way as to determine whether or not said module shall deliver air at useful pressure.

47. A filling machine according to claim 45, further characterized in that the plurality of interconnected modules of said pure fluid logic system comprises a series of modules, each having an air receiving port and an air discharge port and at least one signal receiving port, means constantly supplying compressed air at a pressure of approximately 0.045 p.s.i. to the receiving port of each of the several modules, means operative to conduct compressed air, diverted from one of the aforesaid nozzles, respectively, to the signal receiving port of a corresponding one of the modules, and means for conducting such air, at useful pressure, as is the final output of the series of modules, to the differential pressure valve.

48. A filling machine of the class described, according to claim 45, having, in combination, means operable automatically to initiate several operations pertaining to the filling cycle, wherein the fluid-logic means comprises a series of fluid-logic modules such as and which are so interconnected as to form a pure fluid-logic system and wherein each module has an inlet orifice for the reception of gaseous fluid and each has a port from which said gaseous fluid may be discharged, and each has at least one port through which a signal jet of air may be introduced, means whereby pressure fluid at a relatively low constant pressure is supplied at all times to the inlet orifices of each of the several modules, a conduit so arranged as to receive such air, at useful pressure, as is discharged from the series of modules acting collectively, and to deliver such air to the low pressure chamber of the differential pressure valve.

49. The combination according to claim 40, further characteried in that the filling head is mounted for movement along a predetermined horizontal path and further comprises nozzles, from jets of air are constantly discharged, and fixed barrier devices located adjacent to the path along which the filling head travels in the performance of a cycle of filling operations, said barriers being so located that, as the filling head arrives at predetermined points in its path of travel, air from one or another of said jets will be diverted by a corresponding barrier, and means is provided whereby the air so diverted from any nozzle is conducted to a corresponding one of the fluid logic modules thereby controlling the start of one or another of the operations involved in the filling operation.

References Cited

UNITED STATES PATENTS

| | | | |
|---|---|---|---|
| 2,745,585 | 5/1956 | Lindars | 141—40 |
| 2,779,358 | 1/1957 | Fechheimer et al. | 141—48 X |
| 2,839,094 | 6/1958 | Reno | 141—150 X |
| 3,037,536 | 6/1962 | Fechheimer et al. | 141—116 X |
| 3,043,349 | 7/1962 | Bennett | 141—198 X |
| 3,072,146 | 1/1963 | Gizeski | 137—552 |
| 3,191,623 | 6/1965 | Bowles | 137—81.5 |
| 3,207,189 | 9/1965 | Vergobbi | 141—198 X |
| 3,254,683 | 6/1966 | Jennings et al. | 141—198 X |
| 3,263,711 | 8/1966 | Laub | 141—40 |
| 3,313,326 | 4/1967 | Pellerino | 141—198 X |
| 3,380,511 | 4/1968 | Campbell | 141—276 X |
| 3,324,904 | 6/1967 | Crothers | 141—86 |

FOREIGN PATENTS

| | | |
|---|---|---|
| 240,566 | 10/1925 | Great Britain. |
| 636,062 | 3/1962 | Italy. |

LAVERNE D. GEIGER, Primary Examiner

E. J. EARLS, Assistant Examiner

U.S. Cl. X.R.

137—81.5; 141—92, 119, 150, 160, 198

PO-1050
(5/69)

UNITED STATES PATENT OFFICE
CERTIFICATE OF CORRECTION

Patent No. 3,516,455      Dated June 23, 1970

Inventor(s) Sidney T. Carter

It is certified that error appears in the above-identified patent and that said Letters Patent are hereby corrected as shown below:

Column 34, line 21, before "jets" insert --which--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents